US012044561B2

(12) United States Patent
Beck et al.

(10) Patent No.: US 12,044,561 B2
(45) Date of Patent: Jul. 23, 2024

(54) FLOW SENSING DEVICE

(71) Applicant: Honeywell International Inc., Charlotte, NC (US)

(72) Inventors: Scott Edward Beck, Murphy, TX (US); Jamie W. Speldrich, Freeport, IL (US); Brian D. Speldrich, Freeport, IL (US); Philip C. Foster, Murphy, TX (US)

(73) Assignee: Honeywell International Inc., Charlotte, NC (US)

( * ) Notice: Subject to any disclaimer, the term of this patent is extended or adjusted under 35 U.S.C. 154(b) by 761 days.

(21) Appl. No.: 17/090,990

(22) Filed: Nov. 6, 2020

(65) Prior Publication Data

US 2022/0146292 A1 May 12, 2022

(51) Int. Cl.
*G01F 1/688* (2006.01)
*G01F 1/692* (2006.01)
(Continued)

(52) U.S. Cl.
CPC ............ *G01F 1/6888* (2013.01); *G01F 1/692* (2013.01); *G01F 1/696* (2013.01)

(58) Field of Classification Search
CPC ........ G01F 1/6888; G01F 1/692; G01F 1/696; G01F 1/6847; G01F 1/688; G01F 1/69; G01F 1/6845
See application file for complete search history.

(56) References Cited

U.S. PATENT DOCUMENTS 4,914,742 A 4/1990 Higashi et al.
5,027,499 A 7/1991 Prohaska
(Continued)

FOREIGN PATENT DOCUMENTS

| CN | 1900717 A | * | 1/2007 | ............... G01F 1/68 |
| CN | 1900717 A | | 1/2007 | |

(Continued)

OTHER PUBLICATIONS

Notice of Allowance received for U.S. Appl. No. 16/946,405, dated Oct. 19, 2021, 5 pages.
(Continued)

*Primary Examiner* — Herbert K Roberts
*Assistant Examiner* — Anthony W Megna Fuentes
(74) *Attorney, Agent, or Firm* — Alston & Bird LLP

(57) ABSTRACT

Methods and apparatuses associated with flow sensing devices are provided. An example flow sensing device includes a flow cap component and a sensor component. The flow cap component or sensor component may include a heating element. The flow cap component can at least partially define a flow channel configured for a media to flow therethrough. The heater element may be orthogonal or perpendicular to the flow channel. The sensor component may include at least one thermal sensing element disposed upstream of the heater element and at least one thermal sensing element disposed downstream of the heater element. The sensor component may include two or more thermal sensing elements disposed in either the upstream direction or downstream direction of the heater element. Thermal sensing elements may be spaced different distances from the heater element to increase the accuracy and precision of flow rate measurement at low flow rates.

17 Claims, 23 Drawing Sheets

(51) Int. Cl.
*G01F 1/696* (2006.01)
*G01F 1/684* (2006.01)
*G01F 1/69* (2006.01)

(56) References Cited

U.S. PATENT DOCUMENTS

| | | | |
|---|---|---|---|
| 5,050,429 | A | 9/1991 | Nishimoto et al. |
| 5,165,292 | A | 11/1992 | Prohaska |
| 5,533,412 | A | 7/1996 | Jerman et al. |
| 6,662,121 | B1 | 12/2003 | Oda et al. |
| 6,794,981 | B2 | 9/2004 | Padmanabhan et al. |
| 6,871,537 | B1 | 3/2005 | Gehman et al. |
| 6,889,545 | B2 | 5/2005 | Nakada et al. |
| 7,255,001 | B1 | 8/2007 | Davis et al. |
| 7,278,309 | B2 | 10/2007 | Dmytriw et al. |
| 7,549,206 | B2 | 6/2009 | Higashi et al. |
| 7,703,339 | B2 | 4/2010 | Sulouff, Jr. et al. |
| 8,033,180 | B2 | 10/2011 | Morales et al. |
| 8,667,839 | B2 | 3/2014 | Kimura |
| 9,581,480 | B2 | 2/2017 | Tanaka et al. |
| 9,995,700 | B2 | 6/2018 | Kuemin et al. |
| 10,345,130 | B2 | 7/2019 | Bentley et al. |
| 10,775,217 | B1 | 9/2020 | Higashi et al. |
| 11,262,224 | B2 | 3/2022 | Beck et al. |
| 2002/0121137 | A1 | 9/2002 | Fujiwara et al. |
| 2005/0022594 | A1 | 2/2005 | Padmanabhan et al. |
| 2005/0072926 | A1 | 4/2005 | Nassiopoulou et al. |
| 2006/0000271 | A1 | 1/2006 | Bork |
| 2006/0053878 | A1* | 3/2006 | Ikeda ............... G01F 1/6845 73/204.26 |
| 2010/0078753 | A1* | 4/2010 | Mehregany ........ G01F 1/6845 438/54 |
| 2012/0035866 | A1 | 2/2012 | Qasimi et al. |
| 2013/0139584 | A1 | 6/2013 | Qasimi et al. |
| 2017/0038235 | A1 | 2/2017 | Zhao et al. |
| 2018/0086629 | A1 | 3/2018 | Manos et al. |
| 2020/0033376 | A1* | 1/2020 | Han ..................... G01F 1/6847 |
| 2021/0116280 | A1 | 4/2021 | Ali et al. |
| 2022/0136882 | A1 | 5/2022 | Beck et al. |

FOREIGN PATENT DOCUMENTS

| | | |
|---|---|---|
| DE | 102010028387 A1 | 11/2010 |
| DE | 102012223210 B3 | 4/2014 |
| DE | 102013114424 A1 | 7/2015 |
| EP | 2669640 B1 | 5/2017 |
| GB | 2588397 A | 4/2021 |
| JP | H0674802 A | 3/1994 |
| JP | 07-218527 A | 8/1995 |
| JP | 2007-071687 A | 3/2007 |
| JP | 2017-219434 A | 12/2017 |
| WO | 2009/011094 A1 | 1/2009 |
| WO | 2019/078087 A1 | 4/2019 |

OTHER PUBLICATIONS

Extended European search report dated Mar. 23, 2022 for EP Application No. 21205786, 12 pages.
Notice of Allowance and Fees Due (PTOL-85) dated Dec. 27, 2021 for U.S. Appl. No. 16/946,405, 2 pages.
U.S. Appl. No. 17/648,360, "Flow Sensing Device", Unpublished (filing date Jan. 19, 2022), Scott Edward Beck (Inventor), Honeywell International Inc. (Applicant).
Notice of Allowance and Fees Due (PTOL-85) dated May 12, 2023 for U.S. Appl. No. 17/648,360, 6 page(s).
Intention to grant dated Sep. 5, 2023 for EP Application No. 21177511, 57 page(s).
Non-Final Office Action received for U.S. Appl. No. 16/946,405, dated Jul. 27, 2021, 10 pages.
IN Office Action dated Jun. 14, 2022 for IN Application No. 202114048730, 7 pages.
Non-Final Rejection dated Jan. 25, 2023 for U.S. Appl. No. 17/648,360.
Extended European search report and written opinion dated Nov. 19, 2021 for EP Application No. 21177511, 8 pages.
Bhattacharyya, P., "Technological Journey Towards Reliable Microheater Development for MEMS Gas Sensors: A Review", IEEE Transactions on Device and Materials Reliability, Jun. 2014, pp. 589-599, vol. 14, No. 2, IEEE, US.
Decision to grant a European patent dated Jan. 18, 2024 for EP Application No. 21177511, 2 page(s).
CN Office Action, including Search Report dated Nov. 16, 2023 for CN Application No. 202110620983, 7 page(s).
English Translation of CN Office Action, including Search Report dated Nov. 16, 2023 for CN Application No. 202110620983, 9 page(s).
Decision to grant a European patent Mailed on Apr. 22, 2024 for EP Application No. 21205786, 9 page(s).
IN Hearing Notice Mailed on Apr. 29, 2024 for IN Application No. 202114048730, 3 page(s).
CN Notice of Allowance Mailed on May 6, 2024 for CN Application No. 202110620983, 2 page(s).
English translation of CN Notice of Allowance dated May 6, 2024 for CN Application No. 202110620983, 3 page(s).
IN Hearing (Rescheduled) Notice Mailed on May 14, 2024 for IN Application No. 202114048730, 3 page(s).
Intention to grant Mailed on Apr. 22, 2024 for EP Application No. 21205786, 9 page(s).
Exteneded European Search Report Mailed on Jun. 5, 2024 for EP Application No. 24152551, 10 page(s).

* cited by examiner

Split Heater: 42 x 210 μm
(42 μm gap)

FLOW SENSING DEVICE

BACKGROUND

Flow sensors may be used to measure the flow rate and/or quantity of a moving liquid or gas, and may be implemented in various applications. For example, a flow sensor may be a part of a system for measuring and/or controlling the dosing of liquid or gas.

However, existing flow sensors are plagued by challenges and limitations. For example, existing flow sensors fail to provide accurate and economical measuring of low liquid flow rates using a microelectronics system with small system footprint.

BRIEF SUMMARY

In accordance with various examples of the present disclosure, an example flow sensing device may be provided.

In some examples, the example flow sensing device may comprise a flow cap component and a sensor component.

In some examples, the flow cap component or the sensor component may comprise a heating element disposed in a first layer of the flow cap component or the sensor component.

In some examples, the sensor component may comprise at least one thermal sensing element disposed in a second layer of the sensor component.

In some examples, the flow cap component may be bonded to a first surface of the sensor component to form a flow channel. In some examples, the first layer and the second layer may be noncoplanar and separated by the flow channel. In some embodiments, the flow cap component may fully define the flow channel.

In some examples, the flow cap component may comprise a flow channel portion on a second surface of the flow cap component. In some examples, the flow channel portion and the first surface of the sensor component may form a first portion of the flow channel.

In some examples, the flow cap component may comprise a first opening and a second opening. In some examples, the first opening and the second opening may be connected to the flow channel portion on the second surface of the flow cap component.

In some examples, the flow cap component may be configured to receive a flowing media, such as a fluid, a liquid, a suspension, or the like, through the first opening. In some examples, the flowing media may travel through the flow channel. In some examples, the flowing media may exit the flow cap component through the second opening.

In some examples, the first portion of the flow channel may comprise a plurality of sidewalls extending along a central axis of the flow channel.

In some examples, a portion of a second surface of the flow cap component may be bonded to a third surface of an attachment component. In some examples, a fourth surface of the attachment component may be bonded to a portion of the first surface of the sensor component. In some examples, the flow cap component, the sensor component, and the attachment component may form a first portion of a flow channel.

In some examples, at least one thermal sensing element may comprise a first thermal sensing element and a second thermal sensing element. In some examples, the second thermal sensing element may be disposed in a downstream direction from first thermal sensing element.

In some examples, the flow cap component may comprise a cavity portion on a third surface of the flow cap component opposite of the second surface. In some examples, the heating element may be in contact with the cavity portion.

In some examples, at least one thermal sensing element may comprise at least one thermopile element. In some examples, the sensor component may further comprise an insulator layer disposed between at least one plate element and at least one thermopile element.

In some examples, at least one thermal sensing element may comprise at least one resistor element. In some examples, the sensor component may further comprise an insulator layer disposed between at least one plate element and at least one resistor element.

In some examples, the example flow sensing device may comprise one or more first thermal sensing elements disposed a first distance from a heating element. In some examples, a first voltage differential may be established between an inlet and an outlet of the one or more first thermal sensing elements based on changes in temperature.

In some examples, the example flow sensing device may comprise one or more second thermal sensing elements disposed a second distance from the heating element. In some examples, the second distance may be greater than the first distance. In some examples, a second voltage differential may be established between an inlet and an outlet of the one or more second thermal sensing elements based on changes in temperature.

In some examples, the first and second voltage differentials are indicative of a flow rate of a fluid in a flow channel disposed adjacent to the heating element, the one or more first thermal sensing elements, and the one or more second thermal sensing elements.

In some examples, the one or more first thermal sensing elements and the one or more second thermal sensing elements are disposed on a same side of the heating element. In some examples, the one or more first thermal sensing elements and the one or more second thermal sensing elements are all positioned either upstream or downstream of the heating element.

In some examples, the flow sensing device may further comprise circuitry configured to at least: determine a sum the first and second voltage differentials; and compare said sum of the first and second voltage differentials to a calibration curve, said calibration curve relating a plurality of summed voltage differentials to respective flow rates.

In some examples, the flow sensing device may further comprise a flow cap component at least partially defining said flow channel, wherein the flow channel is configured to transport the fluid therethrough, the flow channel being disposed along a first axis.

In some examples, the flow sensing device may further comprise a heating element that is configured to release a predetermined amount of thermal energy. In some examples, the heating element may be disposed along a second axis at least substantially perpendicular to the first axis.

In some examples, the one or more first thermal sensing elements or the one or more second thermal sensing elements may comprise at least one from among: a resistor, a resistive bridge, a resistive Wheatstone bridge, a diode, a thermocouple, or a thermopile.

In some examples, the one or more first thermal sensing elements are positioned said first distance from the heating element in an upstream direction relative to a flow direction of the fluid in the flow channel and the one or more second thermal sensing elements are positioned a second distance from the heating element in the upstream direction relative to the flow direction of the fluid in the flow channel. In some examples, the first and second distances from the heating element are different.

In some examples, the flow sensor may further comprise one or more third thermal sensing elements disposed the first distance from the heating element in a downstream direction relative to the flow direction of the fluid in the flow channel and one or more fourth thermal sensing elements disposed the second distance from the heating element in the downstream direction relative to the flow direction of the fluid in the flow channel.

In some examples, the flow sensor device may comprise a sensor component comprising a top surface and defining an inner cavity.

In some example, the flow sensor device may comprise a membrane disposed on a portion of the top surface of the sensor component, wherein the one or more first thermal sensing elements and the one or more second thermal sensing elements are disposed on or within the membrane.

In some examples, the flow sensor device may comprise a flow cap at least partially defining the flow channel. In some examples, the flow cap may be operably coupled to the sensor die such that the flow channel is adjacent said one or more first thermal sensing elements and said one or more second thermal sensing elements.

In some examples, each thermal sensing element of said one or more first thermal sensing elements and said one or more second thermal sensing elements may comprise a first thermocouple material operably coupled at a first end to a thermocouple contact, and a second thermocouple material operably coupled at a first end to the thermocouple contact.

In some examples, a second end of the first thermocouple material is positioned at said first distance from the heating element and a second end of the second thermocouple material extends beyond an edge of the membrane.

In some examples, the flow channel has a height or a diameter that is between about 1 µm and about 500 µm. in some examples, the flow sensor is configured to measure flow rates between about 0.5 mL/hour and about 1,000 mL/hour. In some examples, the heating element has a width between about 5 µm and about 100 µm. In some examples, the heating element has a length between about 50 µm and about 1,000 µm.

In some examples, the one or more first thermal sensing elements are configured to be electrically coupled to said one or more second thermal sensing elements. In some examples, the one or more first thermal sensing elements and the one or more second thermal elements are configured to be electrically coupled together in series.

In some examples, the first distance between the second end of the first thermocouple material and a center of the heating element is between about 25 µm and about 75 µm. In some examples, the second distance between the second end of the second thermocouple material and the center of the heating element is between about 125 µm and about 175 µm.

In some examples, the first distance between the second end of the first thermocouple material and the center of the heating element is between about 25 µm and about 70 µm, between about 25 µm and about 65 µm, between about 25 µm and about 60 µm, between about 25 µm and about 55 µm, between about 25 µm and about 50 µm, between about 25 µm and about 45 µm, between about 25 µm and about 40 µm, between about 25 µm and about 35 µm, between about 30 µm and about 75 µm, between about 35 µm and about 75 µm, between about 40 µm and about 75 µm, between about 45 µm and about 75 µm, between about 50 µm and about 75 µm, between about 55 µm and about 75 µm, and between about 60 µm and about 75 µm, inclusive of all values and ranges therebetween.

According to some examples, a flow sensor may be provided that comprises a flow cap component at least partially defining a flow channel. In some examples, the flow channel is configured to transport a fluid through the flow channel. In some examples, the flow channel may be disposed substantially along a first axis.

In some examples, the flow sensor may further comprise a sensor component comprising a top surface and defining an inner cavity. In some examples, the flow cap is operably coupled to at least a portion of the top surface of the sensor component.

In some examples, the sensor component may further comprise a heating element disposed on or within said sensor component. In some examples, the heating element may be disposed along a second axis at least substantially perpendicular to the first axis.

In some examples, the flow sensor may further comprise a first thermal sensing element disposed on or within said sensor component along said second axis and spaced a first distance in a first direction from the heating element. In some examples, a first output voltage is measurable at an outlet of the first thermal sensing element.

In some examples, the flow sensor may further comprise a second thermal sensing element disposed on or within said sensor component along said second axis and spaced a second distance in the first direction from the heating element, the second distance being greater than the first distance. In some examples, a second output voltage is measurable at an outlet of the second thermal sensing element.

In some examples, the flow sensor may further comprise a third thermal sensing element disposed on or within said sensor component along said second axis and spaced the first distance in a second direction from the heating element, the second direction being opposite the first direction. In some examples, a third output voltage is measurable at an outlet of the third thermal sensing element.

In some examples, the flow sensor may further comprise a fourth thermal sensing element disposed on or within said sensor component along said second axis and spaced the second distance in the second direction from the heating element. In some examples, a fourth output voltage is measurable at an outlet of the fourth thermal sensing element.

In some examples, a voltage differential is indicative of a flow rate of the fluid through the flow channel. In some examples, the voltage differential may comprise a differential between a sum of the first and second output voltages and a sum of the third and fourth output voltages.

In some examples, one or more of the first thermal sensing element, the second thermal sensing element, the third thermal sensing element, and the fourth thermal sensing element comprise at least one from among: a resistor, a resistive bridge, a diode, a resistive Wheatstone bridge, a thermocouple, or a thermopile.

In some examples, at least a portion of each of the first, second, third, and fourth thermal sensing elements is disposed on or in a membrane that is disposed on or in said sensor component, wherein each of the first, second, third, and fourth thermal sensing elements comprise a first thermocouple material operably coupled at a first end to a thermocouple contact, and a second thermocouple material operably coupled at a first end to the thermocouple contact.

In some examples, a second end of the first thermocouple material is positioned at said first distance from the heating element and a second end of the second thermocouple material extends beyond an edge of the membrane. In some examples, the first distance from the heating element is between about 1 μm and about 25 μm. In some examples, the second distance from the heating element is between about 50 μm and about 150 μm.

In some examples, the membrane may include one or more first materials and the sensor component may include one or more second materials. In some examples, the one or more first materials may be at least substantially thermally and/or electrically insulative. In some examples, the one or more second materials may be at least substantially thermally and/or electrically conductive. In some examples, the membrane itself may be at least substantially thermally and electrically insulative. In some examples, the heater element and the thermal sensing elements may be at least substantially thermally and electrically conductive. In some examples, the sensor die itself may be at least substantially thermally conductive.

In some examples, the flow channel has a height, a width, or a diameter that is between about 1 μm and about 500 μm. In some examples, the heating element has a width between about 5 μm and about 100 μm. In some examples, the heating element has a length between about 50 μm and about 1,000 μm.

In accordance with various examples of the present disclosure, an example method for measuring a flow rate of a fluid in a flow path may be provided.

In some examples, the method can comprise providing a first electrical current having a first voltage to a heating element positioned adjacent the flow path. In some examples, the heating element may be generally columnar or rectangular in shape and may be positioned perpendicular to the flow path.

In some examples, the method may further comprise providing a second electrical current having a second voltage to an inlet of a first thermal sensing element spaced a first distance from a long edge of the heating element.

In some examples, the method may further comprise providing a third electrical current having a third voltage to an inlet of a second thermal sensing element spaced a second distance from the long edge of the heating element. In some examples, the second distance is greater than the first distance.

In some examples, the first, second, and third voltages may be the same or different. In some examples, the second and third voltages may be the same while the first voltage may be different. In some examples, at least one of the first, second, and third voltages may be changed over time or during one or more different time periods. In other examples, at least one of the first, second, and third voltages may remain constant or substantially constant over time or during one or more different time periods.

In some examples, the method may further comprise measuring outlet voltages at respective outlets of the first and second thermal sensing elements.

In some examples, the method may further comprise determining the flow rate of the fluid in the flow path based upon said outlet voltages.

In some examples, the flow rate may be determined from the difference between the upstream thermopile voltages and the downstream thermopile voltages. For example, by comparing upstream and downstream voltages bi-directional flow rates can be obtained.

In some examples, for a flow sensor device comprises sense elements on one side of the heating element (e.g., only in the downstream direction), In some examples, when a flow sensor device comprises sense elements only on one side of the heating element, it may be beneficial to position sense elements downstream of the heating element versus upstream at least because the upstream temperature change may occur over a small flow rate change and often does not change further at higher flow rates or result in markedly different temperature changes at higher flow rates. Conversely, the downstream sensors may be capable of sensing temperature (and therefore flow rate) changes over a much larger temperature and flow rate range since they can be heated more than the upstream sensors loss. In some examples, it may be beneficial to include plural upstream sense elements and plural downstream sense elements.

In some examples, the first electrical current causes the heating element to transmit thermal energy towards the flow path, the first thermal sensing element, and the second thermal sensing element.

In some examples, the outlet voltages at said respective outlets of the first and second thermal sensing elements are indicative of the flow rate.

In accordance with various examples of the present disclosure, an example method for manufacturing a flow sensing device may be provided.

In some examples, the method may comprise providing a flow cap component partially defining a flow path oriented along a first axis.

In some examples, the method may further comprise providing a sensor component comprising a heating element, the heating element having a substantially rectangular or columnar form factor, the heating element being oriented along a second axis that is substantially orthogonal to the first axis, the sensor component further comprising at least a first thermal sensing element disposed a first distance from the heating element along the first axis and a second thermal sensing element disposed a second distance from the heating element along the first axis.

In some examples, the method may further comprise bonding the flow cap component to a first surface of the sensor component to form the flow channel therebetween.

In one example embodiment, an apparatus is provided for sensing a flow of fluid. The apparatus may comprise a flow sensing device comprising a heating structure having a centerline. The flow sensing device may further comprise a thermopile. At least a portion of the thermopile may be disposed over the heating structure. The thermopile may comprise a first thermocouple having a first thermocouple junction disposed upstream of the centerline of the heating structure. The thermopile may further comprise a second thermocouple having a second thermocouple junction disposed downstream of the centerline of the heating structure.

In another example embodiment, a method is provided for manufacturing an apparatus for sensing a flow of fluid. The method may comprise providing a heating structure having a centerline. The method may further comprise disposing at least a portion of a thermopile over the heating structure. The thermopile may comprise a first thermocouple having a first thermocouple junction disposed upstream of the centerline of the heating structure. The thermopile may further comprise a second thermocouple having a second thermocouple junction disposed downstream of the centerline of the heating structure.

In yet another example embodiment, an apparatus for sensing a flow of fluid. The apparatus may comprise a flow sensing device comprising a heating structure having a centerline. The flow sensing device may further comprise a first thermopile comprising a first plurality of thermocouples disposed upstream of the centerline of the heating structure. The first plurality of thermocouples may comprise a first subset of the first plurality of thermocouples aligned substantially parallel to the centerline of the heating structure. The first plurality of thermocouples may further comprise a second subset of the first plurality of thermocouples aligned substantially perpendicular to the centerline of the heating structure. The flow sensing device may further comprise a second thermopile comprising a second plurality of thermocouples disposed downstream of the centerline of the heating structure. The second plurality of thermocouples may comprise a third subset of the second plurality of thermocouples aligned substantially parallel to the centerline of the heating structure. The second plurality of thermocouples may further comprise a fourth subset of the second plurality of thermocouples aligned substantially perpendicular to the centerline of the heating structure.

In yet another example embodiment, a method is provided for manufacturing an apparatus for sensing a flow of fluid. The method may comprise providing a heating structure having a centerline. The method may further comprise disposing a first thermopile upstream of the centerline of the heating structure. The first thermopile may comprise a first plurality of thermocouples disposed upstream of the centerline of the heating structure. The first plurality of thermocouples may comprise a first subset of the first plurality of thermocouples aligned substantially parallel to the centerline of the heating structure. The first plurality of thermocouples may further comprise a second subset of the first plurality of thermocouples aligned substantially perpendicular to the centerline of the heating structure. The method may further comprise disposing a second thermopile downstream of the centerline of the heating structure. The second thermopile may comprise a second plurality of thermocouples disposed downstream of the centerline of the heating structure. The second plurality of thermocouples may comprise a third subset of the second plurality of thermocouples aligned substantially parallel to the centerline of the heating structure. The second plurality of thermocouples may further comprise a fourth subset of the second plurality of thermocouples aligned substantially perpendicular to the centerline of the heating structure.

In some example embodiments, a flow sensor is provided that comprises: a flow channel configured to transport a fluid therethrough, the flow channel being disposed along a first axis; a heating element disposed nearby the flow channel, wherein the heating element is configured to release a predetermined amount of thermal energy, a center of the heating element being disposed along a second axis at least substantially perpendicular to the first axis; one or more first thermal sensing elements disposed along the first axis a first distance from the center of the heating element, wherein changes in a voltage differential between an inlet and an outlet of the one or more first thermal sensing elements are indicative of changes in a temperature at the one or more first thermal sensing elements; and one or more second thermal sensing elements disposed along the first axis a second distance from the center of the heating element, the second distance being greater than the first distance, wherein changes in the voltage differential between an inlet and an outlet of the one or more second thermal sensing elements are indicative of changes in the temperature at the one or more second thermal sensing elements, wherein the flow sensor is configured to determine a flow rate of the fluid through the flow channel based upon an association between a sum of the first and second voltage differential and the flow rate of fluids through the flow channel.

In some embodiments, the one or more first thermal sensing elements and the one or more second thermal sensing elements are positioned upstream or downstream of the heating element.

In some embodiments, the flow sensor can further comprise circuitry configured to at least: determine a sum the first and second voltage differentials; and compare said sum of the first and second voltage differentials to a calibration curve, said calibration curve relating a plurality of summed voltage differentials to said flow rate of the fluid.

In some embodiments, the one or more first thermal sensing elements or said one or more second thermal sensing elements comprise at least one from among: a resistor, a resistive bridge, a diode, a resistive Wheatstone bridge, a thermocouple, or a thermopile.

In some embodiments, the one or more first thermal sensing elements are disposed said first distance from the center of the heating element in an upstream direction relative to a flow direction of the fluid in the flow channel, wherein said one or more second thermal sensing elements are disposed said second distance from the center of the heating element in the upstream direction relative to the flow direction of the fluid in the flow channel, and wherein the flow sensor further comprises: one or more third thermal sensing elements disposed the first distance from the center of the heating element in a downstream direction relative to the flow direction of the fluid in the flow channel; and one or more fourth thermal sensing elements disposed the second distance from the center of the heating element in a downstream direction relative to the flow direction of the fluid in the flow channel.

In some embodiments, the flow sensor may further comprise: a sensor component comprising a top surface and defining an inner cavity; and a membrane disposed on a portion of the top surface of the sensor component, wherein the one or more first thermal sensing elements and the one or more second thermal sensing elements are disposed on or within the membrane.

In some embodiments, each thermal sensing element of said one or more first thermal sensing elements and said one or more second thermal sensing elements comprise a first thermocouple material operably coupled at a first end to a thermocouple contact, and a second thermocouple material operably coupled at a first end to the thermocouple contact.

In some embodiments, the thermocouple contact is positioned said first distance from the center of the heating element, and wherein a second end of the first thermocouple material and a second end of the second thermocouple material extend beyond an edge of the membrane.

In some embodiments, the flow channel has a height or a diameter that is between about 1 μm and about 500 μm.

In some embodiments, the flow sensor is configured to measure flow rates between about 0.1 mL/hour and about 1,000 mL/hour.

In some embodiments, the heating element has a width between about 5 μm and about 100 μm, and wherein the heating element has a length between about 50 μm and about 1,000 μm.

In some embodiments, the one or more first thermal sensing elements are configured to be electrically coupled to said one or more second thermal sensing elements.

In some embodiments, the first distance is between about 25 μm and about 75 μm, and wherein said second distance from the heating element is between about 125 μm and about 175 μm.

According to another example embodiment, a flow sensor can be provided that comprises: a flow cap component at least partially defining a flow channel, wherein the flow channel is configured to transport a fluid therethrough, the flow channel being disposed substantially along a first axis; a sensor component comprising a top surface and defining an inner cavity, the flow cap being operably coupled to at least a portion of the top surface of the sensor component, the sensor component comprising: a heating element disposed on or within said sensor component, the heating element being disposed along a second axis at least substantially perpendicular to the first axis; a first thermal sensing element disposed on or within said sensor component along said second axis and spaced a first distance in a first direction from a center of the heating element, wherein a first output voltage is measurable at an outlet of the first thermal sensing element; a second thermal sensing element disposed on or within said sensor component along said second axis and spaced a second distance in the first direction from the center of the heating element, the second distance being greater than the first distance, wherein a second output voltage is measurable at an outlet of the second thermal sensing element; a third thermal sensing element disposed on or within said sensor component along said second axis and spaced the first distance in a second direction from the center of the heating element, the second direction being opposite the first direction, wherein a third output voltage is measurable at an outlet of the third thermal sensing element; and a fourth thermal sensing element disposed on or within said sensor component along said second axis and spaced the second distance in the second direction from the center of the heating element, wherein a fourth output voltage is measurable at an outlet of the fourth thermal sensing element, wherein a voltage differential between a sum of the first and second output voltages and a sum of the third and fourth output voltages is indicative of a flow rate of the fluid through the flow channel.

In some embodiments, one or more of the first thermal sensing element, the second thermal sensing element, the third thermal sensing element, and the fourth thermal sensing element comprise at least one from among: a resistor, a resistive bridge, a diode, a resistive Wheatstone bridge, a thermocouple, or a thermopile.

In some embodiments, at least a portion of each of the first, second, third, and fourth thermal sensing elements is disposed on or in a membrane that is disposed on or in said sensor component, wherein each of the first, second, third, and fourth thermal sensing elements comprise a first thermocouple material operably coupled at a first end to a thermocouple contact, and a second thermocouple material operably coupled at a first end to the thermocouple contact.

In some embodiments, a second end of the first thermocouple material is positioned the first distance from the center of the heating element, wherein a second end of the second thermocouple material is positioned the second distance from the center of the heating element, wherein said first distance is between about 25 µm and about 75 µm, and wherein said second distance is between about 125 µm and about 175 µm.

In some embodiments, the membrane comprises one or more first materials and the sensor component comprises one or more second materials, wherein the one or more first materials are substantially thermally insulative and the one or more second materials are substantially thermally conductive.

According to yet another example embodiment, a method can be carried out to measure a flow rate of a fluid in a flow path. In some embodiments, the method can comprise: causing a heating element to emit a set amount of thermal energy, the heating element being positioned substantially perpendicular to the flow path; providing a first electrical current having a first voltage to an inlet of a first thermal sensing element spaced a first distance from a central longitudinal axis of the heating element; providing a second electrical current having a second voltage to an inlet of a second thermal sensing element spaced a second distance from the central longitudinal axis of the heating element, the second distance being greater than the first distance; measuring outlet voltages at respective outlets of the first and second thermal sensing elements; and determining the flow rate of the fluid in the flow path based upon said outlet voltages, wherein the outlet voltages at said respective outlets of the first and second thermal sensing elements are indicative of the flow rate.

According to still another example embodiment, a method can be carried out to manufacture an example flow sensor device. In some embodiments, the method can comprise: providing a flow cap component partially defining a flow path oriented along a first axis; providing a sensor component comprising a heating element, the heating element being oriented substantially along a second axis that is substantially orthogonal to the first axis, the sensor component further comprising a first thermal sensing element disposed a first distance from the heating element along the first axis and a second thermal sensing element disposed a second distance from the heating element along the first axis; and bonding the flow cap component to a first surface of the sensor component to form the flow channel therebetween.

The foregoing illustrative summary, as well as other exemplary objectives and/or advantages of the disclosure, and the manner in which the same may be accomplished, may be further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise. For example, the dimensions of some of the components or elements may be exaggerated relative to other components or elements, unless described otherwise. Examples incorporating teachings of the present disclosure are shown and described with respect to the figures presented herein, in which.

DETAILED DESCRIPTION OF THE INVENTION

Figure 1A:
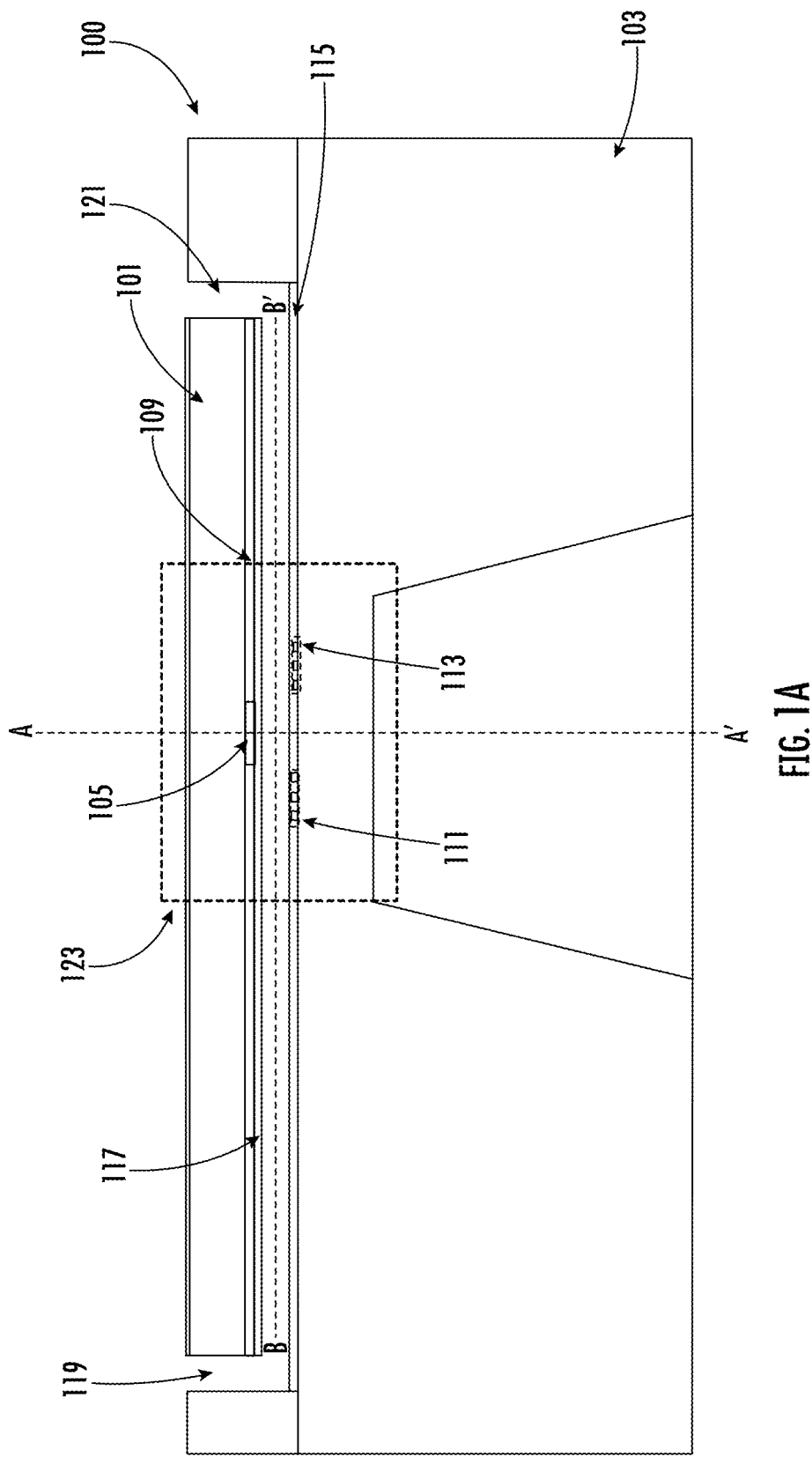
FIG. 1A illustrates a cross sectional view of an example flow sensing device, in accordance with examples of the present disclosure.

Some examples of the present disclosure will now be described more fully hereinafter with reference to the accompanying drawings, in which some, but not all examples of the disclosure are shown. Indeed, these disclosures may be embodied in many different forms and should not be construed as limited to the examples set forth herein; rather, these examples are provided so that this disclosure will satisfy applicable legal requirements. Like numbers refer to like elements throughout.

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "example" or "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In the present disclosure, the term "flow sensing device" refers to an apparatus that may detect, measure, and/or identify flow rate(s) (including, but not limited to, linear flow velocity, nonlinear flow velocity, mass flow rate, and/or volumetric flow rate) of a flowing media or medium. In the present disclosure, the term "flowing media" refers to a substance (such as, but not limited to, liquid substance and/or gaseous substance).

For example, an example flow sensing device may be implemented in an invasive or non-invasive drug delivery system to detect, measure, and/or identify the flow rate of a flowing media associated with the invasive or non-invasive drug delivery system. In such an example, an infusion pump may be implemented to deliver substance(s) (such as, but not limited to, fluids, medications and/or nutrients) into a patient's body in an invasive drug delivery system. The substance(s) may need to be delivered in controlled amounts. As such, an example flow sensing device may be implemented in the infusion pump to detect, measure, and/or identify the flow rate of substance(s) that may be delivered to the patient.

In various examples, the flow rate of a flowing media may need to be preciously measured. Continuing from the infusion pump example above, the flow rate of the substance(s) may need to be delivered at a low rate based on the condition of the patient and/or the treatment for the patient. For example, the substance(s) may need to be delivered at less than 5 milliliters per hour. If the flow rate is not preciously measured, a patient may be over-dosed or under-dosed, which may result in injuries, casualties, and/or deaths. For example, in 2019, there were at least 21 deaths of patients in the United States that were known to be caused at least partially by over infusion of drugs in invasive drug delivery systems, which incurred at least seven million dollars cost.

To address challenges and limitations associated with measuring flow rates, various examples of the present disclosure may be provided. For example, various examples of the present disclosure may provide example flow sensing devices and example manufacturing methods for providing example flow sensing devices.

In some examples, an example flow sensing device comprise a heating element disposed on an opposite side of the thermal sensing elements from the flow channel. In such examples, the thermal sensing elements may be heated directly by the heating element and the flowing media in the flow channel may act as a heat sink on an opposite side of the thermal sensing elements.

In some examples, an example flow sensing device may separate the heating element of the flow sensing device from the thermal sensing elements of the flow sensing device. For example, the heating element and the thermal sensing element may be disposed on opposite sides of the flow channel. In such examples, the thermal sensing elements may not be heated to the elevated temperature of the heating element, but instead are directly heated by the flowing media.

Additionally, or alternatively, one or more plate elements (such as temperature uniformity plates) may be disposed such that they at least partially overlap with the thermal sensing elements to, for example, but not limited to, improve output signal and sensitivity.

As such, some examples of the present disclosure may, for example but not limited to, improve performance, sensitivity, accuracy, and/or drift of a flow sensing device, and/or may enable measurement of flow rate in infusion pumps of an invasive drug delivery system.

Referring now to FIG. 1A-1E, example views of at least a portion of an example flow sensing device 100 are illustrated.

In particular, FIGS. 1A-1D illustrate example cross sectional views of at least a portion of the example flow sensing device 100, according to various embodiments of the present disclosure. FIG. 1E illustrates an example top view of at least a portion of an example flow sensing device 100. For example, the example cross sectional view of FIGS. 1A-1D may be taken from the plane defined by the axis C-C'.

Shown in FIGS. 1A-1D are various examples of the flow sensing device 100 that may comprise a flow cap component 101 and a sensor component 103.

In the present disclosure, the term "component" refers to an article, a device, or an apparatus that may comprise one or more surfaces, portions, layers and/or elements. For example, an example component may comprise one or more substrates that may provide underlying layer(s) for the component, and may comprise one or more elements that may be disposed within and/or on top of the substrate. In the present disclosure, the term "element" refers to an article, a device, or an apparatus that may provide one or more functionalities.

For example, the flow cap component 101 may comprise material such as, but not limited to, silicon, glass, polymer, and/or plastic. Additionally, or alternatively, the sensor component 103 may comprise material such as, but not limited to, silicon, glass, polymer, and/or plastic.

In some embodiments, the flow cap component 101 may comprise one or more heating elements, such as, but not limited to, a heating element 105.

In the present disclosure, the term "heating element" refers to an article, a device, or an apparatus that may impart heat, increase its temperature, and/or elevate the temperature of the environment surrounding and/or neighboring the heating element. For example, the heating element 105 may comprise a coil, a ribbon (including but not limited to, straight ribbon, corrugated ribbon), a plate, a wire strip, and/or a layer that may be connected to an electrical power source. In some examples, the heating element may comprise various geometries, including but not limited to a meander, a meander with rounded corner, an S-shaped, an S-shaped rounded corner, a double spiral, a double spiral with rounded corner, a double spiral with irregular spacings, a plane plate with central square hole, a circular, a drive wheel, an elliptical, a honeycomb, or an irregular. When the electrical power source is turned on, electric current may flow through the coil, the ribbon, the plate, the wire strip, and/or the layer, which may in turn convert electrical energy to heat energy.

In some examples, the heating element 105 may comprise nickel-based and/or iron-based material. For example, the heating element 105 may comprise one or more metal materials, such as nickel iron (NiFe) alloys, which may provide high temperature coefficients of electrical resistance. For example, the heating element 105 may comprise 81% nickel (Ni) and 19% iron (Fe). Additionally, or alternatively, the heating element 105 may comprise 60% Ni and 40% Fe.

In some examples, the heating element 105 may comprise platinum, e.g., platinum in the form of a thin film heater due to its high temperature coefficient of resistance (TCR). In some examples, copper alloys with low thermal conductivity, such as alloy 52, may also be used for the heating element 105.

While the description above provides some examples of heating elements, it is noted that the scope of the present disclosure is not limited to the description above. In some examples, an example heating element may comprise one or more additional and/or alternative element(s), one or more additional and/or alternative material(s), and/or may be in other form(s). For example, an example heating element may comprise material(s) such as, but not limited to, poly-silicon, platinum (Pt), Ni, nichrome (NiCr), $CrSi_2$. Additionally, or alternatively, an example heating element may include metals such as, but not limited to, Au, Pd, Mo, Ti, W, Hf, Zr, Cr and their silicide(s) and combinations thereof. Additionally, or alternatively, an example material for an example heating element may be selected from those that have near-zero to positive temperature coefficient of resistance.

While the description above provides an example flow cap component that comprises two heating elements, it is noted that the scope of the present disclosure is not limited to the description above. In some examples, an example flow cap component may comprise less than two or more than two heating elements.

Figure 1B:
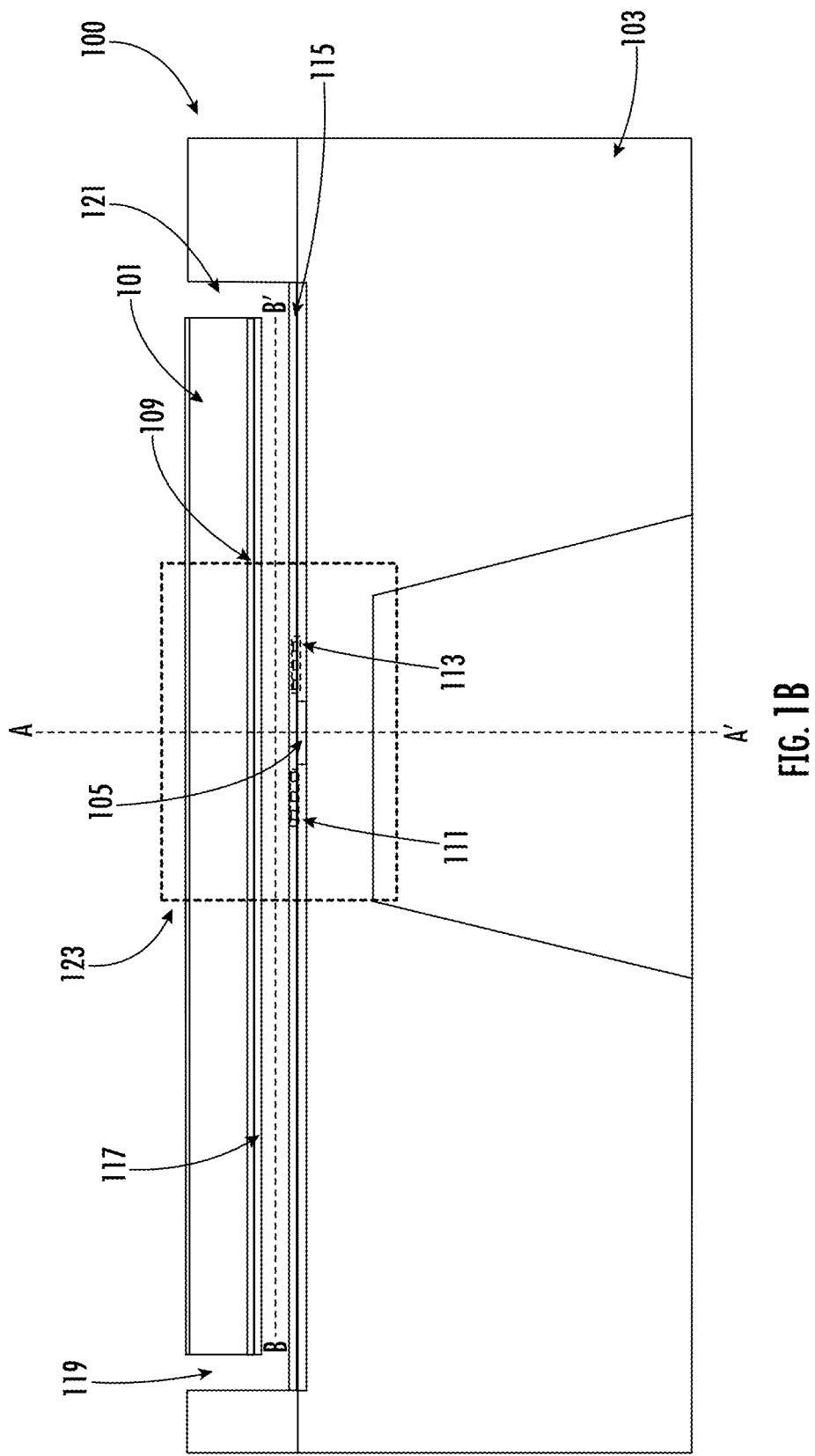
FIG. 1B illustrates a cross sectional view of an example flow sensing device, in accordance with examples of the present disclosure.
Figure 1C:
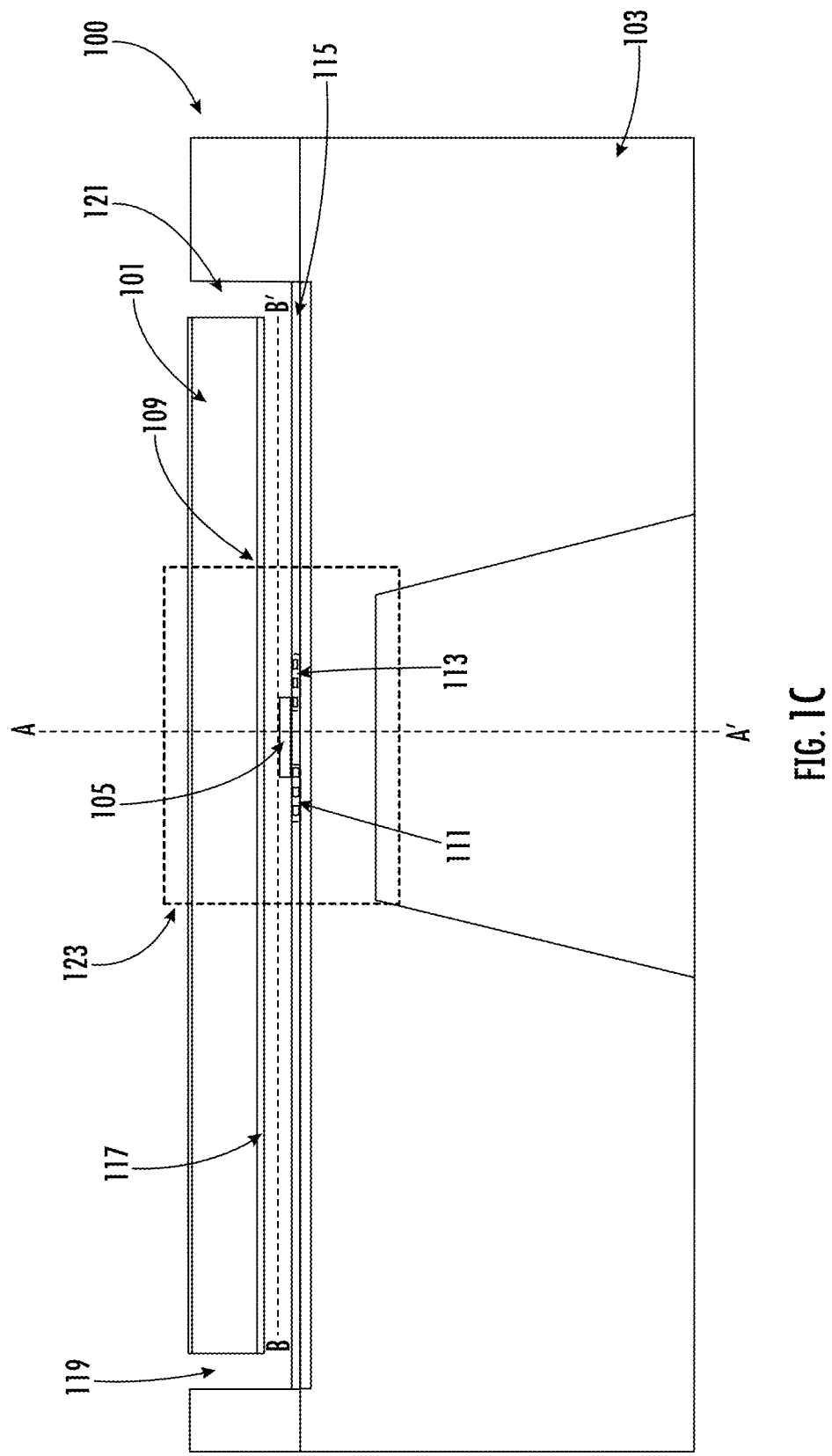
FIG. 1C illustrates a cross sectional view of an example flow sensing device, in accordance with examples of the present disclosure.

In the example shown in FIG. 1A, the heating element 105 may be disposed in a first layer 109 of the flow cap component 101. In the example shown in FIG. 1B, the thermal sensing elements 111, 113 may be disposed in the first layer 109 of the sensor component 103 and the heating element 105 may be disposed in the second layer 115 of the sensor component 103. In the example shown in FIG. 1C, the heating element 105 may be disposed in the first layer 109 of the sensor component 103 and the thermal sensing elements 111, 113 may be disposed in the second layer 115 of the sensor component 103.

While the example shown in FIG. 1A illustrates a single heating element, it is noted that an example of the present disclosure may comprise two or more heating elements.

Further, in various examples of the present disclosure, the flow cap component 101 may be an integral part of the example flow sensing device 100. For example, the example flow sensing device 100 may be etched to form a flow channel (as described further herein), and the flow cap component 101 may refer to a part of the example flow sensing device 100 that is above the flow channel.

In some examples, the first layer 109 of the flow cap component 101 may comprise material such as, not limited to, silicon nitride ($Si_3N_4$). For example, the first layer 109 may be an encapsulating layer. In some examples, the encapsulating layer may comprise other material(s), including but not limited to, silicon nitride, silicon oxide, silicon oxynitride, a polymer, or other electrically insulating thin films.

Figure 1D:
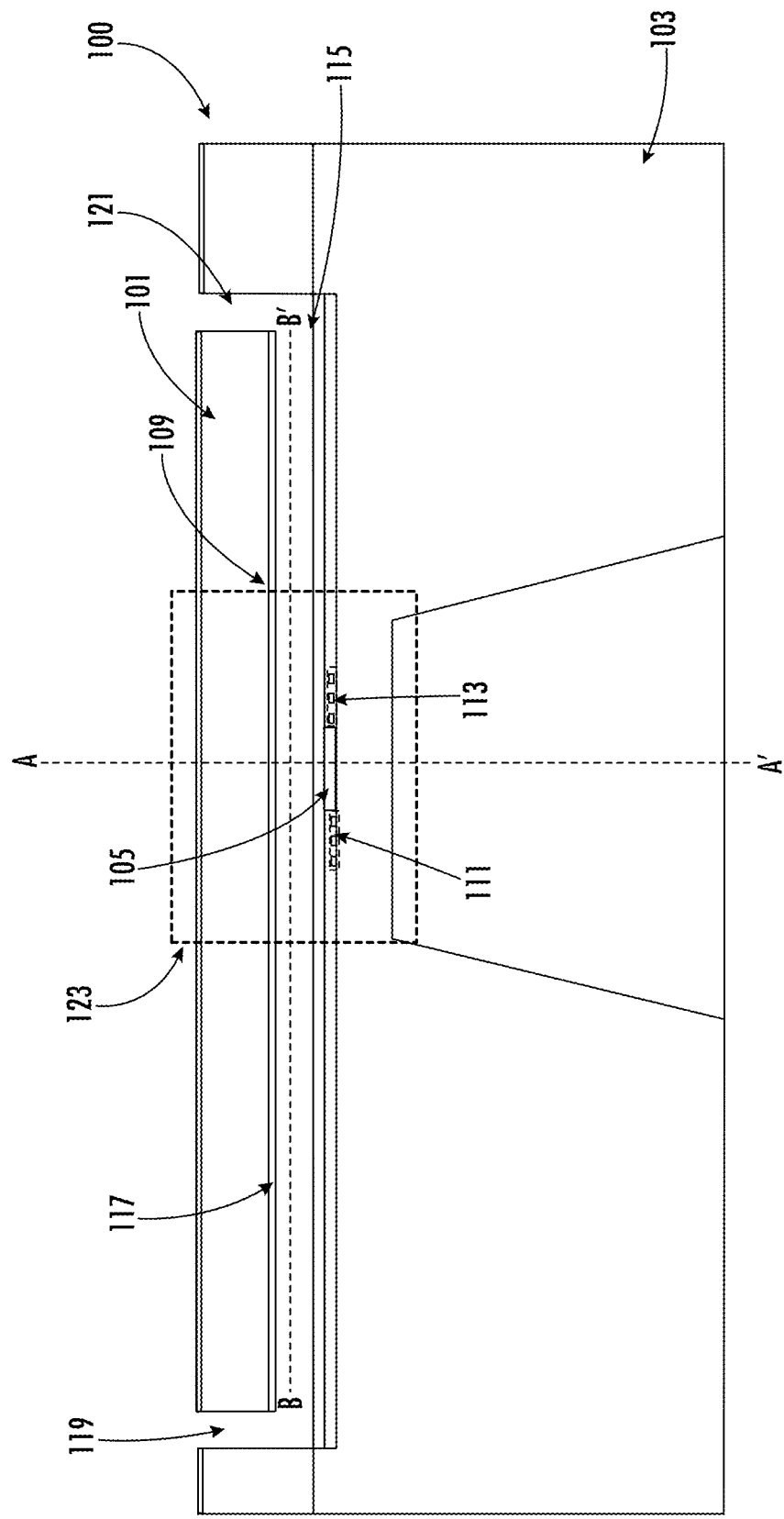
FIG. 1D illustrates a cross sectional view of an example flow sensing device, in accordance with examples of the present disclosure.
Figure 1E:
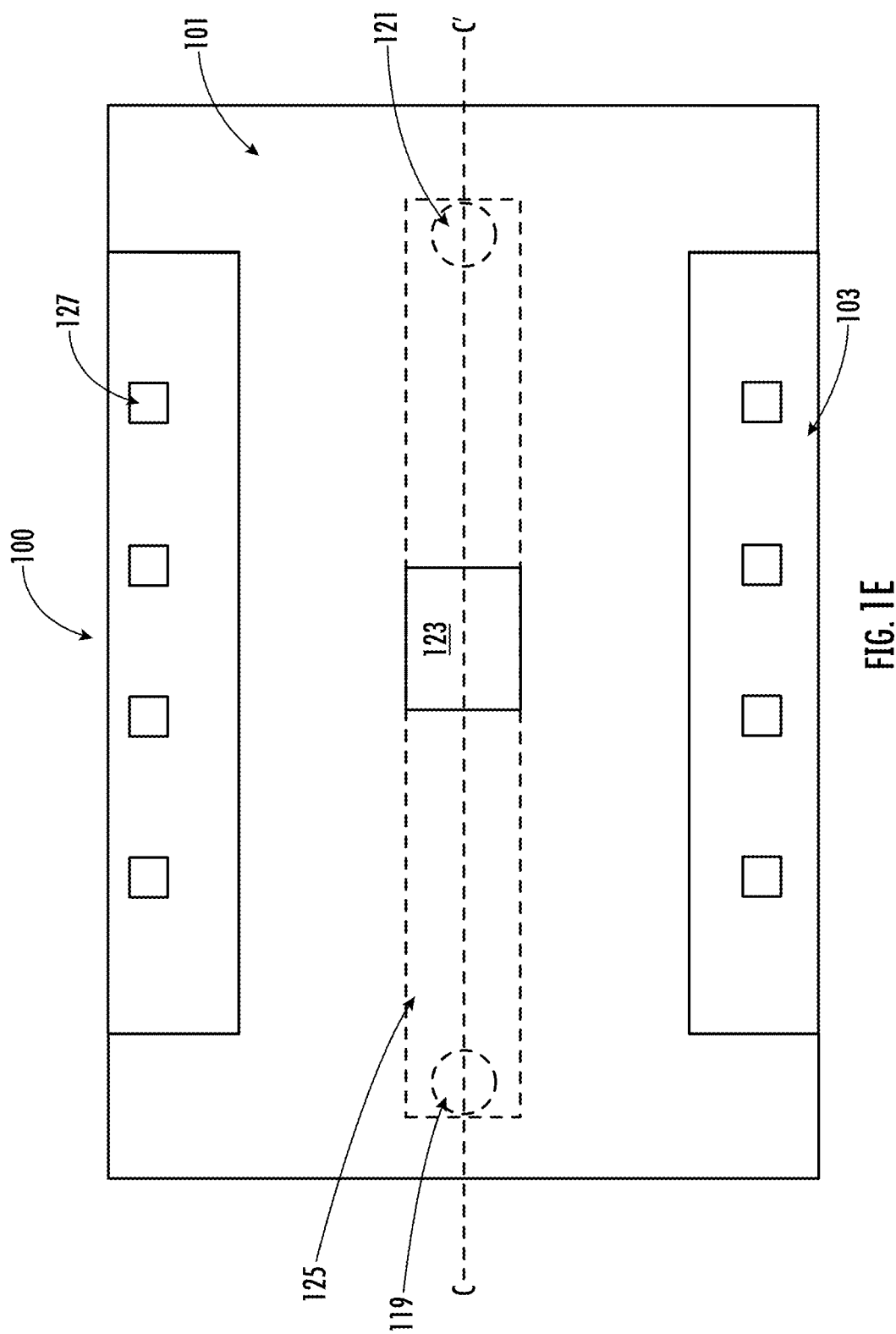
FIG. 1E illustrates a top view of at least a portion of an example flow sensing device in accordance with examples of the present disclosure.

In some examples, such as illustrated in FIG. 1D, the heater element 105 and the thermal sensing elements 111, 113 may be disposed in the same layer (e.g., 109) of the flow cap component 101 or may be disposed in the same layer of the sensor component 103.

Additionally, or alternatively, the flow cap component 101 and the sensor component 103 may comprise material that may have similar thermal coefficient of expansion (TCE).

In some examples, the heating element 105 may be electronically coupled to one or more other elements (for example, an electrical power source) based on techniques such as, but not limited to, through-glass via (TGV), through-silicon via (TSV), and/or aerosol or ink jet printing. As described herein, a "via" or "vias" can include an electrical connection between layers in a physical electronic circuit. Additionally, or alternatively, the heating element 105 may be electronically coupled to one or more other elements through other means.

Referring to FIG. 1A, the sensor component 103 may comprise one or more thermal sensing elements, such as, but not limited to, a first thermal sensing element 111 and a second thermal sensing element 113.

In the present disclosure, the term "thermal sensing element" refers to an article, a device, or an apparatus that may detect, measure, and/or identify the thermal level (for example, temperature) of the environment surrounding and/or neighboring the thermal sensing element. For example, the first thermal sensing element 111 and/or the second thermal sensing element 113 may comprise one or more thermopile element(s). In such an example, an example thermopile element may comprise one or more thermocouples connected in series or in parallel, which may detect, measure, and/or identify thermal energy, and may convert thermal energy into electrical energy and/or generate one or more electric signals based on the detected/measured/identified thermal energy.

While the description above provides some examples of thermal sensing elements, it is noted that the scope of the present disclosure is not limited to the description above. In some examples, an example thermal sensing element may comprise one or more additional and/or alternative element(s), one or more additional and/or alternative material(s), and/or may be in other form(s). For example, an example thermal sensing element may comprise at least one temperature sensing circuit, such as, but not limited to, resistors in a Wheatstone bridge circuit, or temperature sensitive diodes.

In the example of a Wheatstone bridge circuit, two resistor branches may be provided, and each resistor branch may comprise two resistor elements. As temperature may affect the electrical resistance of the resistor element, an example thermal sensing element may detect, measure, and/or identify the resistance change between the two resistor branches to determine the corresponding thermal energy.

While the description above provides an example sensor component that comprises two thermal sensing elements, it is noted that the scope of the present disclosure is not limited to the description above. In some examples, an example sensor component may comprise less than two or more than two thermal sensing elements.

In the example shown in FIG. 1A, the first thermal sensing element 111 and the second thermal sensing element 113 may be disposed in the second layer 115 of the sensor component 103. In some examples, the second layer 115 of the sensor component 103 may comprise material such as, not limited to, silicon nitride ($Si_3N_4$). Additionally, or alternatively, the second layer 115 of the sensor component 103 may comprise other material(s), including but not limited to, silicon nitride, silicon oxide, silicon oxynitride, a polymer, or other electrically insulating thin films.

In some examples, the second layer 115 may be an encapsulating layer that may protect the thermal sensing elements, which may comprise metals that may be corroded by moisture and other chemicals. In some examples, the second layer 115 may be electrically insulating.

In some examples, the first thermal sensing element 111 and/or the second thermal sensing element 113 may be electronically coupled to one or more other elements (for example, an electrical power source, a processor) based on techniques such as, but not limited to, through-glass via (TGV), through-silicon via (TSV), and/or aerosol or ink jet printing. Additionally, or alternatively, the first thermal sensing element 111 and/or the second thermal sensing element 113 may be electronically coupled to one or more other elements through other means.

In some examples, the first layer 109 of the flow cap component 101 and the second layer 115 of the sensor component 103 may be noncoplanar. In other words, the first layer 109 of the flow cap component 101 may not occupy the same plane as the second layer 115 of the sensor component 103.

As described above, the first layer 109 of the flow cap component 101 may comprise a heating element disposed within, and the second layer 115 of the sensor component 103 may comprise at least one thermal sensing element disposed within. Because the first layer 109 of the flow cap component 101 and the second layer 115 of the sensor component 103 may be noncoplanar, the heating element may be noncoplanar with at least one thermal sensing element. In the example shown in FIG. 1A, the heating element 105 may be coplanar and occupy a first plane, and the first thermal sensing element 111 and the second thermal sensing element 113 may be coplanar and occupy a second plane. The first plane may be parallel to the second plane.

As such, various examples of the present disclosure may separate the heating element 105 from the first thermal sensing element 111 and/or the second thermal sensing element 113. As such, the first thermal sensing element 111 and/or the second thermal sensing element 113 may not be heated to the elevated temperature of the heating element 105, and may be directly heated by the flowing media received by the flow sensing device 100 (details of which are described herein).

Referring back to FIG. 1A, in some examples, the flow cap component 101 may be bonded to a first surface of the sensor component 103 for form a flow channel. For example, the flow cap component 101 may be bonded to the first surface of the sensor component 103 via an adhesive material. Additionally, or alternatively, other bonding mechanisms may be used to bond the flow cap component 101 to the sensor component 103, including but not limited to, oxide glass sealing, anodic bonding, thermoelectric bonding, fusion bonding, metal brazing, direct bonding, and/or the like.

In some examples, the flow cap component 101 may comprise a flow channel portion 117 on a second surface of the flow cap component 101. In the example shown in FIG. 1A, the surface of the flow channel portion 117 may be recessed from the surrounding surface of the flow cap component 101. As described above, the flow cap component 101 may be bonded to a first surface of the sensor component 103. In some examples, the flow channel portion 117 of the flow cap component 101 and the first surface of the sensor component 103 may form at least a first portion of a flow channel.

In the present disclosure, the term "flow channel" refers to a passageway where flowing media may travel. In some examples, a flow channel may be the void created within the flow cap component 101 and the area on the sensor component 103 bounded by the void in the flow cap component 101 when these are placed in intimate contact. As will be described in detail further herein, an example flow channel of the present disclosure may be defined/formed by and/or comprise a plurality of sidewalls.

In some examples, the first layer 109 of the flow cap component 101 and the second layer 115 of the sensor component 103 may be separated by the flow channel. As such, various examples of the present disclosure may separate the heating element 105 from the first thermal sensing element 111 and/or the second thermal sensing element 113, and the first thermal sensing element 111 and/or the second thermal sensing element 113 may not be heated to the elevated temperature of the heating element 105.

In some embodiments, the flow cap component 101 may comprise a first opening 119 and a second opening 121. In some examples, the first opening 119 and the second opening 121 may be connected to the flow channel portion 117 on the second surface of the flow cap component.

In some examples, the flow cap component 101 may be configured to receive a flowing media through the first opening 119. In some examples, the flowing media may travel through the flow channel, and may exit the flow cap component 101 through the second opening 121.

In some examples, the flowing media may travel through a sensing region 123 that may comprise the heating element 105 the first thermal sensing element 111 and the second thermal sensing element 113. For example, the first thermal sensing element 111 may be positioned in an upstream direction from the heating element 105. The second thermal sensing element 113 may be positioned in a downstream direction from the heating. In such examples, the first thermal sensing element 111 may detect a first temperature of the flowing media. Subsequently, the flowing media may be heated by the heating element 105, which may increase the temperature of the flowing media by a predetermined amount. Subsequently, the second thermal sensing element 113 may detect a second temperature of the flowing media.

As the flow rate of the flowing media increases, more heat may be lost as the flowing media travels from the heating element 105 to the second thermal sensing element 113. By comparing the difference between the first temperature and the second temperature with the predetermined amount, a flow rate of the flowing media may be calculated.

Referring now to FIG. 1B, an example side view of at least a portion of an example flow sensing device 100 is illustrated. In some examples, many of the components, structures, configurations, and functionalities of the flow sensing device 100 illustrated in FIG. 1B may be similar or substantially similar to those described above with regard to the flow sensing device illustrated in FIG. 1A, however the heating element 105 may be disposed on or within the sensor component 103 instead of the flow cap component 101. As such, the illustrated flow sensing device 100 in FIG. 1B may comprise elements or components described above with regard to FIG. 1A, which are not described again with regard to FIG. 1B for the sake of brevity. One of skill in the relevant art will understand that many configurations an positions are possible for the heating element 105 while still allowing the flow sensor device 100 to operate as described herein. For instance, as illustrated in FIG. 1B, the thermal sensing elements 111, 113 may be disposed in a first layer 109 of the sensor component 103 while the heating element 105 may be disposed in a second layer 115 of the sensor component 103 opposite the first layer 109 from the flow channel 119.

Referring now to FIG. 1C, an example side view of at least a portion of an example flow sensing device 100 is illustrated. In some examples, many of the components, structures, configurations, and functionalities of the flow sensing device 100 illustrated in FIG. 1C may be similar or substantially similar to those described above with regard to the flow sensing device illustrated in FIG. 1A, however the heating element 105 may be disposed on or within the sensor component 103 instead of the flow cap component 101. As such, the illustrated flow sensing device 100 in FIG. 1C may comprise elements or components described above with regard to FIG. 1A, which are not described again with regard to FIG. 1C for the sake of brevity. One of skill in the relevant art will understand that many configurations an positions are possible for the heating element 105 while still allowing the flow sensor device 100 to operate as described herein. For instance, as illustrated in FIG. 1C, the thermal sensing elements 111, 113 may be disposed in the second layer 115 of the sensor component 103 while the heating element 105 may be disposed in the first layer 109 of the sensor component 103, the second layer 115 being opposite the first layer 109 from the flow channel 119.

Referring now to FIG. 1D, an example side view of at least a portion of an example flow sensing device 100 is illustrated. In some examples, many of the components, structures, configurations, and functionalities of the flow sensing device 100 illustrated in FIG. 1D may be similar or substantially similar to those described above with regard to the flow sensing device illustrated in FIG. 1A, however the heating element 105 may be disposed on or within the sensor component 103 instead of the flow cap component 101. As such, the illustrated flow sensing device 100 in FIG. 1D may comprise elements or components described above with regard to FIG. 1A, which are not described again with regard to FIG. 1D for the sake of brevity. One of skill in the relevant art will understand that many configurations an positions are possible for the heating element 105 while still allowing the flow sensor device 100 to operate as described herein. For instance, as illustrated in FIG. 1D, the thermal sensing elements 111, 113 and heating element 105 may be disposed in the same layer (e.g., 109) such that the heating element 105 and thermal sensing elements 111, 113 are coplanar or substantially coplanar.

Referring now to FIG. 1E, an example top view of the at least a portion of an example flow sensing device 100 is illustrated. The top view of the at least a portion of the example flow sensor device 100; may provide for a clearer illustration of one possible position for thermal sensor elements within the flow sensor device 100. In some examples, a flow cap component 101 may be joined with a sensor component 103 to form the flow sensor device 100. In some examples, the flow cap component 101 may define a flow channel 125. In other examples, the flow channel 125 may be defined in part by the flow cap component 101 and in part by the sensor component 103 such that when the flow cap component 101 is joined, coupled, adhered, or otherwise disposed to a top surface of the sensor component 103 the flow channel 125 is at least partially defined therebetween.

In some examples, a sensing region 123 may be defined or disposed along the flow channel 125, adjacent the flow channel 125, above the flow channel 123, below the flow channel 125, or otherwise nearby the flow channel 125. In some examples, the sensing region 123 may comprise a first thermal sensor element (not shown) and a second thermal sensor element (not shown). The first and second thermal sensing elements may be referred to herein as "the thermal sensing elements."

In some examples, the sensing region 123 may further comprise a heating element (not shown) configured to at least heat the flow channel and media therein. In some examples, the heating element may be disposed on or in one or more of the flow cap component 101 or the sensor component 103. In some examples, the heating element may be rectangular, columnar, generally planar, or otherwise dimensioned. In some embodiments, a length of the heating element may be greater than a width of the heating element, e.g., about two times greater, about three times greater, about four times greater, and the like. In some examples, the sensing region 123 may be positioned such that the heating element is at least partially disposed above or below the flow channel 125. In some embodiments, the heating element may be oriented in the sensing region 123 such that the length of the heating element is substantially perpendicular to a direction of flow of the media within the flow channel 125.

In some embodiments, a center line of the heating element (e.g., A-A' from FIGS. 1A-1D) may demarcate where an upstream portion of the flow channel 125 ends and a downstream portion of the flow channel 125 starts.

In some embodiments, the thermal sensing elements may be disposed on or in the flow cap component 101 or may be disposed on or in the sensor component 103. In some examples, the thermal sensing elements may be disposed above, below, adjacent, or otherwise nearby the flow channel 125 and the heating element. In some examples, the thermal sensing elements may be disposed one or more set distances from the heating element along the length of the heating element. In some examples, the first thermal sensing element may be disposed a first distance from the heating element while the second thermal sensing element may be disposed a second distance from the heating element, the second distance being greater than the first distance.

In some examples, the thermal sensing elements may comprise a first end comprising an electrical current input and a second end comprising an electrical current output. In some embodiments, the thermal sensing elements may comprise one or more materials that are configured to affect one or more properties of an electrical current transmitted therethrough based upon a temperature of the one or more materials. Said otherwise, the thermal sensing elements may be heated at least in part by the heating element such that the temperature of the one or more materials changes as the magnitude of conducted heat between the heating element and the thermal sensing elements changes. The one or more properties of the electrical current may comprise a voltage or the like. In some examples, the one or more materials can be chosen so that the voltage of the electrical current at the output of the thermal sensing elements is indicative of a temperature of the one or more materials.

In some examples, the thermal sensing elements may be calibrated to a predetermined or known one or more temperatures, a predetermined or known one or more input electrical currents to the heating element, a predetermined or known characteristic (e.g., voltage) of one or more input electrical currents to the thermal sensing elements, and/or a predetermined or known one or more flow rates through the flow channel 125. In some examples, a first known and constant flow rate of media through the flow channel 125 is maintained, a first electrical current having a known voltage is applied to an input of the heating element, a second electrical current having a known voltage is applied to an input of the first thermal sensing element, a third electrical current having a known voltage is applied to an input of the second thermal sensing element, and the voltage of the output electrical current from the first and second thermal sensing elements is measured to determine respective voltages; then flow rate of media through the flow channel 125 is increased or decreased from the first known and constant flow rate to achieve a second known and constant flow rate, the same currents are applied to the inputs of the heating element and thermal sensing elements as was previously applied at the first known and constant flow rate, and the output voltages of the thermal sensing elements are again measured. Such an approach can be used for a plurality of different known and constant flow rates to create a calibration curve of output voltages from the thermal sensing elements to the flow rate of the media through the flow channel 125.

Other approaches may be used for calibrating the thermal sensing elements such that voltage or another characteristic of output current from the thermal sensing elements is predictably indicative of a change in temperature at the thermal sensing elements—and many such calibration approaches would be readily apparent to one of skill in the art in view of the present disclosure. In some examples, the thermal sensing elements may be calibrated before the flow sensor device 100 is assembled, once the flow sensor device 100 is assembled but before it is integrated into an infusion pumping system or the like, or once the flow sensor device 100 is integrated into an infusion pumping system or the like.

In some examples, the sensing region 123 may comprise a membrane or sensing layer that comprises a relatively thermally conductive material whereas a surrounding portion of the sensing region 123 and/or a surrounding portion of the flow cap component 101 or the sensor component 103 comprises a relatively thermally insulative material. In some embodiments, the thermal sensing elements may be disposed within or partially within the membrane or sensing layer of the sensing region 123. In some examples, the thermal sensing elements may be disposed only partially within the sensing region 123. Said otherwise, in some examples, a first portion of the thermal sensing elements may be disposed within the membrane or sensing layer and a second portion of the thermal sensing elements may extend beyond an outside edge of the membrane or sensing layer and into the surrounding portion of the sensing region 123 or a surrounding portion of the flow cap component 101 or the sensor component 103. Without wishing to be bound by any particular theory, by extending from the thermally conductive region of the sensing region 123 into the thermally insulative region of the sensing region 123 or into one of 101 or 103, the thermal sensing elements may output a current having a voltage that reflects a temperature differential between an inside of the sensing region 123 and an outside of the sensing region 123, which may help differentiate between contributions to the temperature measured by the thermal sensing elements that stem from environmental/ambient condition changes and contributions to the temperature measured by the thermal sensing elements that stem from the effective heating of the thermal sensing elements by the heating element, which is directly affected by the flow rate of the media (which acts as a heat sink) through the flow channel 125.

In some examples, the distance that the thermal sensing elements are spaced from the heating element may be chosen in order to achieve an acceptable accuracy of flow rate measurements across an acceptably wide range of flow rates and/or for a desired range of flow rates (e.g., low flow rates between about 1 μL/hour and about 1,000 μL/hour.) In some embodiments, the number of thermal sensing elements may also be chosen such that the accuracy of flow rate measurement for a desired flow rate range is achieved. In some examples, using only a single thermal sensing element may lead to a tailing off of accuracy or precision at some flow rates, such as low flow rates. In some examples, using two thermal sensing elements spaced at different distances from the heating element may lead to an increased accuracy at low flow rates or the like. Without wishing to be bound by any particular theory, the increased accuracy or precision at low flow rates or the like may be due to differences in peak accuracy for a closer thermal sensing element and peak accuracy for a further thermal sensing element. In some examples, a closer thermal sensing element may be more well suited for accurate and/or precise measurement of higher flow rates since a higher flow rate of media may increase the heat sink capacity of the media in the flow channel 125. In some examples, a further thermal sensing element may be more well suited for accurate and/or precise measurement of lower flow rates since a lower flow rate of media may decrease the heat sink capability of the media and differences in temperature may be more easily detected by the further positioned thermal sensing element.

In some examples, when the thermal sensing elements comprise thermopiles made up of a plurality of thermocouples, it may be helpful to use more thermocouples in a thermopile because the use of more thermocouples may increase the sensitivity of the thermopile to temperature changes, which can increase the sensitivity of the flow rate sensor. In some examples, e.g., for a digital sensor, this can improve accuracy in a number of bits that represent a measured voltage value.

In some examples, the flow cap component 101 may be bonded to a first surface of the sensor component 103 for form a flow channel. For example, the flow cap component 101 may be bonded to the first surface of the sensor component 103 via an adhesive material at one or more bonding pads 127 or the like. Additionally, or alternatively, other bonding mechanisms may be used to bond the flow cap component 101 to the sensor component 103, including but not limited to, oxide glass sealing, anodic bonding, thermoelectric bonding, fusion bonding, metal brazing, direct bonding, and/or the like.

In some examples, the flow cap component 101 may comprise a flow channel portion (not shown) on a second surface of the flow cap component 101. In some examples, the surface of the flow channel portion may be recessed from the surrounding surface of the flow cap component 101. As described above, the flow cap component 101 may be bonded to a first surface of the sensor component 103. In some examples, the flow channel portion of the flow cap component 101 and the first surface of the sensor component 103 may form at least a first portion of the flow channel.

In some examples, the flow channel may be the void created within the flow cap component 101 and the area on the sensor component 103 bounded by the void in the flow cap component 101 when these are placed in intimate contact. As will be described in detail further herein, an example flow channel of the present disclosure may be defined/formed by and/or comprise a plurality of sidewalls.

In some examples, a first layer of the flow cap component 101 and a second layer of the sensor component 103 may be separated by the flow channel. As such, various examples of the present disclosure may separate the heating element (not shown) from a first thermal sensing element (not shown) and/or a second thermal sensing element (not shown), and the first thermal sensing element and/or the second thermal sensing element may not be heated to the elevated temperature of the heating element.

In some embodiments, the flow cap component 101 may comprise a first opening 119 and a second opening 121. In some examples, the first opening 119 and the second opening 121 may be connected to the flow channel portion on the second surface of the flow cap component 101.

In some examples, the flow cap component 101 may be configured to receive a flowing media through the first opening 119. In some examples, the flowing media may travel through the flow channel 125, and may exit the flow cap component 101 through the second opening 121.

In some examples, the flowing media may travel through the sensing region 123 that may comprise the heating element, the first thermal sensing element, and the second thermal sensing element. For example, the first thermal sensing element may be positioned in an upstream direction from the heating element and the second thermal sensing element may be positioned in a downstream direction from the heating element. In some examples the first and second thermal sensing elements may both be positioned in an upstream direction or a downstream direction from the heating element. In some examples, the flow sensor device 100 may further comprise a third thermal sensing element and a fourth thermal sensing element. In some examples, the first and second thermal sensing elements may be positioned in an upstream direction from the heating element while the third and fourth thermal sensing elements may be positioned in a downstream direction from the heating element. In some examples, the first and third thermal sensing elements may be positioned a first distance from the heating element while the second and fourth thermal sensing elements may be positioned a second distance from the heating element. In some examples, the first distance from the heating element may be less than the second distance from the heating element. In some examples, the first thermal sensing element may be positioned a first distance from the heating element, the second thermal sensing element may be positioned a second distance from the heating element, the third thermal sensing element may be positioned a third distance from the heating element, and the fourth thermal sensing element may be positioned a fourth distance from the heating element, wherein the first, second, third, and fourth distances may each be different from the others. The second thermal sensing element may be positioned in a downstream direction from the heating. In some examples, the first thermal sensing element may detect a first temperature of the heating element, the second thermal sensing element may detect a second temperature of the heating element, the third thermal sensing element may detect a first temperature of the flowing media, and the fourth thermal sensing element may detect a second temperature of the flowing media. In some examples, the first thermal sensing element may detect a first temperature of the flowing media, the second thermal sensing element may detect a second temperature of the flowing media, the third thermal sensing element may detect a third temperature of the flowing media, and the fourth thermal sensing element may detect a fourth temperature of the flowing media.

In some examples, the heating element may be deactivated or not activated and a first temperature of the flowing media may be measured by one or more of the thermal sensing elements. Subsequently, the heating element may be activated and the flowing media may be heated by the heating element, which may increase the temperature of the flowing media by a predetermined amount or which may be heated by changing the current going to the heating element. Subsequently, one or more of the thermal sensing elements may detect a second temperature of the flowing media. As the flow rate of the flowing media increases, more heat may be lost as the flowing media travels from the heating element to the second thermal sensing element. By comparing the difference between the first temperature and the second temperature, a flow rate of the flowing media may be calculated.

In the example shown in FIG. 1E, the flow cap component 101 may be disposed on the first surface of the sensor component 103. As described above, the first opening 119 of the flow cap component 101 may receive an example flowing media of the flow sensing device 100. The flowing media may travel through the flow channel 125 (including the sensing region 123), and may exit the flow sensing device 100 through the second opening 121 of the flow cap component 101.

In some examples, the sensor component 103 may comprise one or more bonding pads (for example, bonding pad 127). In some examples, the flow cap component 101 may isolate the bonding pads 127 from the flow channel 125, e.g., to protect them from the liquid and to make the bonding pads 127 accessible for wire bonding.

In some examples, a first tube may be connected to a first end of the flow channel and a second tube may be connected to a second end of the flow channel, such that an example flowing media may enter the example flow sensing device through one of the tubes, travel through the flow channel, and exit the example flow sensing device from the other tube. In some examples, the first tube and/or the second tube may comprise material such as, but not limited to, silicon, glass, polymer, and/or plastic.

Referring back to any of FIGS. 1A-1D, as described above, the first portion of the flow channel may comprise a plurality of sidewalls. In some examples, the plurality of sidewalls may extend along a central axis of the flow channel. In various examples of the present disclosure, cross sections (e.g., along the axis A-A') of the flow channel may comprise various shapes.

In some examples, the heating element may be disposed on a thin film or a surface of a wafer for inclusion in, e.g., the sensor component 103. In some examples, the heating element may be microscopic in size. In some examples, the heating element may comprise a single metal strip or plural metal strips. In some examples, the heating element may comprise embedded wires or ribbons in one of the flow cap component 101 or the sensor component 103. In some examples, the heating element may comprise a coil, a ribbon, a plate, a wire strip, and/or a layer that may be connected to an electrical power source. When the electrical power source is turned on, electric current may flow through the coil, the ribbon, the plate, the wire strip, and/or the layer, which may in turn convert electrical energy to heat energy.

In some examples, the heating element may comprise nickel-based and/or iron-based material. For example, the heating element may comprise nickel iron (NiFe) alloys, which may provide high temperature coefficients of electrical resistance.

While the description above provides some examples of heating elements, it is noted that the scope of the present disclosure is not limited to the description above. In some examples, an example heating element may comprise one or more additional and/or alternative element(s), one or more additional and/or alternative material(s), and/or may be in other form(s).

While the description above provides an example flow cap component and/or sensor component that comprises one heating element, it is noted that the scope of the present disclosure is not limited to the description above. In some examples, an example flow cap component or sensor component may comprise two or more heating elements.

For example, thermal sensing elements may comprise one or more thermopile element(s). In such an example, an example thermopile element may comprise one or more thermocouples connected in series or in parallel, which may detect, measure, and/or identify thermal energy, and may convert thermal energy into electrical energy and/or generate one or more electric signals based on the detected/measured/identified thermal energy.

While the description above provides some examples of thermal sensing elements, it is noted that the scope of the present disclosure is not limited to the description above. In some examples, an example thermal sensing element may comprise one or more additional and/or alternative element(s), one or more additional and/or alternative material(s), and/or may be in other form(s). For example, an example thermal sensing element may comprise at least one temperature sensing circuit, such as, but not limited to, thermopiles, resistors, diodes, resistors in a Wheatstone bridge circuit, temperature sensitive diodes, or the like.

While the description above provides example sensor components that may comprise one, two, three, or four thermal sensing elements, it is noted that the scope of the present disclosure is not limited to the description above. In some examples, an example sensor component may comprise more than four thermal sensing elements. In some examples, an example sensor component may comprise more than two thermal sensing elements upstream of the heating element. In some examples, an example sensor component may comprise more than two thermal sensing elements downstream of the heating element. In some examples, an example sensor component may comprise a different number of thermal sensing elements upstream of the heating element than the number of thermal sensing elements downstream of the heating element. In some examples, two or more thermal sensing elements may be positioned upstream of the heating element while no thermal sensing elements are positioned downstream of the heating element. In some examples, two or more thermal sensing elements may be positioned downstream of the heating element while no thermal sensing elements are positioned upstream of the heating element. In some examples, the upstream and/or downstream thermal sensing elements may be electrically connected in series or in parallel.

In some examples, the thermal sensing elements may be disposed in a separate layer of the sensor component from the layer in which the heating element is located. In some examples, the separate layer of the sensor component comprising the thermal sensing elements may comprise one or more suitable material(s), including but not limited to, silicon nitride, silicon oxide, silicon oxynitride, a polymer, or other electrically insulating thin films. In some examples, the separate layer of the sensor component comprising the thermal sensing elements may be an encapsulating layer that may protect the thermal sensing elements, which may comprise metals that may be corroded by moisture and other chemicals. In some examples, the encapsulating layer may be electrically insulating.

In some examples, the thermal sensing elements may be electronically coupled to one or more other elements (for example, an electrical power source, a processor) based on techniques such as, but not limited to, through-glass via (TGV), through-silicon via (TSV), and/or aerosol or ink jet printing. Additionally, or alternatively, the thermal sensing elements may be electronically coupled to one or more other elements through other means.

In some examples, the flow cap component may comprise a first layer that comprises the heating element while the sensor component comprises a second layer that comprises the thermal sensing elements. In some examples, the sensor component may comprise both the first and second layers. In some elements, the first and second layers may be noncoplanar. In other words, the first layer comprising the heating element may not occupy the same plane as the second layer comprising the thermal sensor elements.

In accordance with various examples of the present disclosure, one or more plate elements may be disposed in an example sensor component of an example flow sensing device. In the present disclosure, the term "plate element" refers to a piece of material that may be in the form of a plate. In some examples, the plate elements may facilitate heat transfer from the flowing media in the flow channel to the sensing element in the sensor component. For example, at least one plate element may be disposed on a third layer of the example sensor component, and the at least one plate element may at least partially overlap with at least one thermal sensing element disposed in a second layer of the example sensor component.

Figure 2:
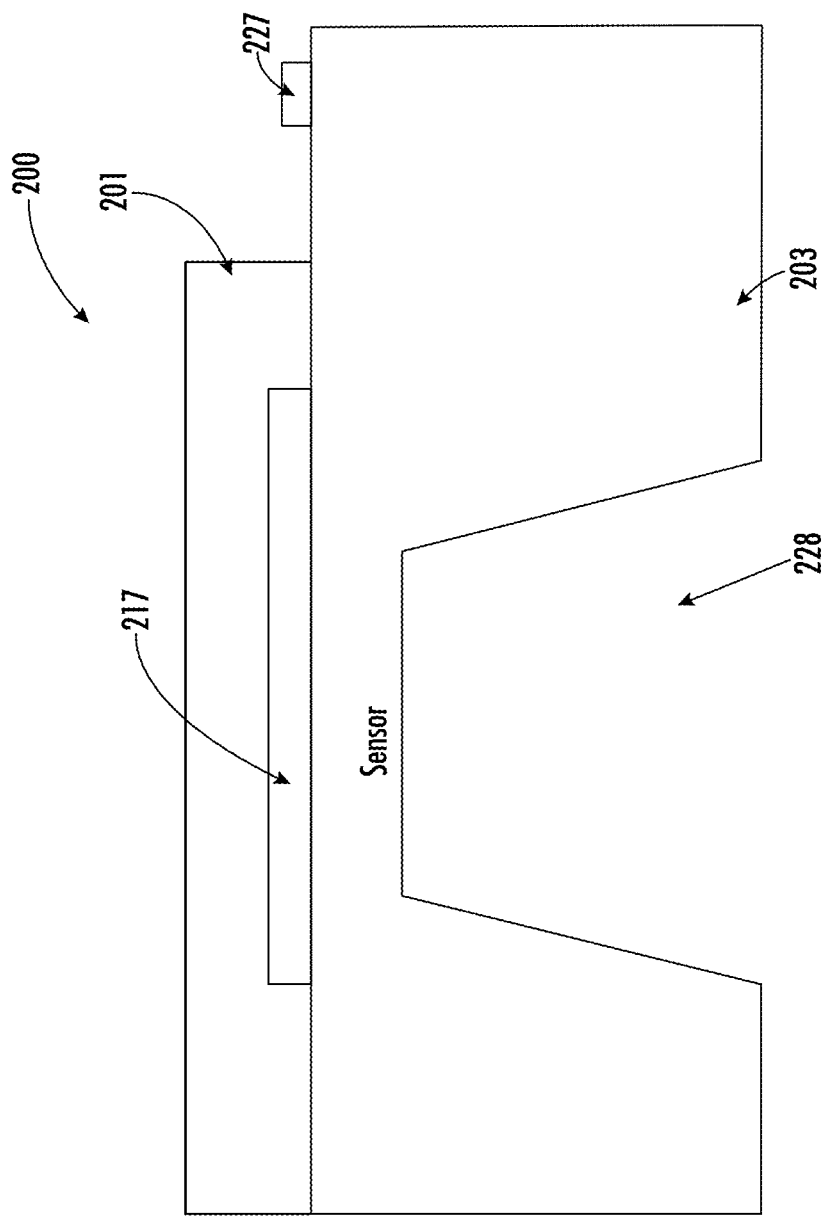
FIG. 2 illustrates a cross sectional view of at least a portion of an example flow sensing device, the cross sectional view is of a flow sensing device at least similar to the flow sensing device of FIG. 1A from a perspective of the flow sensing device rotated 90 degrees about axis A-A', in accordance with examples of the present disclosure.

Referring now to FIG. 2, a cross section of an example flow sensor device 200 is illustrated. In some examples, the flow sensor device 200 can comprise a flow cap component 201 and a sensor component 203. In some examples, the flow cap component 201 can be configured to be operably coupled to the sensor component 203. In some examples, the flow cap component 201 can be configured to be removably coupled, adhesively coupled, permanently coupled, affixed, joined, or otherwise disposed to at least a portion of a top surface of the sensor component 203. In some examples, the flow cap component 201 can define or partially define a flow path 217. In some examples, a portion of the top surface of the sensor component 203 can partially define the flow path 217. In some examples, a cavity 228 can be defined in at least a part of the sensor component 203. In some examples, the cavity 228 can be defined by an aperture in a bottom surface of the sensor component 203 where the bottom surface is opposite the top surface of the sensor component 203. In some examples, the cavity 228 can be formed by the removal of material from the sensor component 203. In some examples, the flow cap component 201 can be disposed to a first portion of the top surface of the sensor component 203 and one or more bonding pads 227 can be formed or disposed to a second portion of the top surface of the sensor component 203. In some examples, the one or more bonding pads 227 may be used to connect circuit elements to external circuitry, e.g., by way of wire bonding, pins, spring clips, or any other suitable electrical contacting means. In some examples, the one or more bonding pads 227 may be kept physically and/or thermally separated from heating elements or the like, such that the electrical connection with external circuitry or the like is not disrupted by the thermal energy emitted by the heating element. In some examples, the flow sensor device 200 may comprise one or more thermal sensor elements, which may comprise one or more thermopiles, resistors, or the like.

In various examples of the present disclosure, example dimensions of example cross sections of example flow channels may be in the microns to hundreds of microns in height and tens of microns to hundreds of microns in width. In various examples of the present disclosure, example flow channels may be greater than one hundred microns in length.

While the description above provides example dimensions of example flow channels, it is noted that the scope of the present disclosure is not limited to the description above. In some examples, example dimensions of example flow channels may have other values.

According to other embodiments, systems, apparatuses, and methods may be provided for increasing the accuracy of thermopile-based flow sensing devices and facilitating accurate measurement of low fluid flow rates. In some embodiments, by using a thermocouple or thermopile, the signal generated by the thermopile-based flow sensing device disclosed herein is a voltage source and is minimally responsive to film resistance. Without film resistance sensitivity, other sensitivities such as stress or magnetic resistance changes are negligible. Additional thermocouples give additional voltage, signal, and sensitivity, whereas a conventional resistive flow sensor does not have this advantage for sensitivity. In some instances, the thermopile structures may be fabricated on either a microbridge structure or a membrane structure. In some embodiments, the membrane structures disclosed herein may provide for the same thermopile structures as a microbridge plus additional structures not possible with a microbridge.

In some embodiments, the general flow for fabricating a thermopile flow sensor comprise:

a. Growing thermal silicon dioxide.
b. Depositing bottom silicon nitride. In some embodiments, silicon nitride dielectrics could be replaced with silicon dioxide, such as PECVD, tetraethoxysilane (TEOS), or sputter depositions for lower thermal conductivity.
c. Depositing and patterning resistive heater structure. The heater structure can be fabricated from, among other materials: silicon (including polysilicon); Pt; nichrome; permalloy; PtSi and other silicides; W; TiN; AlN; WN; any other suitable material; or any combination thereof.
d. Depositing silicon nitride interlayer dielectric.
e. Depositing and patterning first thermocouple material. Various thermocouple materials that may be used for the first thermocouple are discussed in greater detail herein.
f. Depositing interlayer dielectric. In some instances, this step may be optional depending on the materials used but may lead to higher yield. In some instances, if an interlayer dielectric is used it must be patterned to open vias to the underlying thermocouple material.
g. Depositing and pattern second thermocouple material. Various thermocouple materials that may be used for the second thermocouple are discussed in greater detail herein.
h. Depositing interlayer dielectic, pattern, and open vias to heater and thermopile connections.
i. Depositing metal (such as Al/1% Cu) and pattern to form lead-outs and bond pads.
j. Depositing overcoat silicon nitride and pattern to open bond pad regions.
k. Patterning back-side of wafer and use deep reactive ion etching (DRIE) to produce cavity below thermopile structure.

In some embodiments, the heater structure may be located above or below a single set of thermocouples (e.g., one thermopile), or above or below multiple sets of thermocouples, with one side located upstream of the heater structure and the other side located downstream of the heater structure. In these arrangements, the thermocouples do not sit on the silicon die. Rather, in some examples, the thermocouples are suspended over a cavity or reside on a membrane structure. In some embodiments, the set(s) of thermocouples may be collectively referred to as a thermopile. In some embodiments, the thermopile(s) may be placed on a thermally isolated structure, such as a bridge or a membrane, with the opposing thermocouples (e.g., cold junction, hot junction) oriented such that one set of junctions are upstream and the other set of junctions is downstream of the centerline of a heating element. In some examples, the flow sensor device 200 may comprise one or more thermopiles that are disposed entirely upstream of a center line of the heating element and one or more thermopiles that are disposed entirely downstream of the center line of the heating element.

In some embodiments, the heater structure may be located between two sets of thermocouples (e.g., two thermopiles), with one set of thermocouples located upstream of the heater structure and the other set of thermocouples located downstream of the heater structure. In these arrangements, there are parasitics and each set of thermocouples has one side on the bulk silicon die, which can float in temperature.

In some embodiments, the following equation may be used to characterize the thermopile-based flow sensing devices disclosed herein:

$$\Delta V = n \Delta S (\Delta T)$$

where $\Delta V$=potential difference; n=the number of thermocouples; S=Seebeck coefficient (also referred to as thermopower, thermoelectric power (TE), or thermoelectric sensitivity); $\Delta S = TE_1 - TE_2$ (the thermoelectric power of the first thermoelectric material—the thermoelectric power of the second thermoelectric material); T=temperature; and $\Delta T = T_1 - T_{ref}$ (the temperature at the measured thermoelectric junction(s)—the temperature at the reference thermoelectric junction(s)). In some instances, $T_1$ may be measured on the membrane structure using the downstream thermocouple junctions, and $T_{ref}$ may be measured on the bulk silicon using the downstream thermocouple junctions. In other instances, the relative temperature difference ΔT may be measured on the membrane structure using the upstream thermocouple junctions and the downstream thermocouple junctions without the use of a reference temperature, although in some instances the heater temperature is measured with separate thermocouples.

Although the disclosure describes the features of the thermopile-based flow sensing device disclosed herein with reference to a flow sensor, the thermopile-based flow sensing device disclosed herein may be used to test in any suitable sensor, detector, gauge, instrument, or application where precision heating or temperature detection is utilized, utilizable, or otherwise desirable.

In some embodiments, the heater structure may be located between three or more sets of thermocouples (e.g., three or more thermopiles), with at least one set of thermocouples located upstream of the heater structure and two or more other set of thermocouples located downstream of the heater structure, or at least one set of thermocouples located downstream of the heater structure and at least one set of thermocouples located upstream of the heater structure. In these arrangements, there may be parasitics and each set of thermocouples may have one side on the bulk silicon die, which can float in temperature.

In some embodiments, the following equation may be used to characterize the thermopile-based flow sensing devices disclosed herein:

$$\Delta V = n \cdot S \cdot (\Delta T) = n \cdot S \leq (T_A - T_0)$$

where ΔV=potential difference; n=the number of thermocouples; S=Seebeck coefficient (also referred to as thermopower, thermoelectric power (TE), or thermoelectric sensitivity); T=temperature; and $\Delta T = T_A - T_0$ (the temperature at the measured thermoelectric junction(s)—the temperature at the reference thermoelectric junction(s)). In some instances, $T_A$ may be measured on the membrane structure inside the sensing region 123, $T_0$ using the downstream thermocouple junctions, and may be measured on the bulk silicon using the downstream thermocouple junctions. In other instances, the relative temperature difference ΔT may be measured on the membrane structure using the upstream thermocouple junctions and the downstream thermocouple junctions without the use of a reference temperature. In some examples, the $T_A$ may be considered the active junction or the hot junction because it is affected by the heating element whereas the $T_0$ may be considered the reference junction or the cold junction because it is located outside the sensing region 123 and may be unaffected by the heating element.

In some embodiments, some example thermocouple materials may include at least one or more metals or inorganic components. For example, one or more thermocouple materials may be used to provide a thermocouple junction comprising an interface between a first thermocouple material and a second thermocouple material. In some embodiments, the number of thermocouple junctions in the thermopile of an example thermopile-based flow sensing device disclosed herein may depend (e.g., may be a function of) the Seebeck coefficients of the thermocouple materials in the thermocouples of the thermopile and the desired output voltage. The term "dS" refers to the difference between the Seebeck coefficients of the thermocouple materials in a thermocouple.

In some embodiments, the first thermocouple material may comprise polysilicon, and the second thermocouple material may comprise aluminum. In some embodiments, the first thermocouple material and the second thermocouple material may comprise differently doped polysilicon (e.g., n-type and p-type polysilicon). For example, the first thermocouple material may comprise n-type polysilicon (nPoly Si), and the second thermocouple material may comprise p-type polysilicon (pPoly Si). In another example, the first thermocouple material may comprise p-type polysilicon (pPoly Si), and the second thermocouple material may comprise n-type polysilicon (nPoly Si).

In some embodiments, the first thermocouple material may comprise a nickel-iron alloy (e.g., 60:40 NiFe, 80:20 NiFe), and the second thermocouple material may comprise chromium (Cr), where dS is about 65 uV/C for 60:40 NiFe and Cr or about 53 uV/C for 80:20 NiFe and Cr. In some embodiments, the first thermocouple material may comprise a nickel-iron alloy (e.g., 60:40 NiFe, 80:20 NiFe), and the second thermocouple material may comprise chromium disilicide ($CrSi_2$), where dS is about 105 uV/C for 60:40 NiFe and $CrSi_2$ or about 93 uV/C for 80:20 NiFe and $CrSi_2$. In some embodiments, the first thermocouple material may comprise a nickel-iron alloy (e.g., 60:40 NiFe, 80:20 NiFe), and the second thermocouple material may comprise rhenium disilicide ($ReSi_2$).

In some embodiments, the first thermocouple material may comprise chromium nitride (e.g., CrN), and the second thermocouple material may comprise copper (Cu), where dS is about 146 uV/C for CrN and Cu. In some embodiments, the first thermocouple material may comprise chromium nitride (e.g., CrN), and the second thermocouple material may comprise aluminum (Al), where dS is about 138 uV/C for CrN and Al. In some embodiments, the first thermocouple material may comprise a chromium nitride (e.g., CrN), and the second thermocouple material may comprise p-type polysilicon (pPoly Si), where dS is about 270 uV/C for CrN and pPoly Si.

In some embodiments, the first thermocouple material may comprise copper (Cu), and the second thermocouple material may comprise a copper-nickel alloy (e.g., Constantan).

In some embodiments, the thermopile-based flow sensing device disclosed herein may comprise any combination of components, structures, and features discussed with reference to the example thermopile-based flow sensing devices and other example thermopile-based flow sensing devices described herein, including the addition or omission of components, structures, and features.

In the example shown in FIG. 2, the example flow sensing device 200 may comprise a sensor component 203 and a flow cap component 201, similar to the sensor component 103 and the flow cap component 101 described above in connection with FIG. 1A and FIG. 1B.

For example, the flow cap component 201 may comprise material such as, but not limited to, silicon, glass, polymer, and/or plastic. Additionally, or alternatively, the sensor component 203 may comprise material such as, but not limited to, silicon, glass, polymer, and/or plastic.

For example, the flow cap component 201 may comprise a flow channel portion on a second surface of the flow cap component 201. The flow cap component 201 may be bonded to a first surface of the sensor component 203. In some examples, the flow channel portion of the flow cap component 201 and the first surface of the sensor component 203 may form at least a first portion of a flow channel 217.

In some examples, the first portion of the flow channel may be orthogonal to the central axis of the flow channel 217 and may have any suitable dimensions and any suitable form factor, such as a rectangular shape or a rectangular prism shape. For example, the flow channel portion of the flow cap component 201 may provide three sidewalls for the flow channel, where one of the sidewalls may be in an orthogonal arrangement with the other two sidewalls.

In some examples, the first portion of the flow channel 217 may comprise at least one rounded corner or rounded edge. For example, the flow channel portion of the flow cap component 201 may provide curved sidewall(s) for the flow channel 217. In some examples, at least one rounded corner or rounded edge may reduce bubble formations within the flow channel 217, and/or may reduce the impact on reading inaccuracies due to turbulence of flowing media in the flow channel 217.

In some examples, the flow cap component 201 may comprise material such as, but not limited to, silicon, glass, polymer, and/or plastic. Additionally, or alternatively, the sensor component 203 may comprise material such as, but not limited to, silicon, glass, polymer, and/or plastic.

While the description above provides example shapes of cross sections of the first portion of the flow channel, it is noted that the scope of the present disclosure is not limited to the description above. In some examples, an example cross section of the first portion of the flow channel may comprise one or more additional and/or alternative shapes, may include one or more protrusions, may comprise one or more concavities or convexities, may comprise one or more baffles or the like, and/or the first portion of the flow channel may be formed in additional and/or alternative ways.

Figure 3:
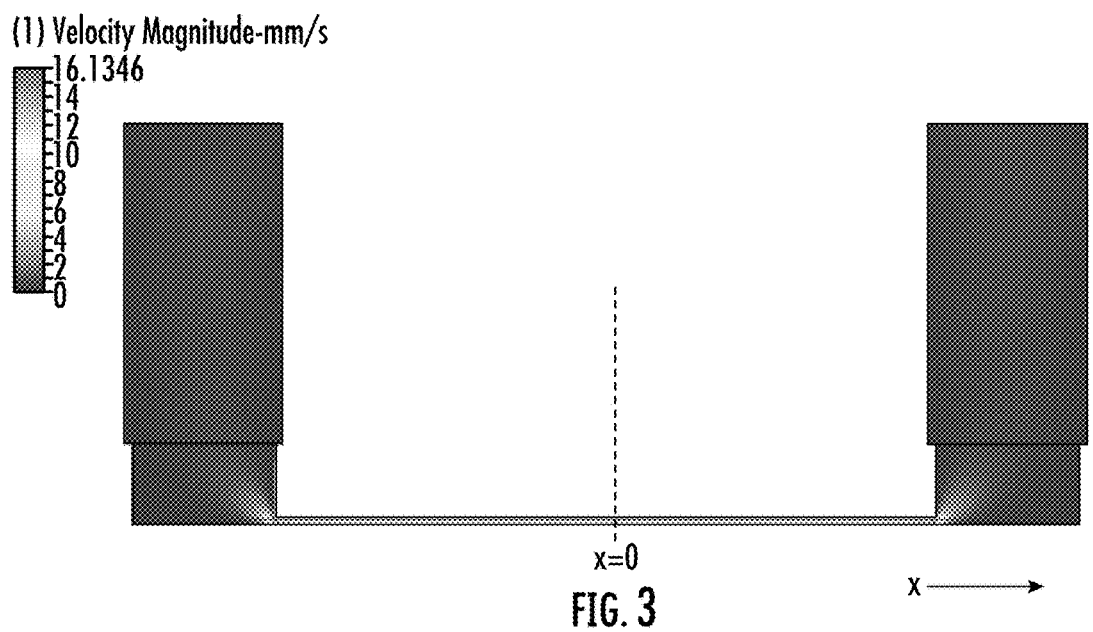
FIG. 3 is a velocity plot of flow through large ports into a flow channel having a height of approximately 25 µm that defines a flow path adjacent two or more sense elements, in accordance with examples of the present disclosure.

Referring now to FIG. 3, a transient flowing-media temperature model is presented for an example flow sensor device, such as 100, 200, or the like. The example flow sensor device was dimensioned and configured to define a flow channel having a height of about 25 µm that generates a temperature differential (dT) greater than about 9° C. at a flow rate of about 1 mL/hour. At a flow rate of about 1 mL/hour, the pressure differential (dP) through the flow channel was between about 3.5 and 4.5 inches of water. It was determined that channel length can be shortened to reduce dP.

Figure 4:
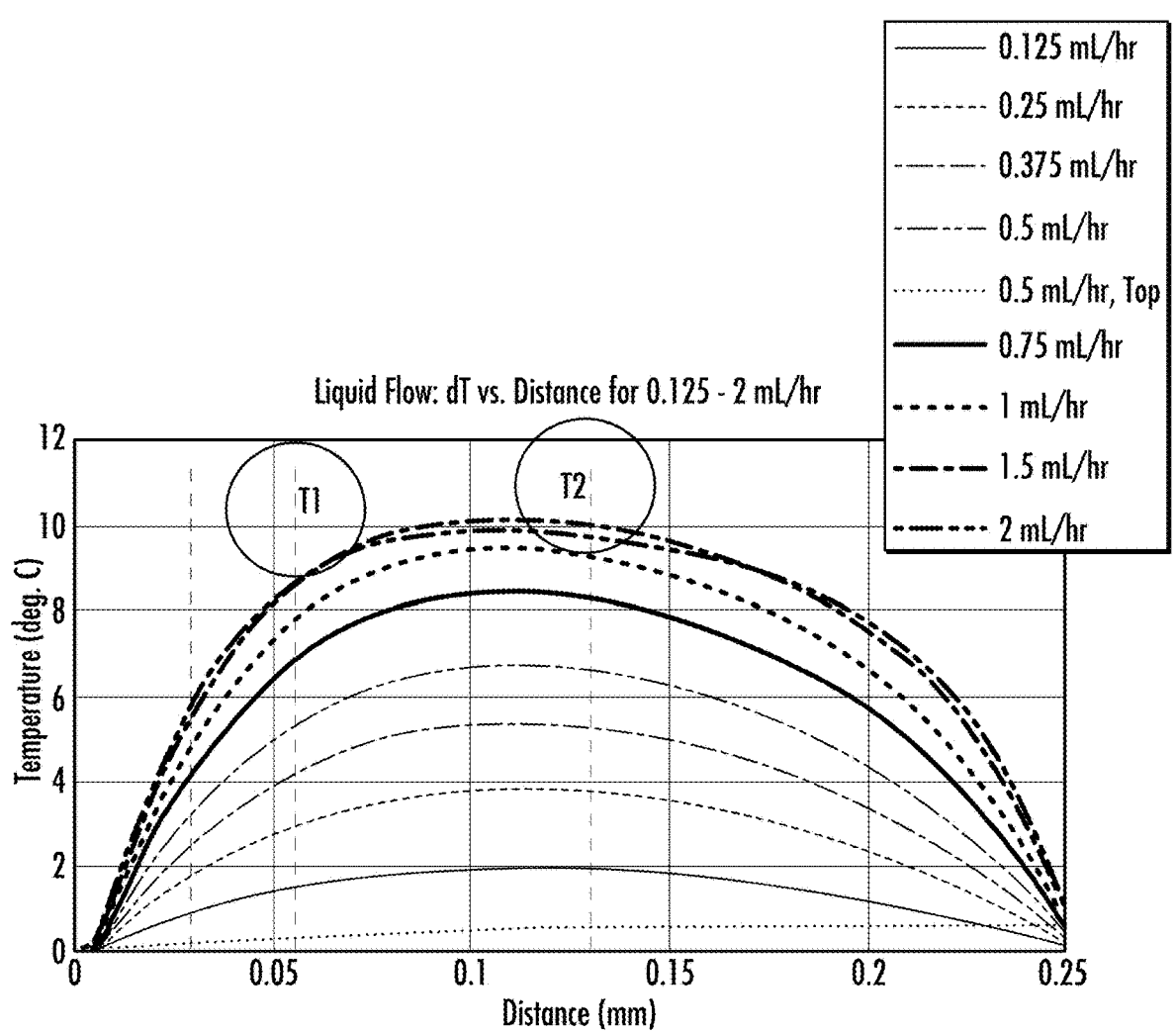
FIG. 4 is a simulation of flow rate temperature differences for flow rates between about 0.125 mL/hr and about 2 mL/hr for the flow path depicted in FIG. 3 where the center of the heating element is approximately located at x=0, in accordance with examples of the present disclosure.

Referring now to FIG. 4, a graph is presented of experimental data associated with the transient flowing-media temperature model of FIG. 3 and the example flow sensor device described above. As illustrated, the graph presents experimental results related to a temperature differential experienced at different distances from the heating element for a flow channel at different flow rates between about 0.1 mL/hr and about 2 mL/hr of flowing media. As illustrated, circle T1 illustrates a distance of a first thermopile from the heating element and circle T2 illustrates a distance of a second thermopile from the heating element. As illustrated, the temperature differential between a cold junction and a hot junction may be indicative of a point of maximal precision and/or accuracy with regard to measuring temperature change over time, temperature change over time being indicative of a change over time of flow rate of the flowing media through the flow channel. As illustrated, if only a single thermopile were used, e.g., at T1, the accuracy of measurement of flow rate at the lower flow rates would be difficult to measure because the temperature differential changes as flow rate changes at T1 distance from the heater element is less discernable whereas it is easier to measure flow rate accurately at low flow rates for a thermopile at T2 distance from the heater element.

Figure 5:
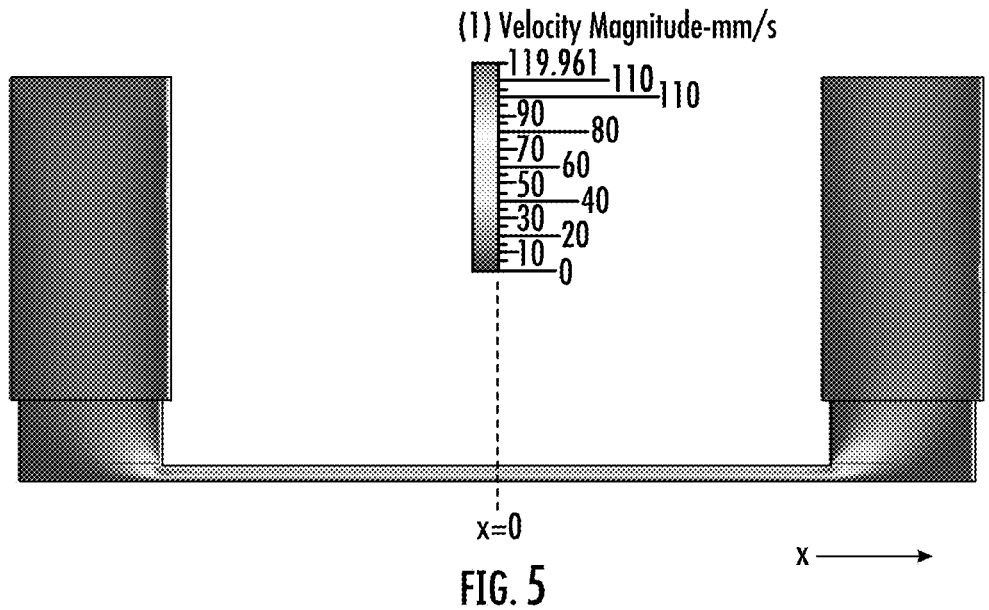
FIG. 5 is a velocity plot of flow through large ports into a flow channel having a height of approximately 89 µm that defines a flow path adjacent two or more sense elements, in accordance with examples of the present disclosure.

Referring now to FIG. 5, a transient flowing-media temperature model is presented for an example flow sensor device, such as 100, 200, or the like. The example flow sensor device was dimensioned and configured to define a flow channel having a height of about 90 µm that generates a temperature differential (dT) greater than about 6° C. at a flow rate of about 15 mL/hour. The signal associated with flow rate saturated at about 15 mL/hr and was determined to be monotonic. When the sensor was placed at a T1 distance of about 125 µm from the heater element, a flow rate of about 0.5 mL/hour generated a dT of about 2.5° C., which led to a reduction in the accurate and precise measurement of flow rate at such lower flow rates. As such, including a second thermopile located a T2 distance of about 50 µm from the heater element led to increased accuracy and precision of measurement of flow rate at lower flow rates of, for example, about 1 mL/hr which is indicative of the flow rate at which medicine is infusion pumped to a patient for medicine administration.

Figure 6:
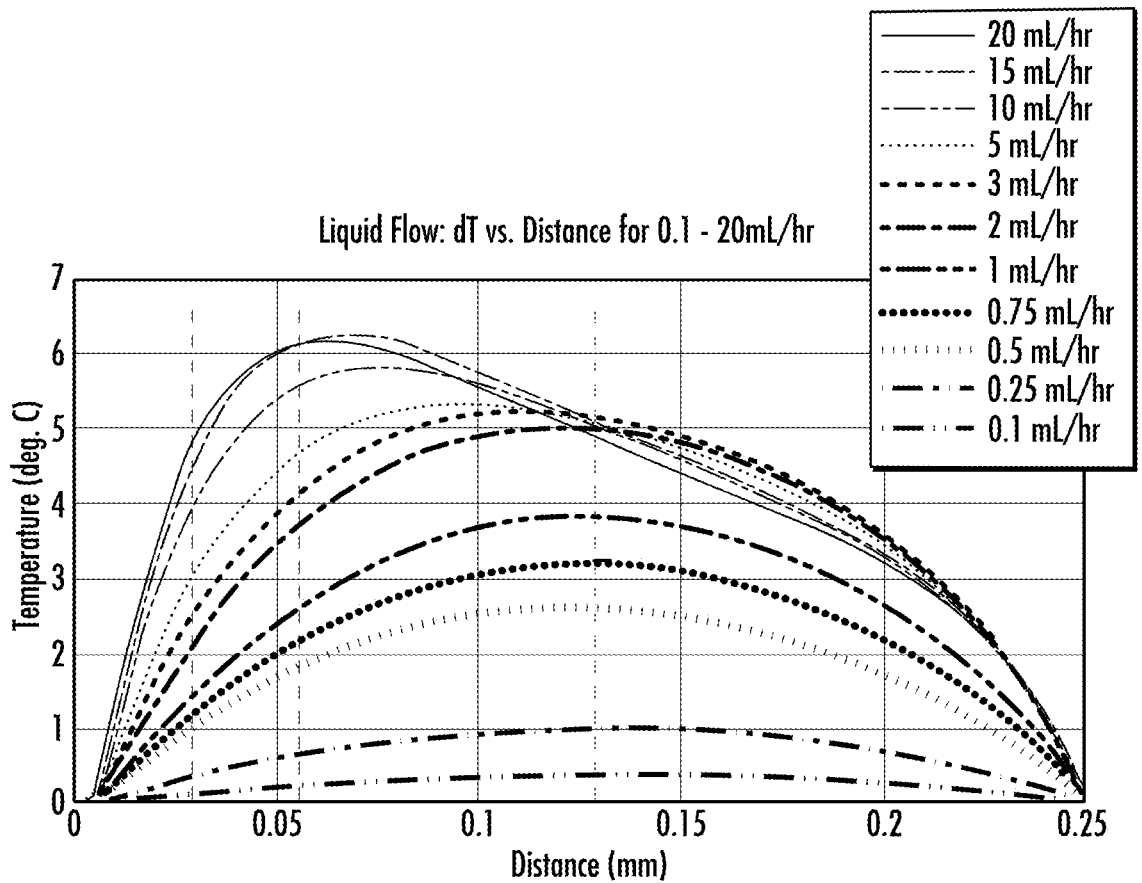
FIG. 6 is a simulation of flow rate temperature differences for flow rates between about 0.1 mL/hr and about 20 mL/hr for the flow path depicted in FIG. 5 where the center of the heating element is approximately located at x=0, in accordance with examples of the present disclosure.

Referring now to FIG. 6, a graph is presented of experimental data associated with the transient flowing-media temperature model of FIG. 5 and the example flow sensor device described above. As illustrated, the graph presents experimental results related to a temperature differential experienced at different distances from the heating element for a flow channel at different flow rates between about 0.1 mL/hr and about 20 mL/hr of flowing media. As illustrated, circle T1 illustrates a distance of a first thermopile from the heating element and circle T2 illustrates a distance of a second thermopile from the heating element. As illustrated, the temperature differential between a cold junction and a hot junction may be indicative of a point of maximal precision and/or accuracy with regard to measuring temperature change over time, temperature change over time being indicative of a change over time of flow rate of the flowing media through the flow channel. As illustrated, if only a single thermopile were used, e.g., at T1, the accuracy of measurement of flow rate at the lower flow rates would be difficult to measure because the temperature differential changes as flow rate changes at T1 distance from the heater element is less discernable whereas it is easier to measure flow rate accurately at low flow rates for a thermopile at T2 distance from the heater element.

Figure 7:
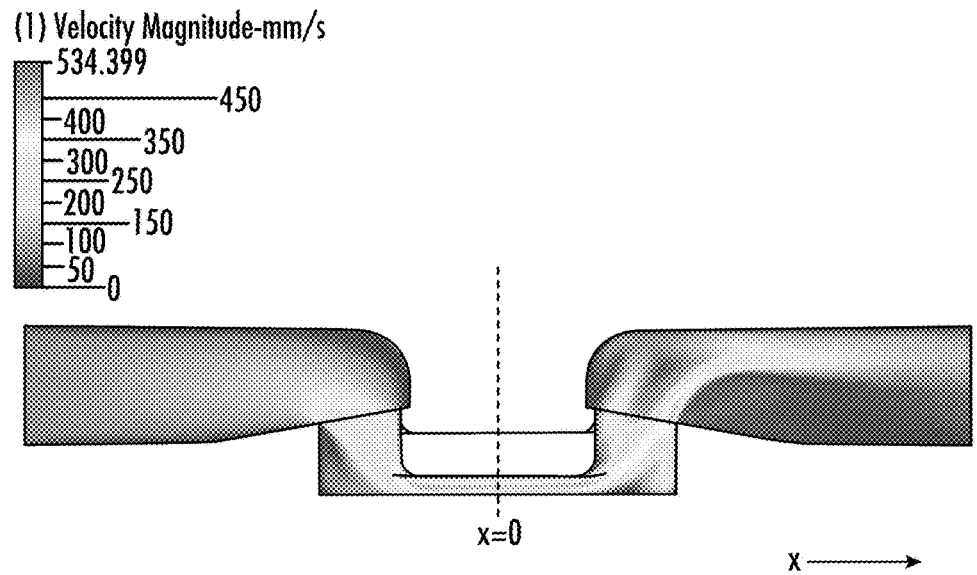
FIG. 7 is a velocity plot of flow through large ports into a flow channel having a height of approximately 349 µm that defines a flow path adjacent two or more sense elements, in accordance with examples of the present disclosure.

Referring now to FIG. 7, a transient flowing-media temperature model is presented for an example flow sensor device, such as 100, 200, or the like. The example flow sensor device was dimensioned and configured to define a flow channel having a height of about 350 µm that generates a temperature differential (dT) of about 6° C. at a flow rate of about 1,000 mL/hour for a thermopile positioned a distance of about 50 µm from the heater element, but the signal saturates at about 250 mL/hour, meaning that a second thermopile at a T2 distance of about 125 µm or so may improve the accuracy at higher flow rates. At the 25 µm distance from the heater element, a thermopile was able to reach signal saturation for a dT of about 5° C. at a flow rate of about 500 mL/hour.

Figure 8:
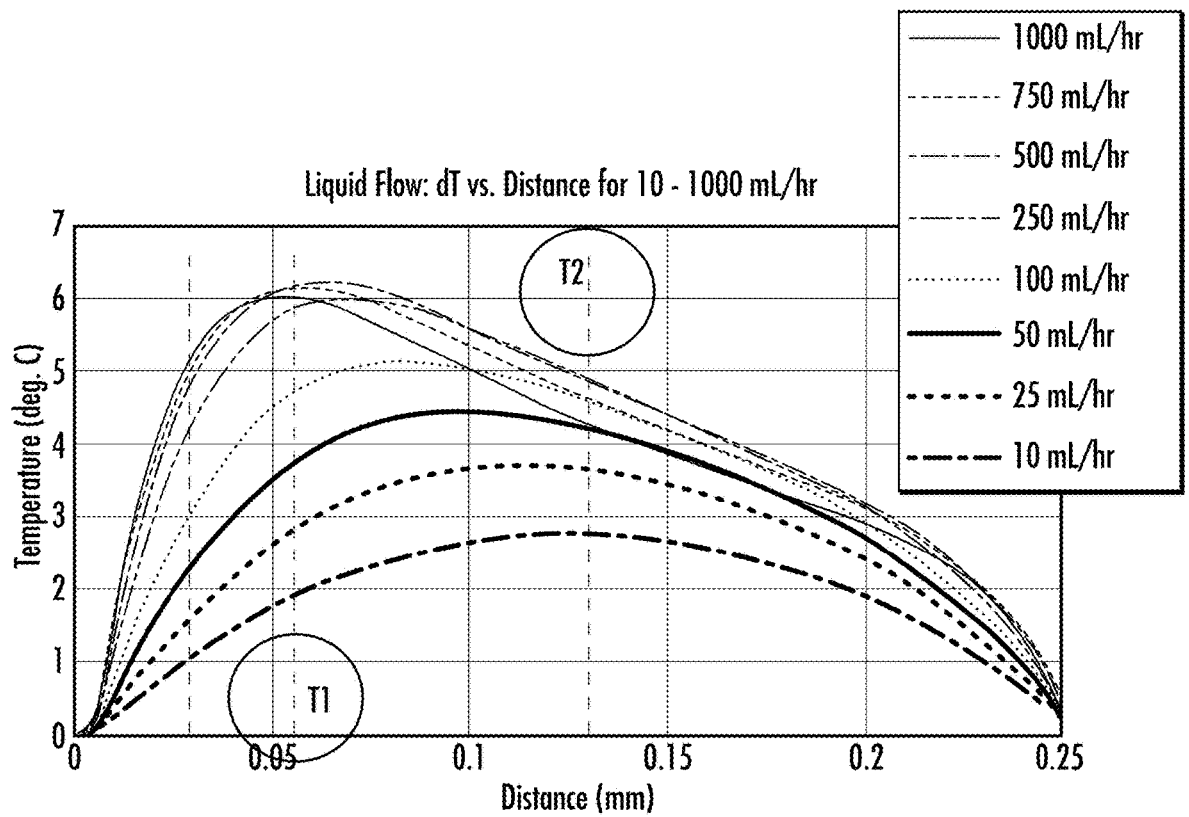
FIG. 8 is a simulation of flow rate temperature differences for flow rates between about 10 mL/hr and about 1,000 mL/hr for the flow path depicted in FIG. 7 where the center of the heating element is approximately located at x=0, in accordance with examples of the present disclosure.

Referring now to FIG. 8, a graph is presented of experimental data associated with the transient flowing-media temperature model of FIG. 7 and the example flow sensor device described above. As illustrated, the graph presents experimental results related to a temperature differential experienced at different distances from the heating element for a flow channel at different flow rates between about 10 mL/hr and about 1,000 mL/hr of flowing media. As illustrated, circle T1 illustrates a distance of a first thermopile from the heating element and circle T2 illustrates a distance of a second thermopile from the heating element. As illustrated, the temperature differential between a cold junction and a hot junction may be indicative of a point of maximal precision and/or accuracy with regard to measuring temperature change over time, temperature change over time being indicative of a change over time of flow rate of the flowing media through the flow channel. As illustrated, if only a single thermopile were used, e.g., at T1, the accuracy of measurement of flow rate at the lower flow rates would be difficult to measure because the temperature differential changes as flow rate changes at T1 distance from the heater element is less discernable whereas it is easier to measure flow rate accurately at low flow rates for a thermopile at T2 distance from the heater element.

Figure 9A:
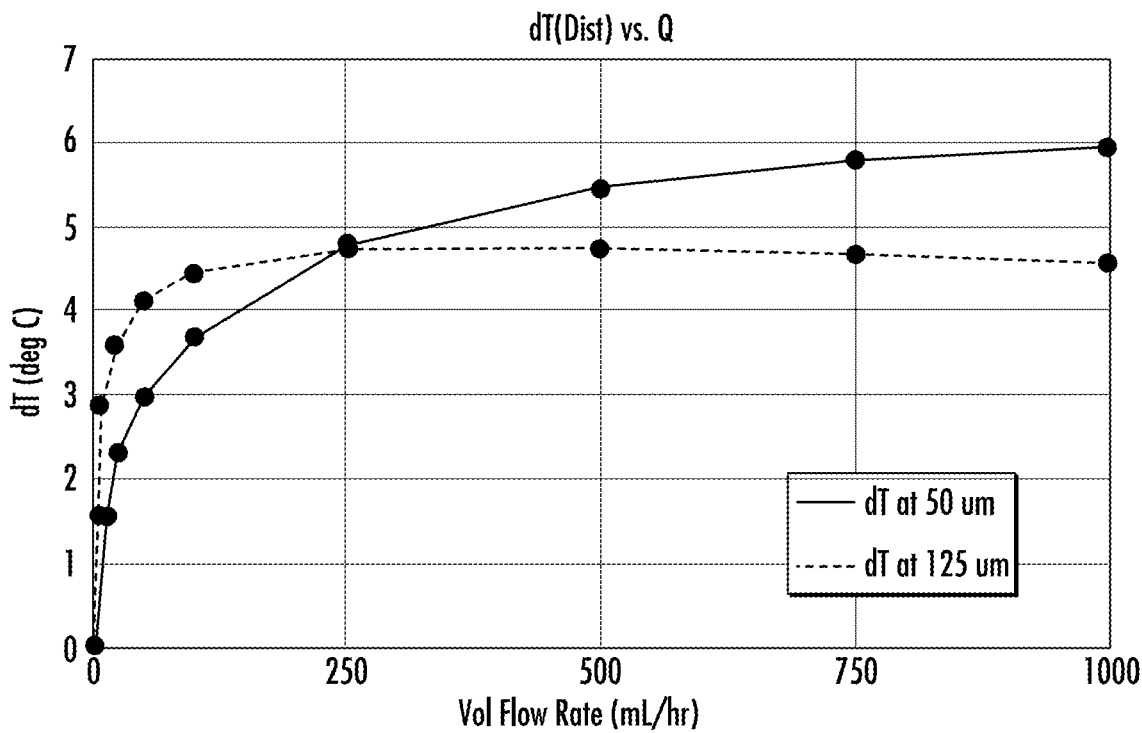
FIG. 9A is a graphical representation of temperature differences between outside and inside a membrane, for a flow sensor device having two sense elements positioned at different distances from the heater element, as a function of the flow rate of media such as a fluid through a nearby flow channel, in accordance with examples of the present disclosure.

Referring now to FIG. 9A, a graph is presented of experimental data associated with the change in temperature difference between inside a membrane and outside a membrane of an example flow sensor having two sense elements, the two sense elements positioned different distances from a center of a heating element. The change in temperature is illustrated as a function of distance of the thermopile sense elements from a center of the heating element and as a function of flow rates between about 0.1 mL/hour and about 1,000 mL/hour. According to the graph of FIG. 9A, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 9B:
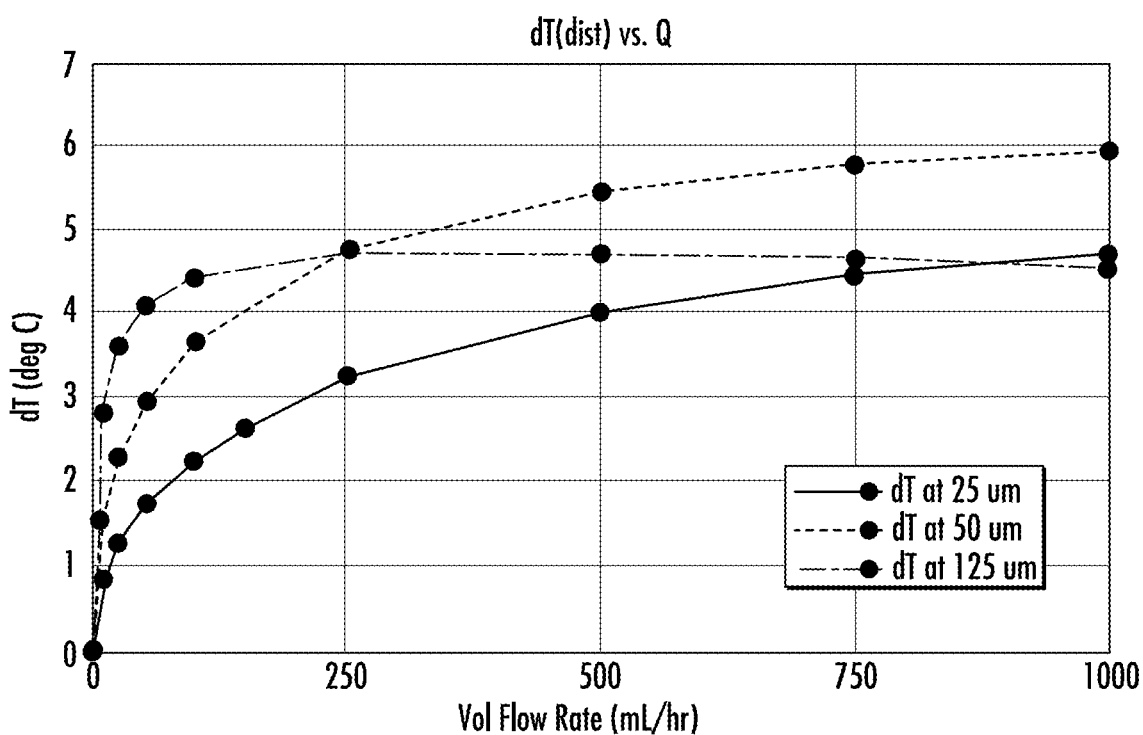
FIG. 9B is a graphical representation of temperature differences between outside and inside a membrane, for a flow sensor device having three sense elements positioned at different distances from the heater element, as a function of the flow rate of media such as a fluid through a nearby flow channel, in accordance with examples of the present disclosure.

Referring now to FIG. 9B, a graph is presented of experimental data associated with the change in temperature difference between inside a membrane and outside a membrane of an example flow sensor having three sense elements, the three sense elements positioned different distances from a center of a heating element. The change in temperature is illustrated as a function of distance of the thermopile sense elements from a center of the heating element and as a function of flow rates between about 0.1 mL/hour and about 1,000 mL/hour. According to the graph of FIG. 9A, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 10:
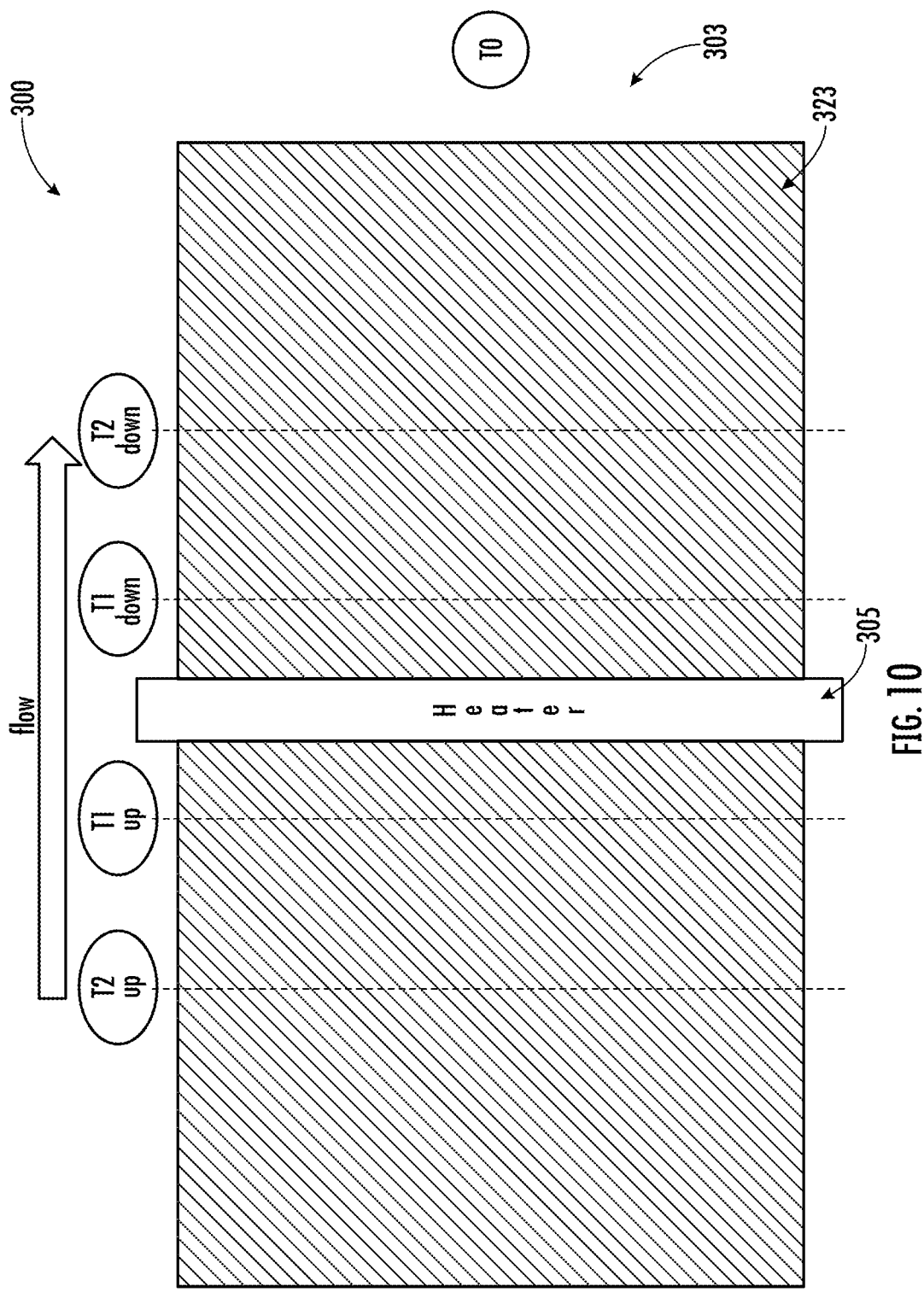
FIG. 10 is a top view schematic of a flow rate device, in accordance with examples of the present disclosure.

Referring now to FIG. 10, a top view of a portion of an example flow sensor device 300 comprising a top surface of a sensor component 303 having a heater element 305 disposed thereon. The arrow labeled 'flow' indicates a direction of flow of the flowing media through the flow channel, but does not indicate the relative location, positioning, dimensions, or other factures or features of the flow channel or the flowing media relative to heating element 305. In some examples, the heater element 305 is disposed on or in a sensing region 323 comprising a membrane or the like. In some examples, relative to the direction of flow of the flowing media through a nearby flow channel, the sensing region 323 may comprise an upstream region and a downstream region. In some examples, one or more thermopiles may be disposed within or partially within the sensing region 323 in the upstream region and one or more other thermopiles may be disposed within or partially within the sensing region 323 in the downstream region. In some examples, a T1 distance and a T2 distance from the heater element may be established in both the upstream region and the downstream region. In some examples, a first end and/or a first portion of a first thermopile or other such thermal sensing element may be positioned at the T1 distance from the heater element 305 in the upstream region of the sensing region 323 and a second end or a second portion of the first thermopile may be positioned outside the sensing region 323, illustrated at T0 in FIG. 10. In some examples, T0 may be used as the reference temperature. In some examples, the temperature of the substrate at T0 may be used as the reference temperature for purposes of comparing temperature differential between two thermopiles or the like, and may be used during calibration of the flow rate sensor. In some examples, a first end or first portion of a second thermopile may be positioned at the T2 distance from the heater element 305 in the upstream region of the sensing region 323 and a second end or second portion of the second thermopile may be positioned outside the sensing region 323, at T0. In some examples, the ends of the thermopiles may be where temperature is sensed.

In some examples, the T1 distance of the first thermopile from the heater element is about 50 μm and the T2 distance of the second thermopile from the heater element is about 125 μm. However, in other examples, the T1 distance can be any suitable distance from the heater between about 10 μm and about 500 μm, between about 15 μm and about 450 μm, between about 20 μm and about 400 μm, between about 25 μm and about 350 μm, between about 30 μm and about 300 μm, between about 35 μm and about 250 μm, between about 40 μm and about 200 μm, between about 45 μm and about 150 μm, between about 50 μm and about 100 μm, between about 10 μm and about 400 μm, between about 10 μm and about 300 μm, between about 10 μm and about 200 μm, between about 10 μm and about 100 μm, between about 10 μm and about 90 μm, between about 10 μm and about 80 μm, between about 10 μm and about 70 μm, between about 10 μm and about 60 μm, between about 10 μm and about 50 μm, between about 10 μm and about 40 μm, between about 10 μm and about 30 μm, or between about 10 μm and about 20 μm, inclusive of all values and ranges therebetween.

In some examples, the T2 distance of the second thermopile from the heater element can be any suitable distance from the heater between about 100 μm and about 1,000 μm, between about 100 μm and about 950 μm, between about 100 µm and about 800 µm, between about 100 µm and about 750 µm, between about 100 µm and about 700 µm, between about 100 µm and about 650 µm, between about 100 µm and about 600 µm, between about 100 µm and about 550 µm, between about 100 µm and about 500 µm, between about 100 µm and about 450 µm, between about 100 µm and about 400 µm, between about 100 µm and about 350 µm, between about 100 µm and about 300 µm, between about 100 µm and about 250 µm, between about 100 µm and about 200 µm, between about 100 µm and about 150 µm, greater than about 75 µm, greater than about 80 µm, greater than about 85 µm, greater than about 90 µm, greater than about 95 µm, greater than about 100 µm, greater than about 105 µm, greater than about 110 µm, greater than about 115 µm, greater than about 120 µm, greater than about 125 µm, greater than about 130 µm, greater than about 135 µm, greater than about 140 µm, greater than about 145 µm, greater than about 150 µm, greater than about 175 µm, greater than about 200 µm, greater than about 250 µm, greater than about 300 µm, greater than about 400 µm, greater than about 500 µm, greater than about 600 µm, greater than about 700 µm, greater than about 800 µm, greater than about 900 µm, or greater than about 1,000 µm, inclusive of all values and ranges therebetween.

Figure 11:
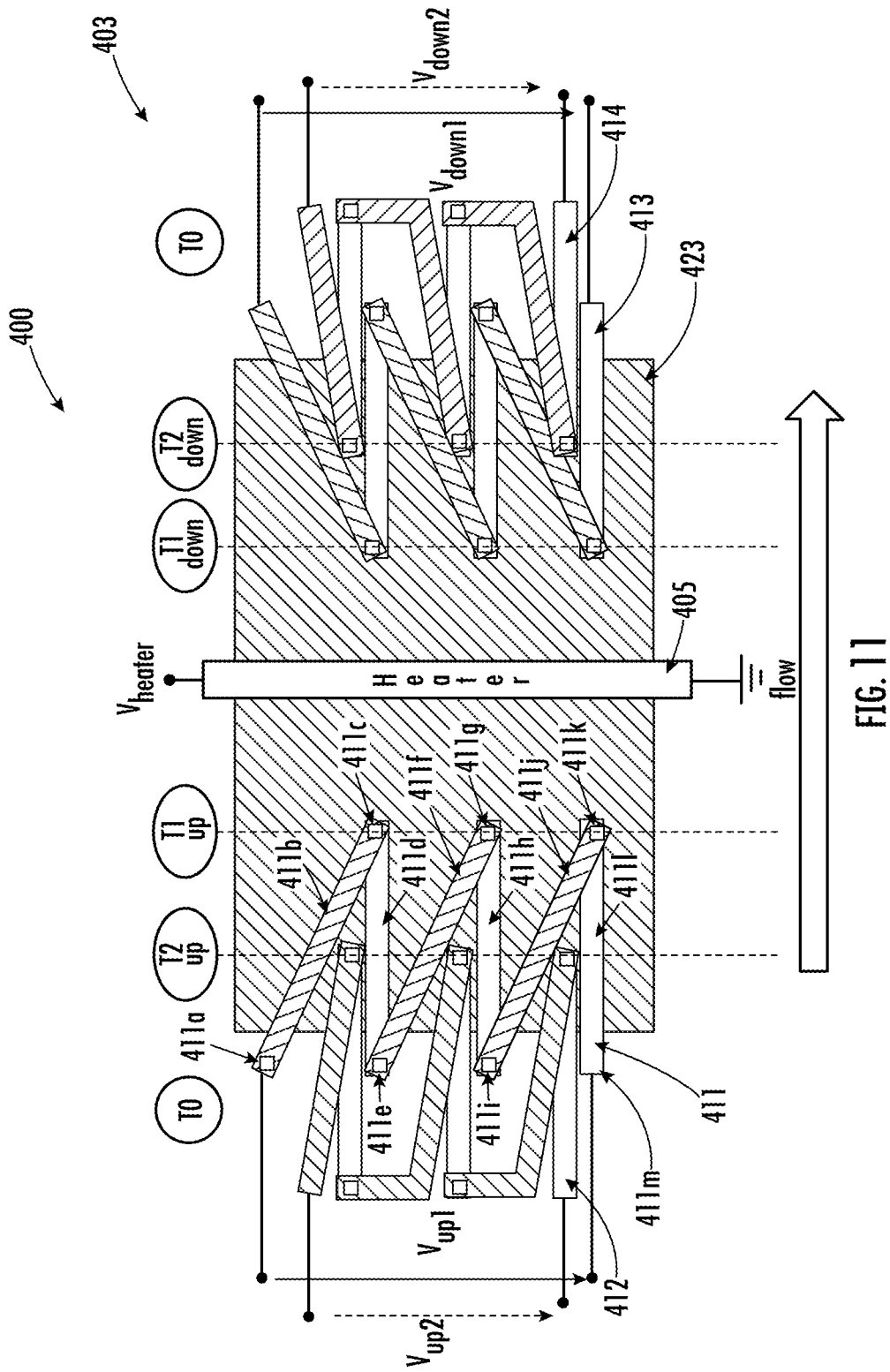
FIG. 11 is a top view schematic of a flow rate device comprising two upstream thermal sensing elements and two downstream thermal sensing elements, in accordance with examples of the present disclosure.

Referring now to FIG. 11, a top view of a portion of an example flow sensor device 400 is illustrated, the example flow sensor device 400 comprising a top surface of a sensor component 403 having a heater element 405 disposed thereon. The arrow labeled 'flow' indicates a direction of flow of the flowing media through the flow channel, but does not indicate the relative location, positioning, dimensions, or other factures or features of the flow channel or the flowing media relative to heating element 405. In some examples, the heater element 405 is disposed on or in a sensing region 423 comprising a membrane or the like. In some examples, relative to the direction of flow of the flowing media through a nearby flow channel, the sensing region 423 may comprise an upstream region and a downstream region. In some examples, one or more thermopiles may be disposed within or partially within the sensing region 423 in the upstream region and one or more other thermopiles may be disposed within or partially within the sensing region 423 in the downstream region. In some examples, a T1 distance and a T2 distance from the heater element may be established in both the upstream region and the downstream region. In some examples, a first end or a first portion of a first thermopile or other such thermal sensing element may be positioned at the T1 distance from the heater element 405 in the upstream region of the sensing region 423 and a second end or a second portion of the first thermopile may be positioned outside the sensing region 423, illustrated at T0 in FIG. 11. In some examples, a first end or first portion of a second thermopile may be positioned at the T2 distance from the heater element 405 in the upstream region of the sensing region 423 and a second end or second portion of the second thermopile may be positioned outside the sensing region 423, at T0.

For instance, as illustrated in FIG. 11, a first thermopile 411 may be disposed upstream of the heater element 405. In some examples, the first thermopile 411 may comprise a first thermocouple material 411*b* having a first end which acts as a current input 411*a* and a second end coupled to a first contact material 411*c* that joins the second end of the first thermocouple material 411*b* to a first end of a second thermocouple material 411*d*. The second thermocouple material 411*d* may be joined at the first end to the second end of the first thermocouple material 411*b* by way of the first contact material 411*c*. The second thermocouple material 411*d* may comprise, at a second end, a second contact material 411*e*, the second contact material 411*e* being configured to electrically contact the send end of the second thermocouple material 411*d* to a first end of a third thermocouple material 411*f* In some examples, the third thermocouple material 411*f* may comprise the same or a similar material to that of the first thermocouple material 411*b* or the second thermocouple material 411*d*. In some examples, each of the first thermocouple material 411*b*, second thermocouple material 411*d*, and third thermocouple material 411*f* may be different. In some examples, the third thermocouple material 411*f* may be electrically coupled at a second end to a third contact material 411*g* that is configured to join the second end of the third thermocouple material 411*f* to a first end of a fourth thermocouple material 411*h*. The fourth thermocouple material 411*h* may be electrically coupled at a second end, by way of a fourth contact material 411*i* to a first end of a fifth thermocouple material 411*j*. The fifth thermocouple material 411*j* may be electrically coupled, at a second end, by way of a fifth contact material 411*k*, to a first end of a sixth contact material 411*l*. A second end of the sixth contact material 411*l* may be in contact with or define a current output for the first thermopile 411. In some examples, the first end of the first thermocouple material 411*b*, second end of the second thermocouple material 411*d*, first end of the third thermocouple material 411*f*, second end of the fourth thermocouple material 411*h*, first end of the fifth thermocouple material 411*j*, and second end of the sixth thermocouple material 411*l* may be disposed outside the sensing region 423, at T0. In some examples, the second end of the first thermocouple material 411*b*, first end of the second thermocouple material 411*d*, second end of the third thermocouple material 411*f*, first end of the fourth thermocouple material 411*h*, second end of the fifth thermocouple material 411*j*, and first end of the sixth thermocouple material 411*l* may be disposed inside the sensing region 423, along the dashed line T1 up, such that all portions of the first thermopile 411 are at minimum spaced the T1 distance from the heater element 405.

In some examples, the flow sensor device 400 may further comprise a second thermopile 412 disposed upstream and comprising a similar thermocouple material configuration as discussed above with regard to the first thermopile 411. In some examples, at least one end of each different thermocouple material element of the second thermopile 412 may be positioned outside the sensing region 423, while the other end of each different thermocouple material element of the second thermopile 412 may be located within the upstream region of the sensing region 423 and positioned along the dashed line T2 up, such that all portions of the second thermopile 412 are at minimum spaced the T2 distance from the heater element 405.

In some examples, the flow sensor device 400 may further comprise a third thermopile 413 disposed downstream and comprising a similar thermocouple material configuration as discussed above with regard to the first thermopile 411. In some examples, at least one end of each different thermocouple material element of the third thermopile 413 may be positioned outside the sensing region 423, while the other end of each different thermocouple material element of the third thermopile 413 may be located within the downstream region of the sensing region 423 and positioned along the dashed line T1 down, such that all portions of the third thermopile 413 are at minimum spaced the T1 distance from the heater element 405.

In some examples, the flow sensor device 400 may further comprise a fourth thermopile 414 disposed downstream and comprising a similar thermocouple material configuration as discussed above with regard to the first thermopile 411. In some examples, at least one end of each different thermocouple material element of the fourth thermopile 414 may be positioned outside the sensing region 423, while the other end of each different thermocouple material element of the fourth thermopile 414 may be located within the downstream region of the sensing region 423 and positioned along the dashed line T2 down, such that all portions of the fourth thermopile 414 are at minimum spaced the T2 distance from the heater element 405.

As such, the voltage change across each of the first, second, third, and fourth thermopiles 411, 412, 413, 414 may be determined by inputting respective electrical currents or signals having a known voltage into respective inputs (e.g., 411a) of each different thermopile and measuring the voltage of the electrical current or signal received in response at respective outputs of each different thermopile. As illustrated in FIG. 11, the voltage changes $V_{up1}$, $V_{up2}$, $V_{down1}$, and $V_{down2}$ are associated, respectively, with the first, second, third, and fourth thermopiles 411, 412, 413, 414. In some examples, $V_{up1}$ and $V_{up2}$ may be summed to determine an upstream voltage and $V_{down1}$ and $V_{down2}$ may be summed to determine a downstream voltage. In some examples, a differential between the upstream voltage and the downstream voltage may be indicative of the flow rate of the flowing media through the adjacent flow channel.

Figure 12:
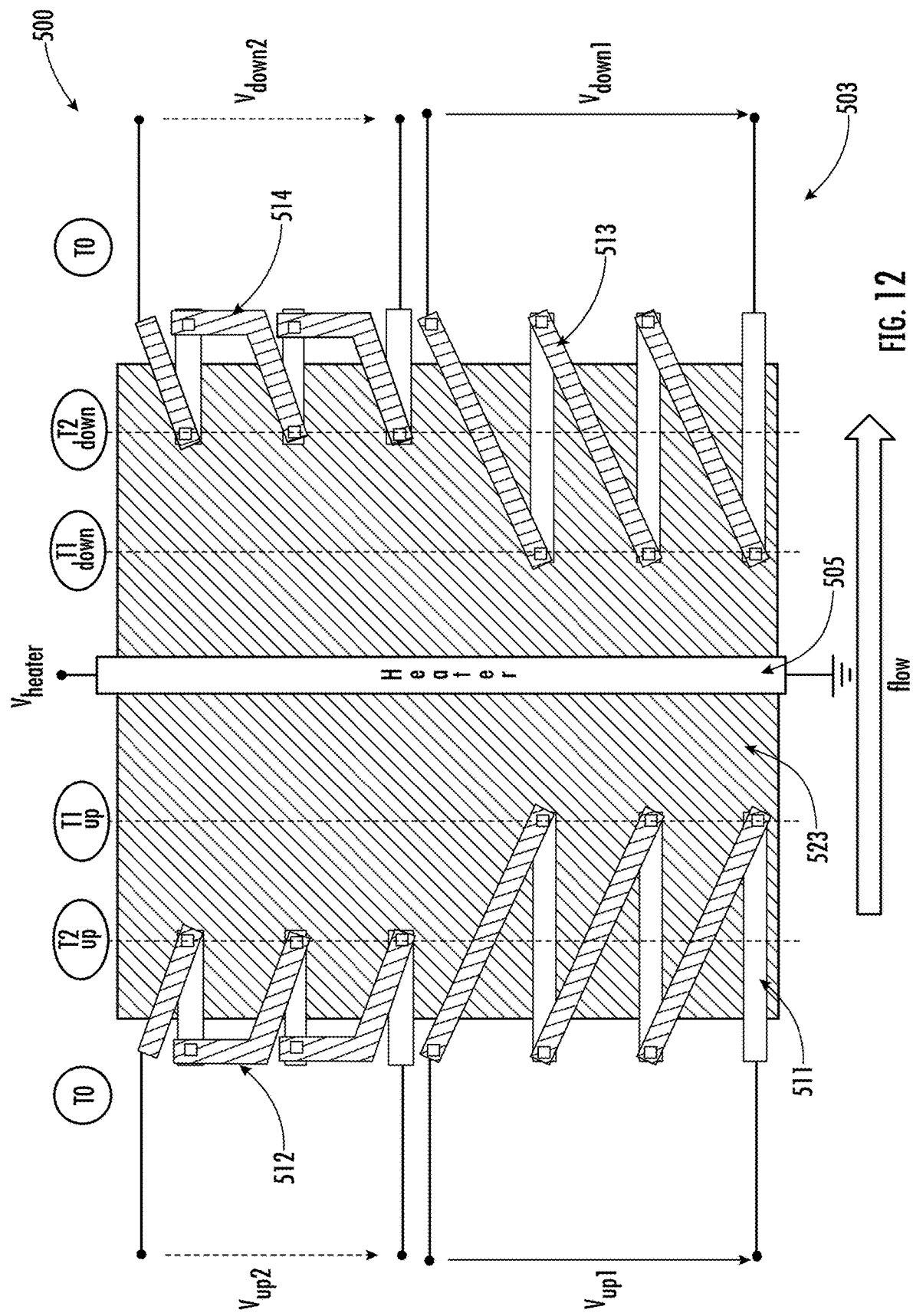
FIG. 12 is a top view schematic of a flow rate device comprising two upstream thermal sensing elements and two downstream thermal sensing elements, in accordance with examples of the present disclosure.

Referring now to FIG. 12, an example flow sensor device 500 is illustrated having a similar configuration to that of flow sensor device 400. However, the first and second thermopiles 411, 412 of flow sensor device 400 are nested within one another or overlapping in terms of their position along a length of the heater element 405, and the third and fourth thermopiles 413, 414 of flow sensor device 400 are nested within one another or overlapping in terms of their position along the length of the heater element 405. Conversely, flow sensor device 500 comprises a first thermopile 511 that does not overlap and which is not nested within a second thermopile 512 in the upstream direction, and further comprises a third thermopile 513 that does not overlap and which is not nested within a fourth thermopile 514 in the downstream direction. In some examples, the first and second thermopiles 511, 512 may be nested or overlapping while the third and fourth thermopiles 513, 514 are not. In other examples, the third and fourth thermopiles 513, 514 may be nested or overlapping while the first and second thermopiles 511, 512 are not.

In some examples, the flow sensor devices 400, 500 may be bi-directional. In some examples, the flow sensor devices 400, 500 can measure flow in either an upstream direction or flow in a downstream direction.

Figure 13:
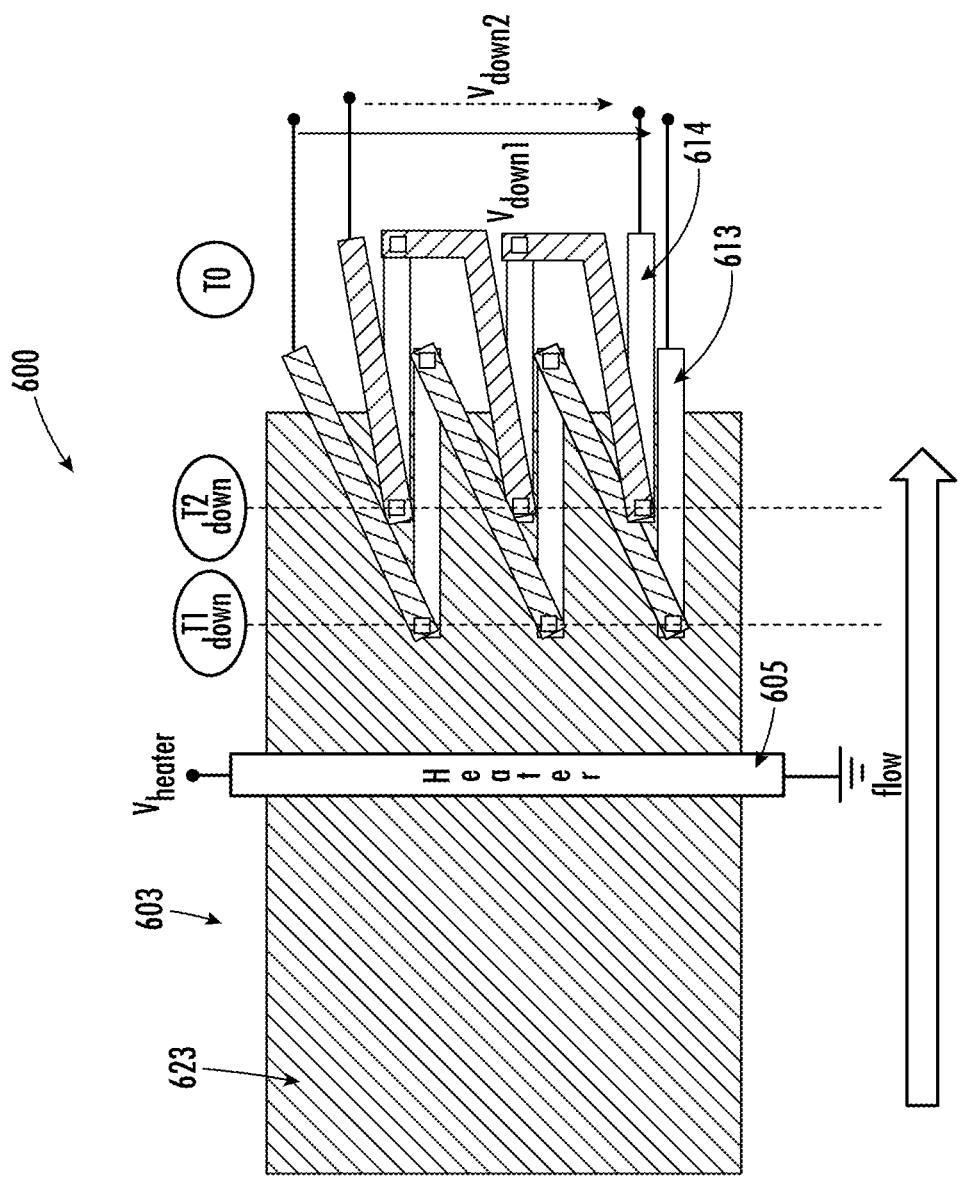
FIG. 13 is a top view schematic of a flow rate device comprising two downstream thermal sensing elements, in accordance with examples of the present disclosure.

Referring now to FIG. 13, an example flow sensor device 600 is illustrated having a similar configuration to that of flow sensor device 400. However, flow sensor device 600 comprises a third thermopile 613 nested with or overlapping with a fourth thermopile 614 in the downstream direction of a heater element 605, but does not comprise a first thermopile 611 or a second thermopile 612 in the upstream direction of the heater element 605. In some examples, the flow rate of a flowing media in a nearby flow channel may be determined simply by summing Vdown1 and Vdown2 without determining a differential between the voltage loss upstream and the voltage loss downstream across the thermopiles.

Figure 14:
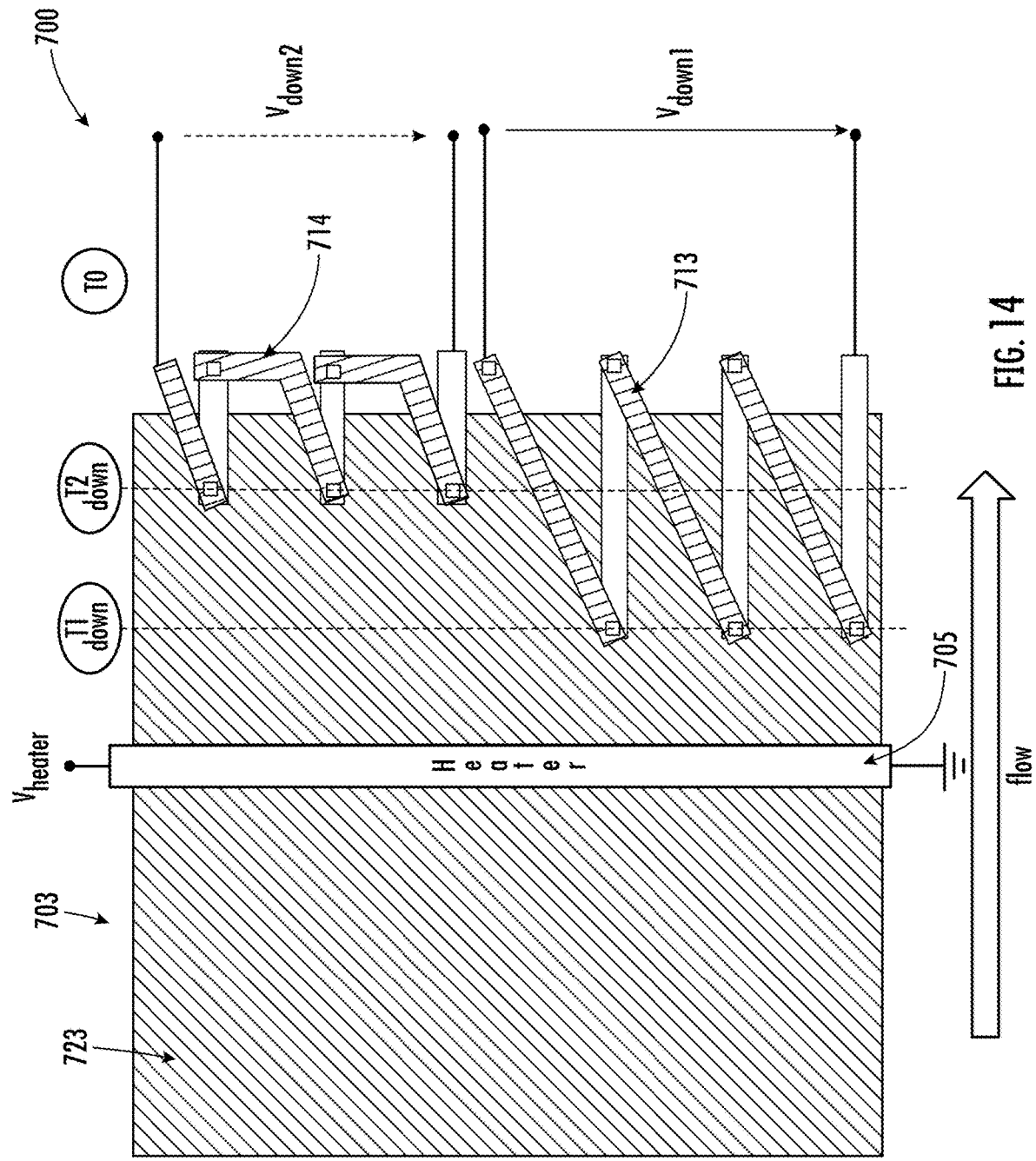
FIG. 14 is a top view schematic of a flow rate device comprising two downstream thermal sensing elements, in accordance with examples of the present disclosure.

Referring now to FIG. 14, an example flow sensor device 700 is illustrated having a similar configuration to that of flow sensor device 500. However, flow sensor device 700 comprises a third thermopile 713 that is not nested and is not overlapping with a fourth thermopile 714 in the downstream direction of a heater element 705, but does not comprise a first thermopile 711 or a second thermopile 712 in the upstream direction of the heater element 705. In some examples, the flow rate of a flowing media in a nearby flow channel may be determined simply by summing Vdown1 and Vdown2 without determining a differential between the voltage loss upstream and the voltage loss downstream across the thermopiles.

While flow sensor devices 600 and 700 are described as comprising thermopiles only in the downstream direction of the heater element 605, 705, other example flow sensor devices may comprise thermopiles only in the upstream direction of the heater element 605, 705.

In some examples, the flow sensor devices 600, 700 may be unidirectional. In some examples, the flow sensor devices 600, 700 may be configured for measuring flow rate in only a single direction, such as the direction indicated by the flow direction arrow at the bottom of FIGS. 13 and 14.

Figure 15:
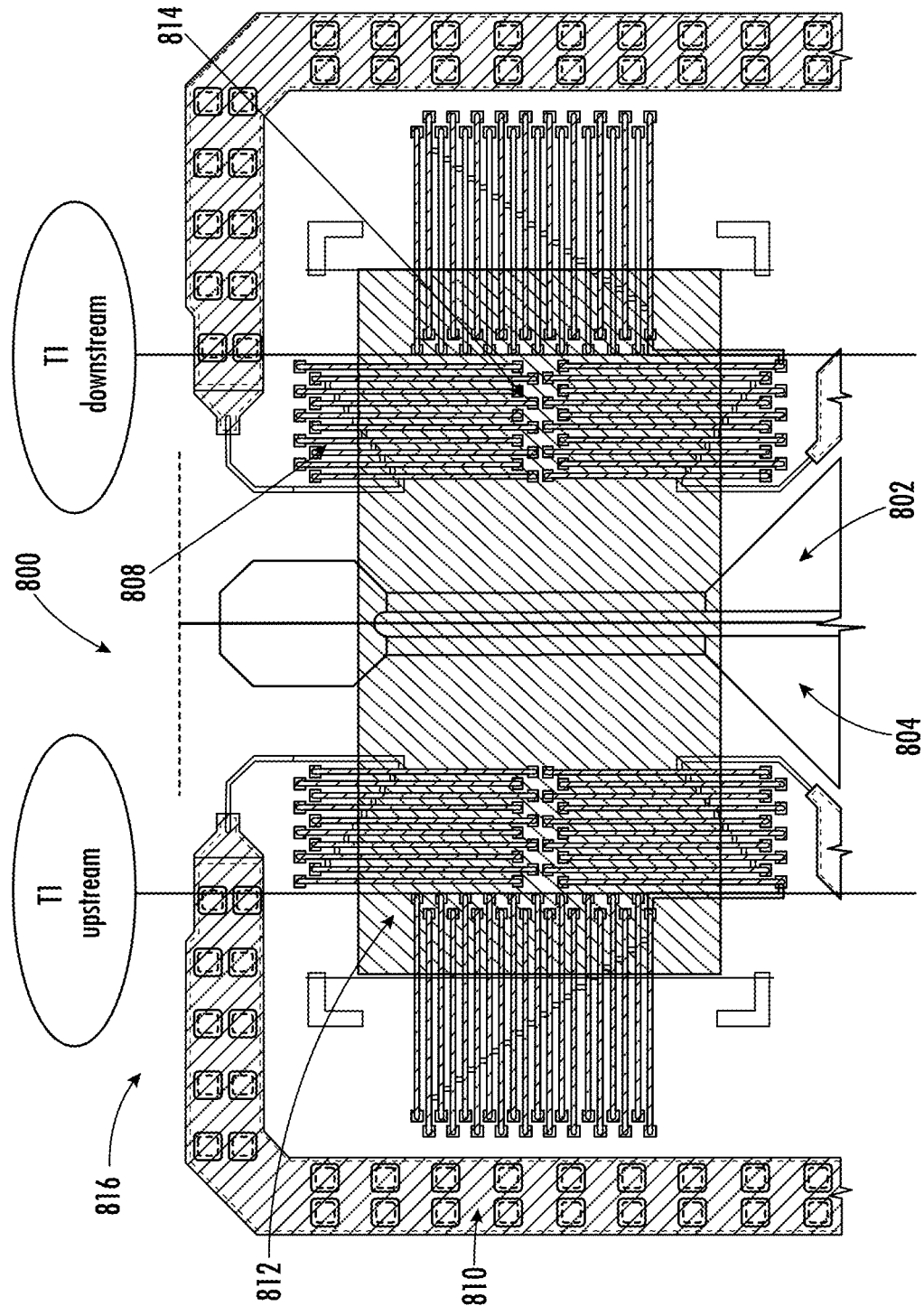
FIG. 15 illustrates an example perspective top view of at least a portion of an example flow sensing device in accordance with examples of the present disclosure.
Figure 16:
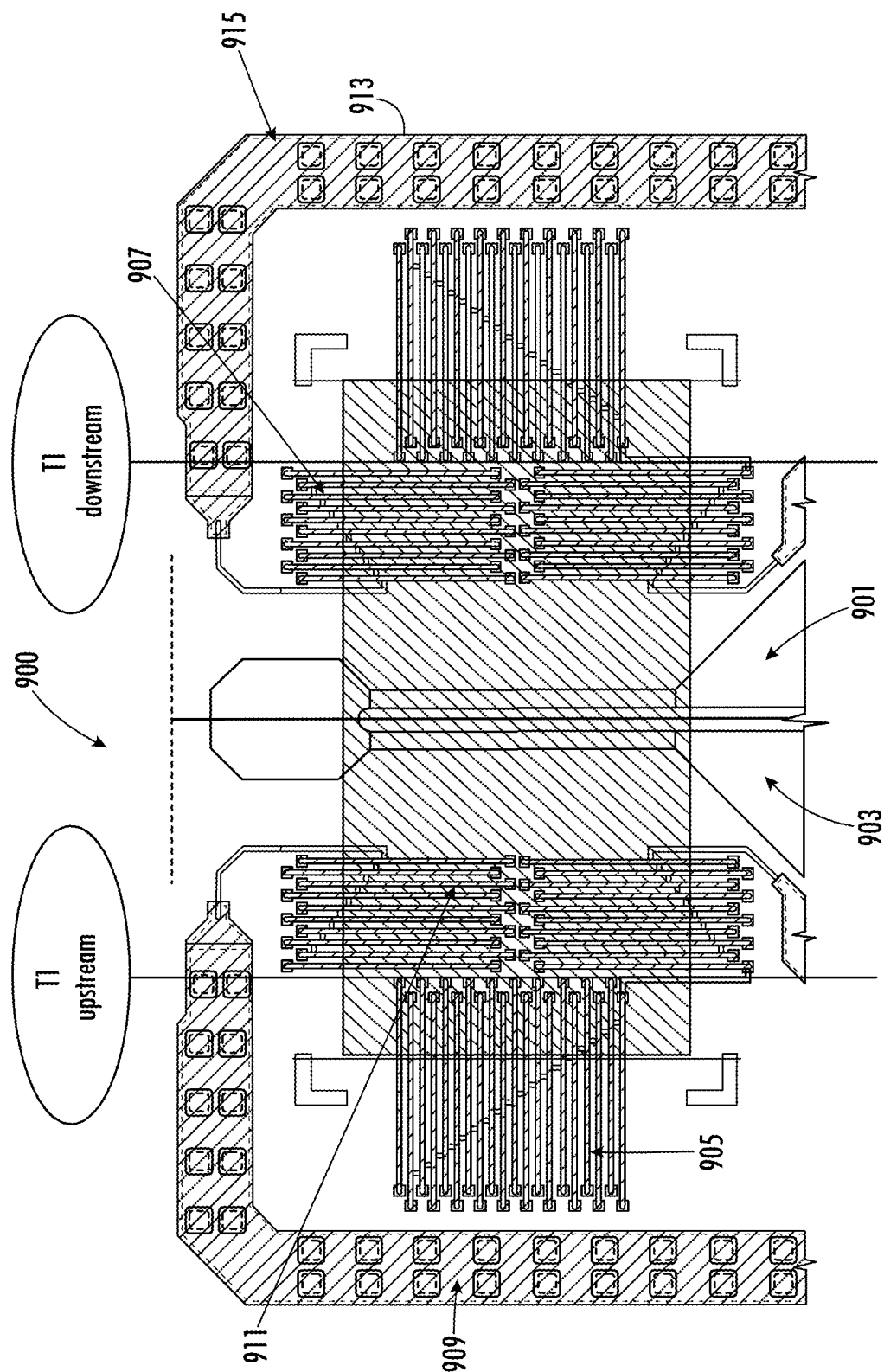
FIG. 16 illustrates an example perspective top view of at least a portion of an example flow sensing device in accordance with examples of the present disclosure.

Referring now to FIG. 15 and FIG. 16, example perspective views of at least portions of example flow sensing devices are provided. It is noted that, as these are perspective views, the heating elements are shown as projections to the plane of the thermal sensing elements.

For example, the heating elements 802 and 804 of FIG. 15 are shown as projections to the plane of the sensing elements. As another example, the heating elements 901 and 903 of FIG. 16 are shown as projections to the plane of the sensing elements. In other words, the heating elements and the sensing elements are noncoplanar in the example flow sensing devices.

Referring now to FIG. 15, an example perspective view of at least a portion of an example flow sensing device 800 is illustrated. In particular, FIG. 15 illustrates an example top, perspective view of at least the portion of the example flow sensing device 800 where components of the example flow sensing device 800 are projected to the same plane.

In some examples, the example flow sensing device 800 may comprise one or more heating elements disposed in the flow cap component, similar to those described above in connection with FIG. 1D. For example, the example flow sensing device 800 may comprise a first heating element 802 and a second heating element 804. In the example shown in FIG. 15, the first heating element 802 and/or the second heating element 804 may each include a metal layer that comprises nickel-based and/or iron-based material (for example, nickel iron (NiFe) alloys).

In some examples, the example flow sensing device 800 may comprise one or more thermal sensing elements disposed in the sensor component, similar to those described above in connection with FIG. 1D. For example, the thermal sensing elements of the example flow sensing device 800 may be in the form of one or more thermopiles, including a first thermopile element 806, a second thermopile element 808, and/or a resistor element 810.

As described above, one or more plate elements may be disposed in an example sensor component of an example flow sensing device. In the example shown in FIG. 15, a first plate element 812, a second plate element 814, and/or a third plate element 816 may be disposed in the example sensor component.

In some examples, the first plate element 812, the second plate element 814, and/or the third plate element 816 may only cover the thermocouples of each thermopile on the membrane of the sensor component, and not the thermocouples of the thermopile on the substrate of the sensor component. In such example, these plate elements must only reside on the membrane, and may not contact the substrate portion of the sensor component as heat will then be transferred to the substrate.

While the example shown in FIG. 15 illustrates an oval shape for the first plate element 812 and/or the second plate element 814, it is noted that the scope of the present disclosure is not limited to oval shape only. Additionally, or alternatively, the first plate element 812 and/or the second plate element 814 may be in other shapes, including squares, rectangles, and/or circles.

In some examples, the first plate element 812 may be disposed on a third layer of the example sensor component, and the first thermopile element 806 may be disposed on a second layer of the example sensor component. In some examples, electrically conducting plates (for example, the first plate element 812) may not be in intimate contact with the thermopile material (for example, the first thermopile element 806), but must have a thin film electrical insulator, such as silicon nitride, between the thermopile material and the plate material. In the example shown in FIG. 15, the first plate element 812 may at least partially overlap with the first thermopile element 806 when the first plate element 812 is projected to the plane of the first thermopile element 806.

In some examples, the first plate element 812 may comprise non-metal material that have high thermal conductivity (for example, graphene, diamond, and/or the like). In some examples, the first plate element 812 may comprise metal material (for example, aluminum, gold, and/or the like). In some examples, the first plate element 812 may be in contact with the flowing media in the flow channel, and the first plate element 812 may comprise inert material (for example, gold).

In some examples, an example sensor component may further comprise an insulator layer disposed between the first plate element 812 and the first thermopile element 806 (for example, between the second layer of the sensor component and the third layer of the sensor component). In some examples, the insulator layer may comprise material that may provide electricity insulation (for example, silicon oxide, silicon nitride, silicon oxynitride, and/or the like). As described above, the first plate element 812 may comprise metal material. As such, the insulator layer may prevent the first plate element 812 from short-circuiting the first thermopile element 806.

Referring back to FIG. 15, the second plate element 814 may be disposed on a third layer of the example sensor component, and the second thermopile element 808 may be disposed on a second layer of the example sensor component. In some examples, electrically conducting plates (for example, the second plate element 814) may not be in intimate contact with the thermopile material (for example, the second thermopile element 808), but must have a thin film electrical insulator, such as silicon nitride, between the thermopile material and the plate material. In the example shown in FIG. 15, the second plate element 814 may at least partially overlap with the second thermopile element 808 when the second plate element 814 is projected to the plane of the second thermopile element 808.

Similar to the first plate element 812 described above, in some examples, the second plate element 814 may comprise non-metal material that have high thermal conductivity (for example, graphene, diamond, and/or the like). In some examples, the second plate element 814 may comprise metal material (for example, aluminum, gold, and/or the like). In some examples, the second plate element 814 may be in contact with the flowing media in the flow channel, and the second plate element 814 may comprise inert material (for example, gold).

In some examples, an example sensor component may further comprise an insulator layer disposed between the second plate element 814 and the second thermopile element 808 (for example, between the second layer of the sensor component and the third layer of the sensor component), similar to those described above.

Referring back to FIG. 15, the third plate element 816 may be disposed on a third layer of the example sensor component, and the resistor element 810 may be disposed on a second layer of the example sensor component. In some examples, the second layer may be above the third layer. In some examples, the second layer may be below the third layer. In the example shown in FIG. 15, the third plate element 816 may at least partially overlap with the resistor element 810.

Similar to the first plate element 812 described above, in some examples, the third plate element 816 may comprise non-metal material that have high thermal conductivity (for example, graphene, diamond, and/or the like). In some examples, the third plate element 816 may comprise metal material (for example, aluminum, gold, and/or the like). In some examples, the third plate element 816 may be in contact with the flowing media in the flow channel, and the third plate element 816 may comprise inert material (for example, gold).

In some examples, an example sensor component may further comprise an insulator layer disposed between the third plate element 816 and the resistor element 810 (for example, between the second layer of the sensor component and the third layer of the sensor component), similar to those described above. In some examples, the third plate element 816 may need to be placed to overlap with the resistor lines of the resistor element 810 and not the wide lead-outs of the resistor element 810, which are the connection of the resistor element 810 to the other devices (e.g., ohm meter).

Referring now to FIG. 16, an example perspective view of at least a portion of an example flow sensing device 900 is illustrated. In particular, FIG. 16 illustrates an example top, perspective view of at least the portion of the example flow sensing device 900 where components of the example flow sensing device 900 are projected to the same plane.

In some examples, the example flow sensing device 900 may comprise one or more heating elements disposed in the flow cap component, similar to those described above in connection with FIG. 1C. For example, the example flow sensing device 900 may comprise a first heating element 901 and a second heating element 903. In the example shown in FIG. 16, the first heating element 901 and/or the second heating element 903 may each include a metal layer that comprises nickel-based and/or iron-based material (for example, nickel iron (NiFe) alloys).

In some examples, the example flow sensing device 900 may comprise one or more thermal sensing elements disposed in the sensor component, similar to those described above in connection with FIG. 1C. For example, the thermal sensing elements of the example flow sensing device 900 may be in the form of one or more thermopiles, including a first thermopile element 905, a second thermopile element 907, and/or a resistor element 909.

In some examples, the example flow sensing device 800 of FIG. 15 may produce a higher span output than the example flow sensing device 900 of FIG. 16. This is due to the number of thermopiles that can be fit onto the membrane in each configuration. The example flow sensing device 800 of FIG. 15 allows more thermopiles; thus the voltage output is higher.

As described above, one or more plate elements may be disposed in an example sensor component of an example flow sensing device. In the example shown in FIG. 16, a first plate element 911, a second plate element 913, and/or a third plate element 915 may be disposed in the example sensor component.

In some examples, the first plate element 911, the second plate element 913, and/or the third plate element 915 may only cover the thermocouples of each thermopile on the membrane of the sensor component and not the thermocouples of the thermopile on the substrate of the sensor component. In such example, these plate elements must only reside on the membrane, and may not contact the substrate portion of the die since heat will then be transferred to the substrate.

While the example shown in FIG. 16 illustrates an oval shape for the first plate element 911 and/or the second plate element 913, it is noted that the scope of the present disclosure is not limited to oval shape only. Additionally, or alternatively, the first plate element 911 and/or the second plate element 913 may be in other shapes, including squares, rectangles, and/or circles.

In some examples, the first plate element 911 may be disposed on a third layer of the example sensor component, and the first thermopile element 905 may be disposed on a second layer of the example sensor component.

In some examples, electrically conducting plates (for example, the first plate element 911) may not be in intimate contact with the thermopile material (for example, the first thermopile element 905), but must have a thin film electrical insulator, such as silicon nitride, between the thermopile material and the plate material. In the example shown in FIG. 16, the first plate element 911 may at least partially overlap with the first thermopile element 905 when the first plate element 911 is projected to the plane of the first thermopile element 905.

In some examples, the first plate element 911 may comprise non-metal material that have high thermal conductivity (for example, graphene, diamond, and/or the like). In some examples, the first plate element 911 may comprise metal material (for example, aluminum, gold, and/or the like). In some examples, the first plate element 911 may be in contact with the flowing media in the flow channel, and the first plate element 911 may comprise inert material (for example, gold).

In some examples, an example sensor component may further comprise an insulator layer disposed between the first plate element 911 and the first thermopile element 905 (for example, between the second layer of the sensor component and the third layer of the sensor component). In some examples, the insulator layer may comprise material that may provide electricity insulation (for example, silicon oxide, silicon nitride, silicon oxynitride, and/or the like). As described above, the first plate element 911 may comprise metal material. As such, the insulator layer may prevent the first plate element 911 from short-circuiting the first thermopile element 905.

Referring back to FIG. 16, the second plate element 913 may be disposed on a third layer of the example sensor component, and the second thermopile element 907 may be disposed on a second layer of the example sensor component.

In some examples, electrically conducting plates (for example, the second plate element 913) may not be in intimate contact with the thermopile material (for example, the second thermopile element 907), but must have a thin film electrical insulator, such as silicon nitride, between the thermopile material and the plate material. In the example shown in FIG. 16, the second plate element 913 may at least partially overlap with the second thermopile element 907 when the second plate element 913 is projected to the plane of the second thermopile element 907.

Similar to the first plate element 911 described above, in some examples, the second plate element 913 may comprise non-metal material that have high thermal conductivity (for example, graphene, diamond, and/or the like). In some examples, the second plate element 913 may comprise metal material (for example, aluminum, gold, and/or the like). In some examples, the second plate element 913 may be in contact with the flowing media in the flow channel, and the second plate element 913 may comprise inert material (for example, gold).

In some examples, an example sensor component may further comprise an insulator layer disposed between the second plate element 913 and the second thermopile element 907 (for example, between the second layer of the sensor component and the third layer of the sensor component), similar to those described above.

Referring back to FIG. 16, the third plate element 915 may be disposed on a third layer of the example sensor component, and the resistor element 909 may be disposed on a second layer of the example sensor component. In some examples, the second layer may be above the third layer. In some examples, the second layer may be below the third layer. In the example shown in FIG. 16, the third plate element 915 may at least partially overlap with the resistor element 909.

Similar to the first plate element 911 described above, in some examples, the third plate element 915 may comprise non-metal material that have high thermal conductivity (for example, graphene, diamond, and/or the like). In some examples, the third plate element 915 may comprise metal material (for example, aluminum, gold, and/or the like). In some examples, the third plate element 915 may be in contact with the flowing media in the flow channel, and the third plate element 915 may comprise inert material (for example, gold).

In some examples, an example sensor component may further comprise an insulator layer disposed between the third plate element 915 and the resistor element 909 (for example, between the second layer of the sensor component and the third layer of the sensor component), similar to those described above. In some examples, the third plate element 915 may need to be placed to overlap with the resistor lines of the resistor element 909 and not the wide lead-outs of the resistor element 909, which are the connection of the resistor element 909 to the other devices (e.g., ohm meter).

Figure 17:
FIG. 17 illustrates an example configuration for a heating element, in accordance with examples of the present disclosure.

Referring now to FIG. 17, an example top view of an example heater element is provided, in accordance with some embodiments of the present disclosure. In some examples, the heater element can have a largely rectangular or columnar shape. In some examples, the heater element may have an aspect ratio of about 1:17, e.g., a width of about 12 µm and a length of about 210 µm, however any and all suitable aspect ratio or other suitable dimensions or form factors are contemplated. For instance, for a smaller flow sensor device, a heating element having a width of between about 1 µm and about 10 µm and a length of between about 50 µm and about 500 µm may be suitable. Likewise, other aspect ratios may be used and are contemplated herein, such as an aspect ratio between about 1:1 and about 1:100, about 1:2 and about 1:50, about 1:2 and about 1:30, about 1:2 and about 1:20, about 1:2 and about 1:15, about 1:2 and about 1:10, greater than about 1:2, greater than about 1:5, greater than about 1:10, greater than about 1:15, greater than about 1:20, greater than about 1:25, greater than about 1:30, greater than about 1:40, greater than about 1:50, greater than about 1:100, less than about 1:100, less than about 1:50, less than about 1:40, less than about 1:30, less than about 1:30, less than about 1:25, less than about 1:20, less than about 1:15, less than about 1:10, or less than about 1:5, inclusive of all values and ranges therebetween. The heater can comprise one or more metal materials configured emit thermal energy in resistance to the communication of an electrical current therethrough, or any other suitable means for generating and emitting thermal energy.

Figure 18:
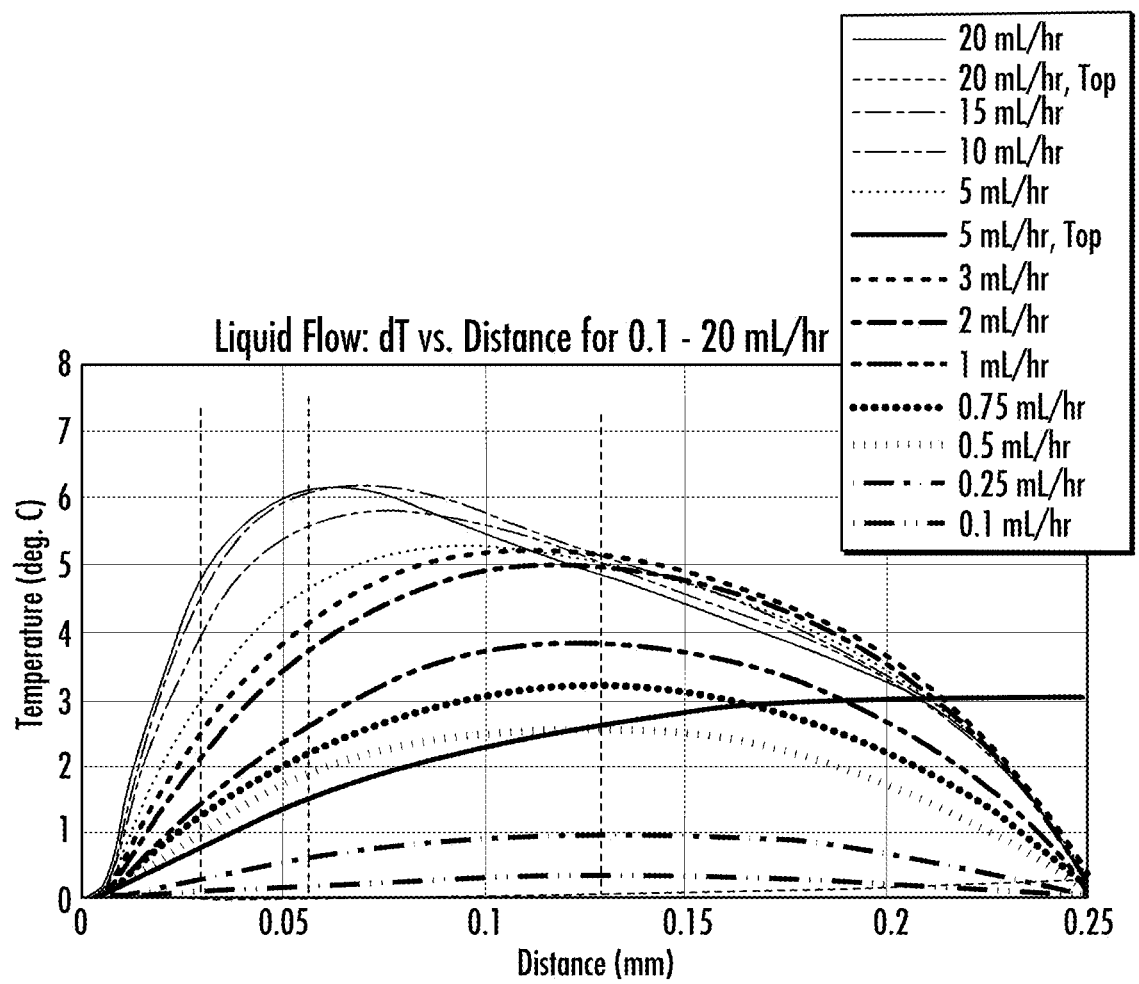
FIG. 18 is a graphical representation of liquid flow rate at various temperatures and thermal sensor distances from a heating element, in accordance with examples of the present disclosure.

Referring now to FIG. 18, experimental data is provided in graph form, for a flow sensor device comprising, e.g., the heater of FIG. 17. In FIG. 17, temperature differential (dT) between inside and outside a sensing region of a flow sensing device is mapped versus distance of a thermopile from a center of a nearby heating element, at various flow rates is illustrated. The dT for some flow rates peaks at a distance of between about 0.05 mm and about 0.1 mm, while a second peak may exist for many flow rates between about 0.1 mm and about 0.2 mm. The sensitivity of a thermopile to temperature changes as caused by changes in flow rate at lower flow rates is shown, in some instances, to be increased by increasing the distance of the thermopile from the heater element. In other instances, a thermopile located closer to the heater may be more effective for higher flow rates as the further distanced thermopile may not be heated by the heater since the faster flowing media may act as an efficient heat sink.

Figure 19A:
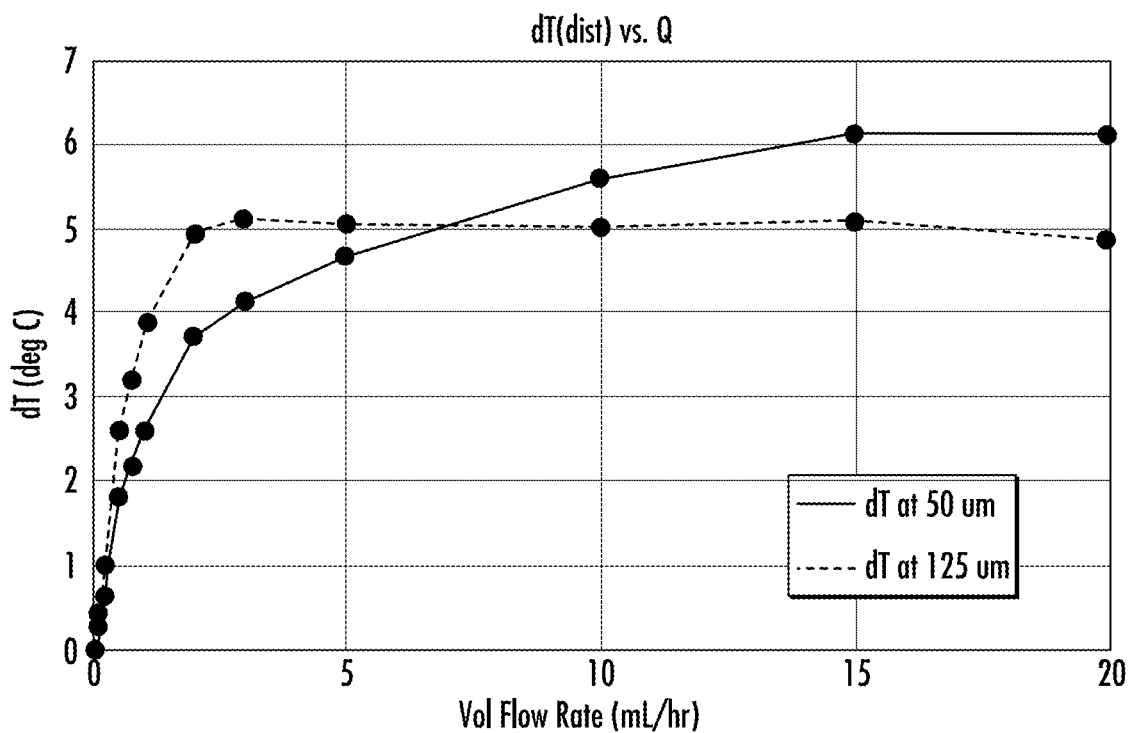
FIG. 19A is a graphical representation of temperature differences between outside and inside a membrane, for an example flow sensor having two sense elements positioned different distances from a heating element, as a function of the flow rate of media such as a fluid through a nearby flow channel, in accordance with examples of the present disclosure.

Referring now to FIG. 19A, a graph is presented of experimental data associated with the change in temperature difference between inside a membrane and outside a membrane of an example flow sensor having two sense elements, the two sense elements positioned different distances from a center of a heating element. The change in temperature is illustrated as a function of distance of the thermopile sense elements from a center of the heating element and as a function of flow rates between about 0.1 mL/hour and about 20 mL/hour. According to the graph of FIG. 19A, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 19B:
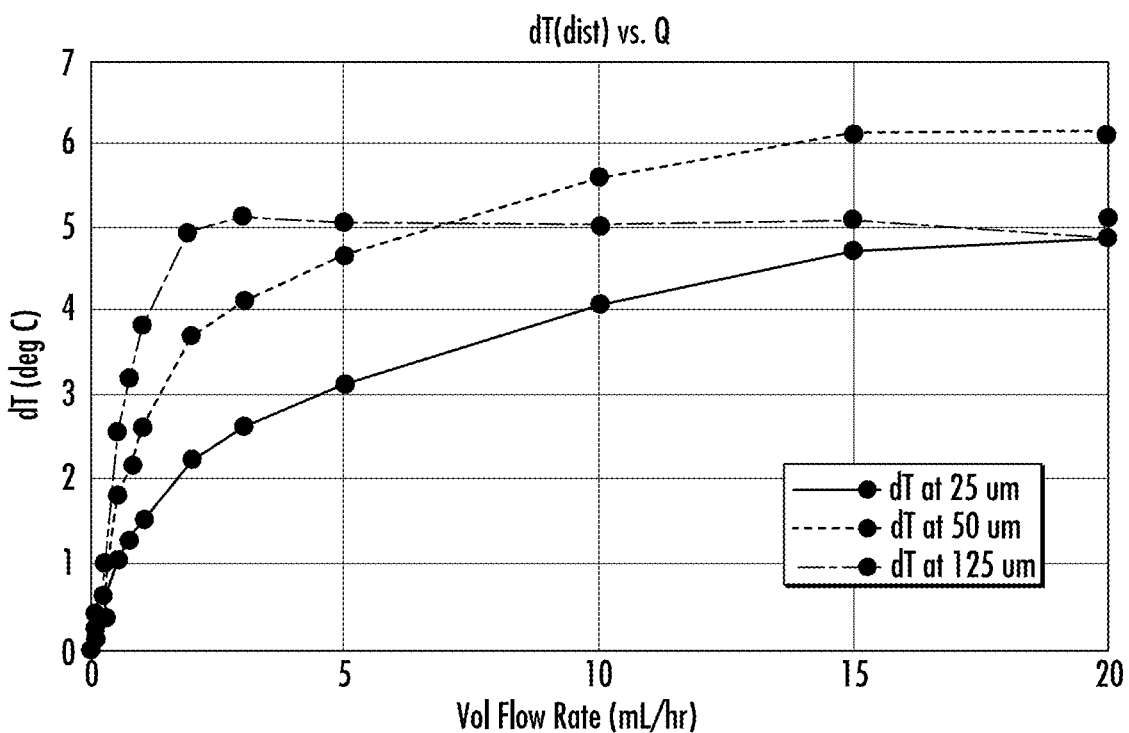
FIG. 19B is a graphical representation of temperature differences between outside and inside a membrane, for an example flow sensor having three sense elements positioned different distances from a heating element, as a function of the flow rate of media such as a fluid through a nearby flow channel, in accordance with examples of the present disclosure.

Referring now to FIG. 19B, a graph is presented of experimental data associated with the change in temperature difference between inside a membrane and outside a membrane of an example flow sensor having three sense elements, the three sense elements positioned different distances from a center of a heating element. The change in temperature is illustrated as a function of distance of the thermopile sense elements from a center of the heating element and as a function of flow rates between about 0.1 mL/hour and about 20 mL/hour. According to the graph of FIG. 19B, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 20:
FIG. 20 illustrates an example configuration for a heating element, in accordance with examples of the present disclosure.

Referring now to FIG. 20, an example top view of an example heater element is provided, in accordance with some embodiments of the present disclosure. In some examples, the heater element can have a largely rectangular or columnar shape. In some examples, the heater element may have a width of about 42 μm and a length of about 210 μm, however any and all suitable aspect ratio or other suitable dimensions or form factors are contemplated, such as described above (e.g., with regard to heating element 105 and the heating element of FIG. 17.

Figure 21:
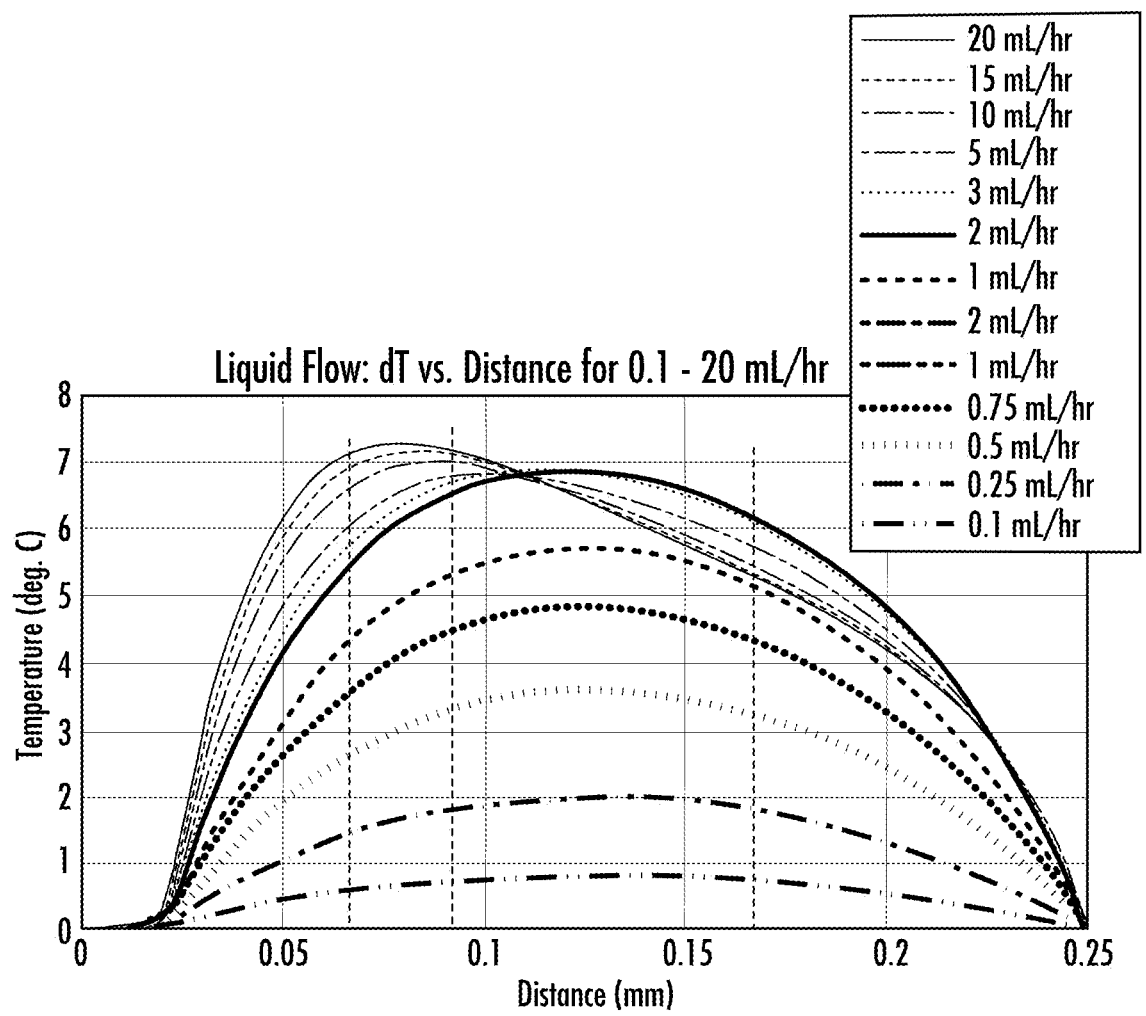
FIG. 21 is a graphical representation of liquid flow rate at various temperatures and thermal sensor distances from a heating element, in accordance with examples of the present disclosure.

Referring now to FIG. 21, experimental data is provided in graph form, for a flow sensor device comprising a heater element such as that illustrated in FIG. 20. In FIG. 21, temperature difference (dT) between inside and outside of a sensing region or membrane versus distance of a thermopile from the heater element, at various flow rates is illustrated. As illustrated in FIG. 21, the dT for some flow rates peaks at a distance of between about 0.05 mm and about 0.1 mm, while a peak may exist for many flow rates between about 0.1 mm and about 0.2 mm. As illustrated, the sensitivity of a thermopile to temperature changes caused by changes in flow rate at lower flow rates may often be increased by increasing the distance of the thermopile from the heater element. In some other examples, while a thermopile located closer to the heater may be more effective for higher flow rates as the further distanced thermopile may not be heated by the heater since the faster flowing media may act as an efficient heat sink. For the heater having a width of about 42 μm versus the heater having a width of 12 μm, the wider heater results in larger temperature differentials at higher flow rates and for thermopiles located further from the heater element, meaning that one way to increase the sharpness of the dT peak may be to increase the size (and therefore the thermal output) of the heater element, or add a second heater element, or the like. In some examples, if the sharpness of the dT peak can be increased, the distance of a thermopile from the heater element can be determined more accurately and the thermopile may be positioned such that it achieves a local or global maximal accuracy and/or precision of temperature measurement, which can translate to increase flow rate measurement accuracy and/or precision.

Figure 22A:
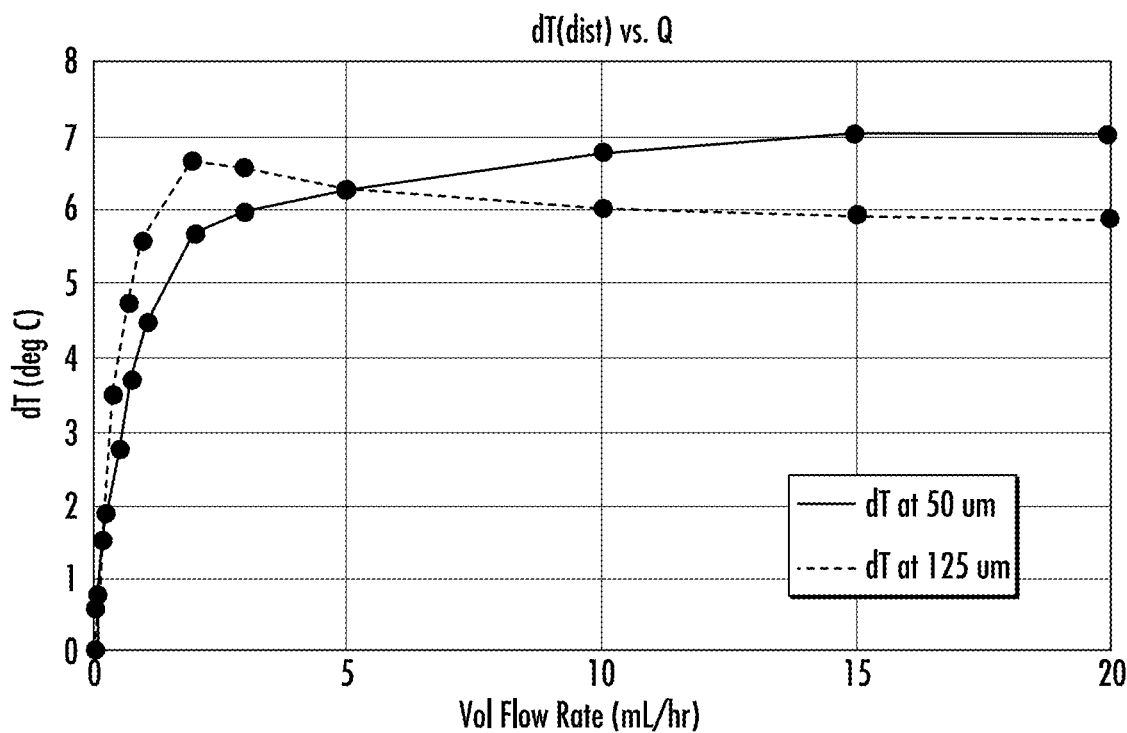
FIG. 22A is a graphical representation of temperature differences between outside and inside a membrane, for an example flow sensor having two sense elements positioned different distances from a heating element, as a function of the flow rate of media such as a fluid through a nearby flow channel, in accordance with examples of the present disclosure.

Referring now to FIG. 22A, a graph is presented of experimental data associated with the change in temperature difference between inside a membrane and outside a membrane of an example flow sensor having two sense elements, the two sense elements positioned different distances from a center of a heating element. The change in temperature is illustrated as a function of distance of the thermopile sense elements from a center of the heating element and as a function of flow rates between about 0.1 mL/hour and about 20 mL/hour. According to the graph of FIG. 22A, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 22B:
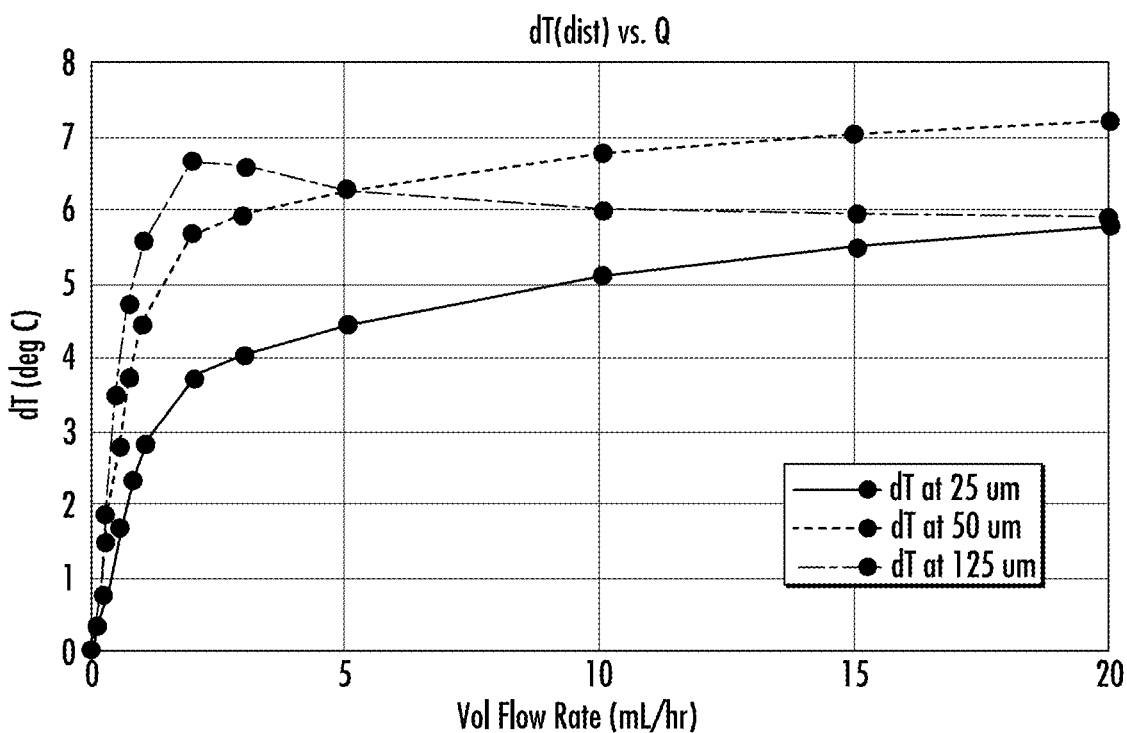
FIG. 22B is a graphical representation of temperature differences between outside and inside a membrane, for an example flow sensor having three sense elements positioned different distances from a heating element, as a function of the flow rate of media such as a fluid through a nearby flow channel, in accordance with examples of the present disclosure.

Referring now to FIG. 22B, a graph is presented of experimental data associated with the change in temperature difference between inside a membrane and outside a membrane of an example flow sensor having three sense elements, the three sense elements positioned different distances from a center of a heating element. The change in temperature is illustrated as a function of distance of the thermopile sense elements from a center of the heating element and as a function of flow rates between about 0.1 mL/hour and about 20 mL/hour. According to the graph of FIG. 22B, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 23:
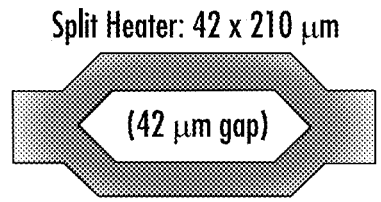
FIG. 23 illustrates an example configuration for a heating element, in accordance with examples of the present disclosure.

Referring now to FIG. 23, an example top view of an example heater element is provided, in accordance with some embodiments of the present disclosure. In some examples, the heater element can have a largely rectangular or columnar shape at one or both ends and comprise a split or aperture through the material. In some examples, the heating element may have a width at an inlet and an outlet of about 42 μm and a length of about 210 μm with a gap between parallel portions of the split heating element in the middle, the parallel split portions each having a width of about 20 μm, forming a middle portion that is between about 42 μm and about 62 μm, however any and all suitable aspect ratio or other suitable dimensions or form factors are contemplated, such as described above (e.g., with regard to heating element 105 and the heating element of FIG. 17.

Figure 24:
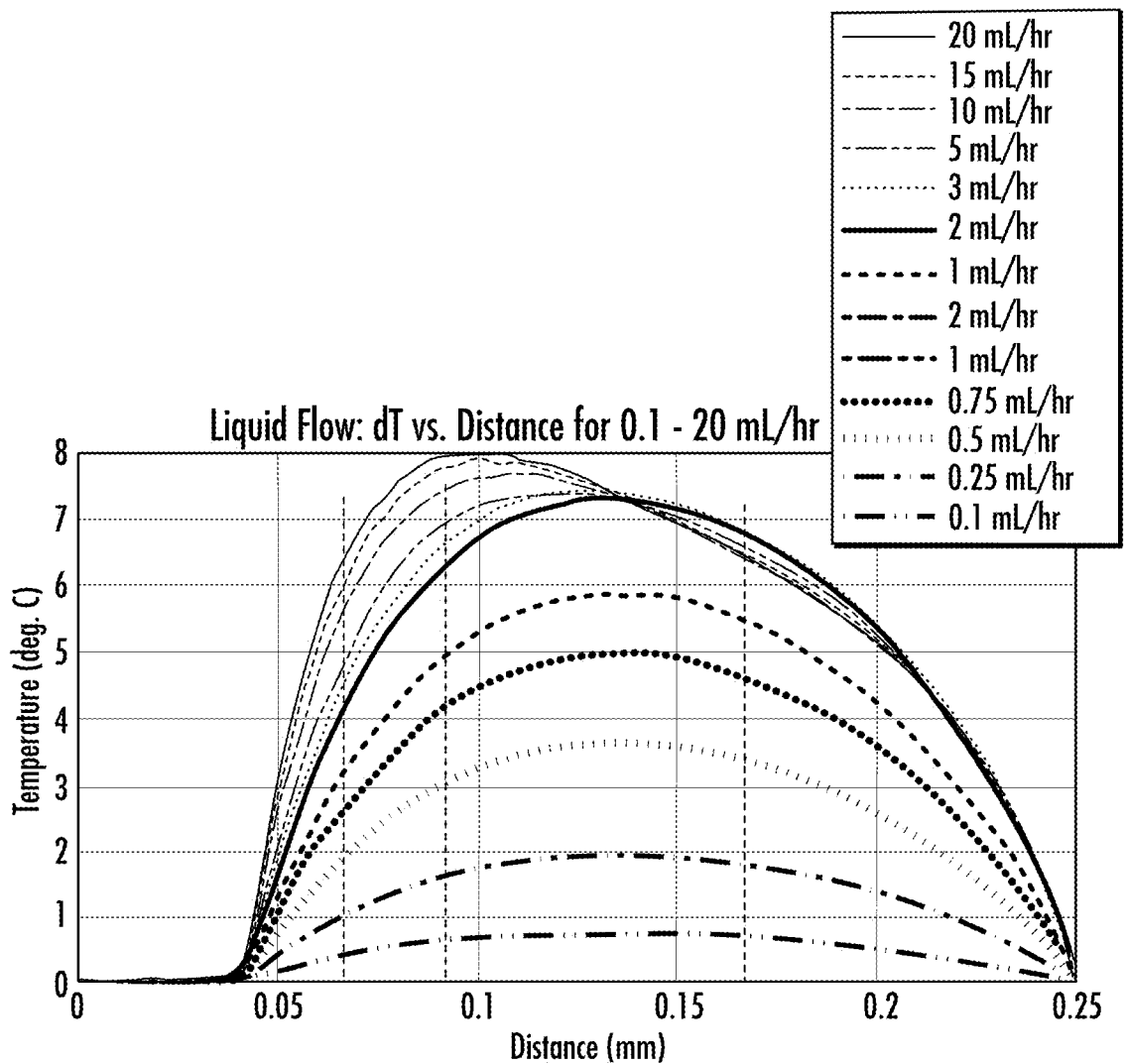
FIG. 24 is a graphical representation of temperature differences at various distances from the heater element for an example flow rate sensor as a function of the flow rate of media such as a fluid through a nearby flow channel, in accordance with examples of the present disclosure.

Referring now to FIG. 24, experimental data is provided in graph form, for a flow sensor device comprising a split heater element comprising two parallel heat element portions that are joined together at each end with a gap therebetween, such as that illustrated in FIG. 23. In this particular embodiment, the split heater had a width of about 42 μm and a length of about 210 μm with an approximately 40 μm gap between the parallel portions of the split heater element. In FIG. 24, dT versus distance of a thermopile from the heater element, at various flow rates is illustrated. As illustrated in FIG. 24, the dT for some flow rates peaks at a distance of between about 0.05 mm and about 0.1 mm, while a second peak may exist for many flow rates between about 0.1 mm and about 0.2 mm. The sensitivity of a thermopile to temperature changes caused by changes in flow rate at lower flow rates may be increased by increasing the distance of the thermopile from the heater element. In some instances, a thermopile located closer to the heater may be more effective for higher flow rates as the further distanced thermopile may not be heated by the heater since the faster flowing media may act as an efficient heat sink. For the split heater having a width of about 42 μm versus the non-split heaters having a width of 12 μm or 42 μm, the split heater results in still larger temperature differentials at higher flow rates and for thermopiles located further from the heater element, meaning that another way to increase the sharpness of the dT peak may be to use a split heater in addition to increasing the size (and therefore the thermal output) of the heater element, or add a second heater element, or the like. In some examples, if the sharpness of the dT peak can be increased, the distance of a thermopile from the heater element can be determined more accurately and the thermopile may be positioned such that it achieves a local or global maximal accuracy and/or precision of temperature measurement, which can translate to increase flow rate measurement accuracy and/or precision.

Figure 25A:
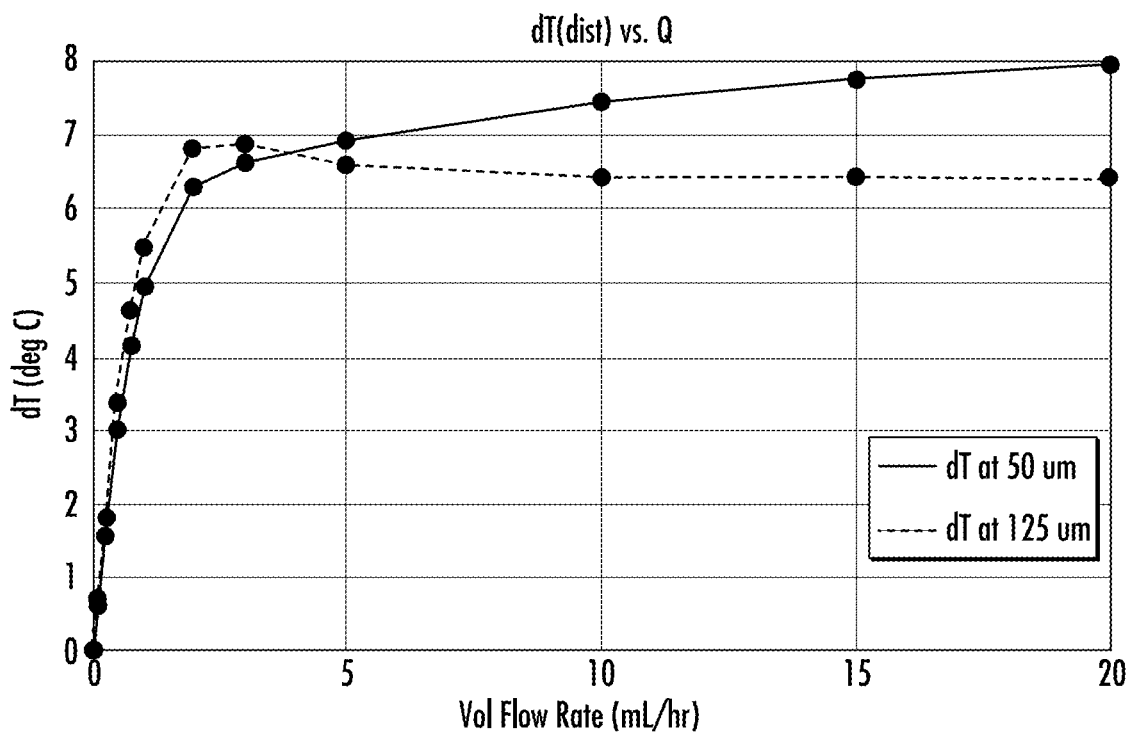
FIG. 25A is a graphical representation of temperature differences between outside and inside a membrane, for an example flow sensor having two sense elements positioned different distances from a heating element, as a function of the flow rate of media such as a fluid through a nearby flow channel, in accordance with examples of the present disclosure.

Referring now to FIG. 25A, a graph is presented of experimental data associated with the change in temperature difference between inside a membrane and outside a membrane of an example flow sensor having two sense elements, the two sense elements positioned different distances from a center of a heating element. The change in temperature is illustrated as a function of distance of the thermopile sense elements from a center of the heating element and as a function of flow rates between about 0.1 mL/hour and about 20 mL/hour. According to the graph of FIG. 25A, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

Figure 25B:
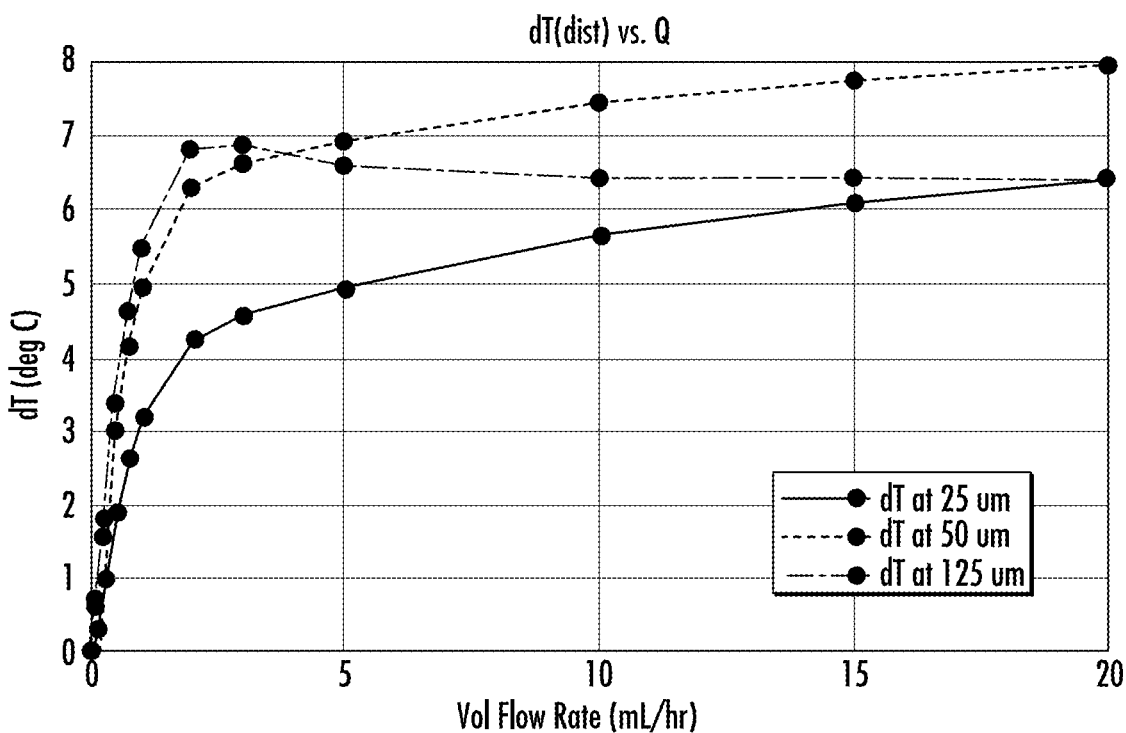
FIG. 25B is a graphical representation of temperature differences between outside and inside a membrane, for an example flow sensor having three sense elements positioned different distances from a heating element, as a function of the flow rate of media such as a fluid through a nearby flow channel, in accordance with examples of the present disclosure.

Referring now to FIG. 25B, a graph is presented of experimental data associated with the change in temperature difference between inside a membrane and outside a membrane of an example flow sensor having three sense elements, the three sense elements positioned different distances from a center of a heating element. The change in temperature is illustrated as a function of distance of the thermopile sense elements from a center of the heating element and as a function of flow rates between about 0.1 mL/hour and about 20 mL/hour. According to the graph of FIG. 25B, the T1 and T2 distances of thermopiles from the heater element described herein may be optimized for various desired flows or a flow range for which the flow sensor device 100, 200 may be configured for accurate and precise flow rate measurement. In some examples, the experimental results may indicate that either being able to switch between a first thermopile at the T1 distance and a second thermopile at the T2 distance from the heater element as flow rate increases or decreases past a particular threshold may be beneficial. In some examples, the experimental results may indicate that summing an output voltage of a first upstream thermopile at the T1 distance and the output voltage of a second upstream thermopile at the T2 distance, summing the output voltage of a first downstream thermopile at the T1 distance and the output voltage of the second downstream thermopile at the T2 distance, and determining a differential between the summed upstream thermopile output voltages and the summed downstream thermopile output voltages may lead to accurate measurement of flow rate and flow rate changes at both higher flow rates in excess of about 20 mL/hour and also at lower flow rate less than about 20 mL/hour.

In some examples, various applications of present disclosure may require laminar flow, which may be characterized by particles of the flowing media following smooth path(s) in the flow channel with little or no mixing (i.e. high momentum diffusion and low momentum conviction). In contrast, turbulent flow may be characterized by particles of the flowing media undergo irregular fluctuations, or mixing. In some examples, a laminar flow for the flow sensing device may be achieved based on the flow rate of the flowing media. As described above, examples of the present disclosure may be implemented in an infusion pump, where the flow rate may be less than a flow rate threshold (for example, 5 milliliters per hour). As such, turbulent flow may be avoided by receiving a flowing media that has a flow rate below a flow rate threshold to retain the flowing media as laminar flow.

While the description above provides an example flow sensing device, it is noted that the scope of the present disclosure is not limited to the example flow sensing devices. For example, the scope of the present disclosure may encompass example methods associated with the flow sensing device.

For example, in accordance with various examples of the present disclosure a method for manufacturing a flow sensing device may be provided. The method may comprise providing a flow cap component comprising a heating element disposed in a first layer of the flow cap component and providing a sensor component comprising at least one thermal sensing element disposed in a second layer of the sensor component, similar to those described above in connection with FIG. 1A-FIG. 22. For example, the flow cap component may be formed through an etching process as described above. In some examples, the first layer and the second layer are coplanar, similar to those described above in connection with FIG. 1C.

In some examples, a method of manufacturing the flow sensor device or a method of assembling the flow sensor device may comprise bonding the flow cap component to a first surface of the sensor component.

In some examples, an example flow sensing device manufactured in accordance with examples of the present disclosure may be in the form of a micro-electromechanical system (MEMS) die. For example, the flow cap component may be integral to the MEMS die. Additionally, or alternatively, the MEMS die may comprise one or more other circuitries, including, but not limited to, additional temperature sensing circuitry, communication circuitry (for example, near filed communication (NFC) circuitry), and/or power control circuitry, such that the MEMS die may be integrated a control system (for example, a control system for an infusion pump).

Described herein are operations performed in accordance with example embodiments of the present disclosure. It will be understood that each operation, and combinations of operations, may be implemented by various means, such as devices comprising hardware, firmware, one or more processors, and/or circuitry associated with execution of software comprising one or more computer program instructions. In some embodiments, one or more of the procedures described above may be performed by execution of program code instructions. For example, one or more of the procedures described above may be performed by material handling equipment (e.g., a robotic arm, servo motor, motion controllers, and the like) and computer program instructions residing on a non-transitory computer-readable storage memory. In this regard, the program code instructions that, when executed, cause performance of the procedures described above may be stored by a non-transitory computer-readable storage medium (e.g., memory) of a computing apparatus and executed by a processor of the computing apparatus. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified throughout the present application. When executed, the instructions stored in the computer-readable storage memory produce an article of manufacture configured to implement the various functions specified throughout the present application. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations described throughout the present application. Moreover, execution of a computer or other processing circuitry to perform various functions converts the computer or other processing circuitry into a particular machine configured to perform an example embodiment of the present disclosure.

Operations and processes described herein support combinations of means for performing the specified functions and combinations of operations for performing the specified functions. It will be understood that one or more operations, and combinations of operations, may be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method and process descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus' circuitry to produce a machine, such that the computer, processor, or other programmable circuitry that executes the code on the machine creates the means for implementing various functions, including those described herein. In some embodiments, features of the present disclosure may comprise, or be communicatively coupled to, an application specific integrated circuit (ASIC) configured to convert the differential output voltage from the thermopile or thermopiles (e.g., either in a single chip or two-chip configuration).

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, systems, subsystems, apparatuses, techniques, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatuses and systems described herein, various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

As used herein, the term "about" and "approximately" generally mean plus or minus 10% of the value stated, for example about 250 μm would include 225 μm to 275 μm, approximately 1,000 μm would include 900 μm to 1,100 μm.

Conventional terms in the fields of electrical engineering, chemical engineering, materials science and engineering, and computer science have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A flow sensor comprising:
   a flow channel configured to transport a fluid therethrough, the flow channel being disposed along a first axis;
   a heating element disposed nearby the flow channel, wherein the heating element is configured to release a predetermined amount of thermal energy, a center of the heating element being disposed along a second axis at least substantially perpendicular to the first axis; one or more first thermal sensing elements disposed along the first axis a first distance from the center of the heating element, wherein changes in a voltage differential between an inlet and an outlet of the one or more first thermal sensing elements are indicative of changes in a temperature at the one or more first thermal sensing elements; and one or more second thermal sensing elements disposed along the first axis a second distance from the center of the heating element, the second distance being greater than the first distance, wherein changes in the voltage differential between an inlet and an outlet of the one or more second thermal sensing elements are indicative of changes in the temperature at the one or more second thermal sensing elements, wherein the flow sensor is configured to determine a flow rate of the fluid through the flow channel based upon an association between a sum of the first and second voltage differential and the flow rate of fluids through the flow channel, and wherein the first distance is between about 25 μm and about 75 μm, and wherein said second distance from the heating element is between about 125 μm and about 175 μm.

2. The flow sensor of claim 1, wherein the one or more first thermal sensing elements and the one or more second thermal sensing elements are positioned upstream or downstream of the heating element.

3. The flow sensor of claim 2, further comprising circuitry configured to at least:
determine a sum the first and second voltage differentials; and
compare said sum of the first and second voltage differentials to a calibration curve, said calibration curve relating a plurality of summed voltage differentials to said flow rate of the fluid.

4. The flow sensor of claim 1, wherein said one or more first thermal sensing elements or said one or more second thermal sensing elements comprise at least one from among: a resistor, a resistive bridge, a diode, a resistive Wheatstone bridge, a thermocouple, or a thermopile.

5. The flow sensor of claim 1, wherein said one or more first thermal sensing elements are disposed said first distance from the center of the heating element in an upstream direction relative to a flow direction of the fluid in the flow channel, wherein said one or more second thermal sensing elements are disposed said second distance from the center of the heating element in the upstream direction relative to the flow direction of the fluid in the flow channel, and wherein the flow sensor further comprises:
one or more third thermal sensing elements disposed the first distance from the center of the heating element in a downstream direction relative to the flow direction of the fluid in the flow channel; and
one or more fourth thermal sensing elements disposed the second distance from the center of the heating element in a downstream direction relative to the flow direction of the fluid in the flow channel.

6. The flow sensor of claim 1, further comprising:
a sensor component comprising a top surface and defining an inner cavity; and
a membrane disposed on a portion of the top surface of the sensor component, wherein the one or more first thermal sensing elements and the one or more second thermal sensing elements are disposed on or within the membrane.

7. The flow sensor of claim 6, wherein each thermal sensing element of said one or more first thermal sensing elements and said one or more second thermal sensing elements comprise a first thermocouple material operably coupled at a first end to a thermocouple contact, and a second thermocouple material operably coupled at a first end to the thermocouple contact.

8. The flow sensor of claim 7, wherein the thermocouple contact is positioned said first distance from the center of the heating element, and wherein a second end of the first thermocouple material and a second end of the second thermocouple material extend beyond an edge of the membrane.

9. The flow sensor of claim 1, wherein the flow channel has a height or a diameter that is between about 1 μm and about 500 μm.

10. The flow sensor of claim 1, wherein the flow sensor is configured to measure flow rates between about 0.1 mL/hour and about 1,000 mL/hour.

11. The flow sensor of claim 1, wherein said heating element has a width between about 5 μm and about 100 μm, and wherein the heating element has a length between about 50 μm and about 1,000 μm.

12. The flow sensor of claim 1, wherein said one or more first thermal sensing elements are configured to be electrically coupled to said one or more second thermal sensing elements.

13. A flow sensor comprising: a flow cap component at least partially defining a flow channel, wherein the flow channel is configured to transport a fluid therethrough, the flow channel being disposed substantially along a first axis; a sensor component comprising a top surface and defining an inner cavity, the flow cap being operably coupled to at least a portion of the top surface of the sensor component, the sensor component comprising: a heating element disposed on or within said sensor component, the heating element being disposed along a second axis at least substantially perpendicular to the first axis; a first thermal sensing element disposed on or within said sensor component along said second axis and spaced a first distance in a first direction from a center of the heating element, wherein a first output voltage is measurable at an outlet of the first thermal sensing element; a second thermal sensing element disposed on or within said sensor component along said second axis and spaced a second distance in the first direction from the center of the heating element, the second distance being greater than the first distance, wherein a second output voltage is measurable at an outlet of the second thermal sensing element; a third thermal sensing element disposed on or within said sensor component along said second axis and spaced the first distance in a second direction from the center of the heating element, the second direction being opposite the first direction, wherein a third output voltage is measurable at an outlet of the third thermal sensing element; and a fourth thermal sensing element disposed on or within said sensor component along said second axis and spaced the second distance in the second direction from the center of the heating element, wherein a fourth output voltage is measurable at an outlet of the fourth thermal sensing element, wherein a voltage differential between a sum of the first and second output voltages and a sum of the third and fourth output voltages is indicative of a flow rate of the fluid through the flow channel, wherein each of the first, second, third, and fourth thermal sensing elements comprise a first thermocouple material operably coupled at a second end to a thermocouple contact, and a second thermocouple material operably coupled at a first end to the thermocouple contact, and wherein a distance between the second end of the first thermocouple material and the center of the heating element is about 25 μm and about 75 μm, and a distance between a second end of the second thermocouple material and the center of the heating element is about 125 μm and about 175 μm.

14. The flow sensor of claim 13, wherein one or more of the first thermal sensing element, the second thermal sensing element, the third thermal sensing element, and the fourth thermal sensing element comprise at least one from among: a resistor, a resistive bridge, a diode, a resistive Wheatstone bridge, a thermocouple, or a thermopile.

15. The flow sensor of claim 14, wherein at least a portion of each of the first, second, third, and fourth thermal sensing elements is disposed on or in a membrane that is disposed on or in said sensor component.

16. The flow sensor of claim 15, wherein the membrane comprises one or more first materials and the sensor component comprises one or more second materials, wherein the one or more first materials are substantially thermally insulative and the one or more second materials are substantially thermally conductive.

17. A method for measuring a flow rate of a fluid in a flow path, the method comprising: causing a heating element to emit a set amount of thermal energy, the heating element being positioned substantially perpendicular to the flow path; providing a first electrical current having a first voltage to an inlet of a first thermal sensing element spaced a first distance from a central longitudinal axis of the heating element; providing a second electrical current having a second voltage to an inlet of a second thermal sensing element spaced a second distance from the central longitudinal axis of the heating element, the second distance being greater than the first distance; measuring outlet voltages at respective outlets of the first and second thermal sensing elements, wherein each of the first and second thermal sensing elements comprise a first thermocouple material operably coupled at a second end to a thermocouple contact, and a second thermocouple material operably coupled at a first end to the thermocouple contact, and wherein a distance between the second end of the first thermocouple material and the central longitudinal axis of the heating element is about 25 μm and about 75 μm, and a distance between a second end of the second thermocouple material and the central longitudinal axis of the heating element is about 125 μm and about 175 μm; and determining the flow rate of the fluid in the flow path based upon said outlet voltages, wherein the outlet voltages at said respective outlets of the first and second thermal sensing elements are indicative of the flow rate.

\* \* \* \* \*